(12) United States Patent
Onmori et al.

(10) Patent No.: US 6,981,586 B2
(45) Date of Patent: Jan. 3, 2006

(54) MAGNETIC TAPE CASSETTE STORAGE CASE

(75) Inventors: Shozo Onmori, Kanagawa (JP); Kazuo Hiraguchi, Kanagawa (JP); Kiyoo Morita, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/231,350

(22) Filed: Aug. 30, 2002

(65) Prior Publication Data

US 2003/0029761 A1 Feb. 13, 2003

Related U.S. Application Data

(62) Division of application No. 09/856,817, filed as application No. PCT/JP99/06624 on Nov. 26, 1999, now Pat. No. 6,550,614.

(30) Foreign Application Priority Data

Nov. 27, 1998 (JP) .............................. P. 10-337731

(51) Int. Cl.
   *B65D 85/575* (2006.01)
(52) U.S. Cl. .............. 206/232; 206/387.1; 206/387.13; 206/472
(58) Field of Classification Search ................ 206/232, 206/387.1, 387.13, 459.5, 472; 220/326, 220/838, 839; 281/29–31
   See application file for complete search history.

(56) References Cited

U.S. PATENT DOCUMENTS

| 4,011,940 A | 3/1977 | Neal et al. |
|---|---|---|
| 4,293,266 A | 10/1981 | St. Lawrence et al. |
| 4,294,469 A * | 10/1981 | Errichiello .................... 281/29 |
| 4,407,410 A * | 10/1983 | Graetz et al. ................ 206/472 |
| 4,593,814 A | 6/1986 | Hagiwara et al. |
| 4,643,301 A * | 2/1987 | Hehn et al. ................. 206/232 |
| 4,753,347 A | 6/1988 | Bellante et al. |
| 5,762,375 A * | 6/1998 | Kogutt et al. ................. 281/37 |
| 5,876,143 A * | 3/1999 | Ong .............................. 402/3 |
| 6,009,999 A | 1/2000 | Morita et al. |
| 6,045,161 A * | 4/2000 | Ashcraft et al. ............... 281/37 |
| 6,213,669 B1 * | 4/2001 | Yamamoto .................... 402/73 |
| 6,305,714 B1 * | 10/2001 | Rossetto et al. .............. 281/37 |
| 6,394,497 B1 * | 5/2002 | Ho ............................... 281/29 |
| 6,488,433 B2 * | 12/2002 | Wien et al. ................... 402/73 |

FOREIGN PATENT DOCUMENTS

| DE | 33 35 558 A1 | 4/1985 |
|---|---|---|
| JP | 52-72700 A | 6/1977 |
| JP | 9-169383 A | 6/1997 |

\* cited by examiner

*Primary Examiner*—Jim Foster
(74) *Attorney, Agent, or Firm*—Sughrue Mion, PLLC

(57) ABSTRACT

A magnetic tape cassette storage case (1) comprising a storage section (3) for storing a magnetic tape cassette (81), a lid section (5) for covering the storage section (3), and a connecting section (7) for connecting the storage section (3) and the lid section (5) so as to enable the open-and-closed motion; in which the storage section (3) and the lid section (5) comprise plate portion (11, 21) and sidewall portions (13, 23) provided along the outer peripheries of the flat portions (11, 21) respectively. A notch (26b) having at least the height of the sidewall portion (13) provided on the storage section (3) is formed on the inner side of the end of the sidewall portion (23) closer to the connecting section (7) of the lid section (5).

17 Claims, 56 Drawing Sheets

MAGNETIC TAPE CASSETTE STORAGE CASE

This is a divisional of application Ser. No. 09/856,817 filed May 25, 2001 now U.S. Pat. No. 6,550,614, which is a §371 of International Application No. PCT/JP99/06624 filed Nov. 26, 1999; the above noted prior applications are all hereby incorporated by reference.

TECHNICAL FIELD

The present invention relates to a magnetic tape cassette storage case for storing a magnetic tape cassette.

BACKGROUND ART

Various types of storage cases for magnetic cassette tapes (herein after referred to as storage case) are proposed according to the configuration of the magnetic cassette to be stored. Referring now to FIG. 46 and FIG. 47, a storage case for digital video cassettes (hereinafter referred to as "DVCs") and a magnetic tape cassette for the DVCs of the related art will be described by way of example.

The storage case 1441 shown in FIG. 46 comprises a storage section 1443 for storing the magnetic tape cassette 1481 shown in FIG. 47, a lid section 1445, and a connecting section 1447. The storage section 1443 comprises a first plate portion 1451, and a first sidewall portion 1453 formed integrally along the outer periphery of the first plate portion 1451, and a pair of reel locking ribs 1445a, 1445b formed on the first plate portion 1451 at the positions somewhat closer to the rear side than to the front side. When the magnetic tape cassette 1481 shown in FIG. 47 is stored, it will be fitted within the first sidewall portion 1453 in the state shown by a phantom line in FIG. 46 when it is properly stored.

The lid section 1445 comprises a second plate portion 1461, and a second sidewall portion 1463 formed integrally along three sides of the outer periphery of the second plate portion 1461. The connecting section 1447 comprises a third plate portion 1471 and thin portions 1473a, 1473b formed on both sides thereof. These thin portions 1473a, 1473b enable the storage section 1443 and the lid section 1445 to close as a book.

Outside of the first sidewall portion 1453 that defines the storage section 1443, there is provided an overhanging portion 1451a that is formed by a part of the first plate portion 1451 in an overhanging manner. Therefore, even when the storage section 1443 and the lid section 1445 are closed and the second sidewall portion 1463 of the lid section 1445 is fitted around the first sidewall portion 1453 of the storage section 1443, the overhanging portion 1451a prevents the storage section 1443 from getting into the lid section 1445, and thus the thickness of the case may be maintained as a whole.

There are formed a recess 1453a, or a locked portion, on the outer surface of the fist sidewall portion 1453, and a projection 1463a, or a locking portion, on the inner surface of the second sidewall portion 1463 at the position corresponding to the recess portion 1453a when the storage section 1443 and the lid section 1445 are closed. Therefore, when the storage section 1443 and the lid section 1445 are closed with respect to each other, the projection 1463a and the recess 1453a engage so as to prevent an accidental opening of the storage section 1443 and the lid section 1445.

Referring now to FIG. 47, the magnetic tape cassette 1481 will be described. FIG. 47 is a perspective view of the magnetic tape cassette 1481 when viewed from the bottom side, in which an upper cassette half 1483 is situated below the lower cassette half 1485. There are formed circular openings 1487a, 1487b at two locations on the lower cassette half 1485, and engaging portions 1489a, 1489b integrally formed with the reel hubs (not shown) on which the magnetic tape is wound are exposed therefrom.

The engaging portions 1489a, 1489b have a function to unwinding and winding the magnetic tape when it is mounted in the VTR, and a function to engage the ribs 1455a, 1455b for engaging the reel and prevents rattling of the magnetic tape cassette 1481 when it is stored in the storage case 1441.

On the front side of the magnetic tape cassette 1481, an outer lid 1491 is provided for pivotal movement, and when it is mounted in the VTR or the like, the magnetic tape is pulled out after the outer lid 1491 is pivoted as shown by the arrow A in FIG. 47. There is formed a recessed opening 1493 inside the outer lid 1491 at near the center in such a manner that the upper and lower cassette halves 1483, 1485 are notched, and there is provided a shoulder 1495 on one end of the opening 1493 on the side of the lower cassette half 1485.

The magnetic tape cassette 1481 may be stored in the storage case 1441 by fitting the magnetic tape cassette 1481 in the sidewall portion 1453 as shown by a phantom line in FIG. 46, and pushing and inserting the ribs 1455b, 1455a for engaging the reels into circular engaging holes B formed at the center of the engaging portion 1489a, 1489b, whereby the positional restriction of the magnetic tape cassette 1481 is made and stored appropriately.

However, in the structure of the storage case 1441 described above, the following problem was recognized when the magnetic tape cassette 1481 is stored. When the storage section 1443 and the lid section 1445 are closed as described above, the second sidewall portion 1463 of the lid section 1445 is fitted on the outside of the first sidewall portion 1453 of the storage section 1443 under the normal situation. However, when the both side surface of the second sidewall portion 1463 of the lid section 1445 are pressed, the second sidewall portion 1463 deflects by the pressing force, and thus the sidewall portion 1453 of the storage section 1443 and the sidewall portion 1463 of the lid section 1445 abut against each other when the storage section 1443 and the lid section 1445 are closed, thereby causing imperfect closing. Especially, in order to improve sealing performance of the storage case 1441, the clearance between the first sidewall portion 1453 of the storage section 1443 and the second sidewall portion 1463 of the lid section 1445 have to be reduced as small as possible. However, when the clearance is reduced, a slight pressurizing movement causes abutment between the sidewall portions 1453 and 1463, thereby causing imperfect closing.

In addition, depending on the extent of the pressing force, there may be a case where the second sidewall portion 1463 of the lid section 1445 comes inside the first sidewall portion 1453 of the storage section 1443, which also causes imperfect closing. When it is stored in the badly closed state for a long time, the storage case is subjected to plastic deformation, which is not preferable.

With such a circumstance in view, it is the first object of the present invention to provide a magnetic tape cassette storage case in which imperfect closing can be prevented.

Various storage cases for magnetic tape cassettes are proposed depending on the configuration of the magnetic tape cassette to be stored. Referring to FIG. 48 and FIG. 49, the storage case and the magnetic tape cassette of the related art will be described by way of example.

The storage case 1571 shown in FIG. 48 and FIG. 49 is formed integrally of synthetic resin. The storage case 1571 comprises a storage section 1573 for storing a magnetic tape cassette T, a lid section 1575, and a connecting section 1577 for connecting the storage section 1573 and the lid section 1575 so as to enable the opening-closing motion. The storage section 1573 comprises a first plate portion 1581, and a first sidewall portion 1583 formed integrally along the outer periphery thereof, and the lid section 1575 comprises a second plate portion 1585 and a second sidewall portion 1587 formed integrally along the outer periphery thereof. When the magnetic tape cassette T is appropriately stored in the storage case 1571, the magnetic tape cassette T is fitted in the first sidewall portion 1583 in the state shown by a phantom line in FIG. 49.

On the outsides of the plate portions 1581, 1585, and of the connecting section 1577, there is formed an information sheet holding portion 1601. The information sheet holding portion 1601 is used for storing information sheets 1603 such as a label or a memo on which data or the like relating the magnetic tape cassette T is listed. The information sheet holding portion 1601 is constructed in such a manner that recessed portions 1605 are formed in part on the respective outsides of the plate portions 1581, 1585 and of the connecting section 1577, and almost the whole part of the recessed portions 1605 are covered by a transparent sheet 1607 of flexible synthetic resin.

The sheet 1607 is welded on the plate portions 1581, 1585 at both ends 1607a, 1607b of the recessed portion 1605. Therefore, the information sheet 1603 may be inserted from the opened end of the sheet 1607 and held in the information sheet holding portion 1601, in other words, between the sheet 1607 and the outsides of the plate portions 1581, 1585, and the connecting section 1577.

When the magnetic tape cassette T is stored in the storage case 1571, the information sheet 1603 with data such as the recorded contents or the like is listed thereon is inserted into the information sheet holding portion 1601. In this case, when the information sheet 1603 is small in size, it can be accommodated within the information sheet holding portion 1601. However, when there are many recorded contents to be listed, the information sheet 1603 must be large in size as a matter of course, and thus it cannot be accommodated in the information sheet holding portion 1601 as shown in the figure.

The portion of the information sheet 1603 that cannot be accommodated is bent and deformed outward along the shoulder between the recessed portion 1605 and the plate portions 1581, 1585. The portion of the information sheet 1603 that cannot be accommodated may be damaged or get soiled when the storage case 1571 is carried around. In addition, the same problem may arise when the storage cased 1571 stacked in layers are transported and when it is stored in the rack.

In contrast to it, when the information sheet 1603 is small, the problem of damage or dirt does not arise, but the information sheet 1603 may get hung up at the shoulder between the recessed portion 1605 and the plate portions 1581, 1585 when it is taken out from the information sheet holding portion 1601, and thus there is the problem in that it is difficult to take the information sheet 1603.

In addition, since the transparent sheet 1607 covers almost the entire surface of the recessed portion 1605, the information sheets 1603 when the number of the information sheets increases, it will further be difficult to take the information sheet 1603 out. Therefore, the number of the information sheets 1605 to be held must be reduced, and thus the number of the information sheets that can be held is small.

With such a circumstance in view, it is the second object of the present invention to provide a magnetic tape cassette storage case in which the information sheets relating to the magnetic tape cassette can be kept without giving damage or dirt, in which the information sheets can easily be taken out, and in which many information sheets can be held.

Various types of storage cases for magnetic tape cassettes are proposed according to the configuration of the magnetic tape cassette to be stored. Referring now to FIG. 50 to FIG. 53, the storage case and the magnetic tape cassette for DVCs of the related art will be described by way of example.

The storage case 1850 shown in FIG. 50 comprises a storage section 1701 for storing the magnetic tape cassette 1881 shown in FIG. 51, a lid section 1702 for opening and closing with respect to the storage section 1701 as a book, and a connecting section 1703 for connecting the storage section 1701 and the lid section 1702. The storage section 1701 comprises a first plate portion 1704, a first sidewall portion 1705 formed integrally along the outer periphery of the first plate portion 1704 in the shape of a frame, reel locking ribs 1706a, 1706b formed on the first plate portion 1704 at the positions somewhat closer to the rear side than to the front side, and an opening locking rib 1707 formed on the first plate portion 1704 at the position somewhat closer to the front side in a V-shape in plan view.

The magnetic tape cassette 1881 shown in FIG. 51 is stored in the storage section 1701. When it is properly stored, it is loosely fitted in the first sidewall portion 1705 as shown in a phantom line in FIG. 50.

The lid section 1702 comprises a second plate portion 1708, and a second sidewall portion 1709 formed integrally along three sides of the outer periphery of the second plate portion 1708. The connecting section 1703 comprises the third plate portion 1810. The third plate portion 1810 comprises thin portions 1810a, 1810b on both sides thereof. These thin portions 1810a, 1810b the storage section 1701 and the lid section 1702 to open and close as a book. When the storage case 1850 is closed, the first sidewall portion 1705 and the second sidewall portion 1709 are fitted in parallel with each other in such a manner that the second sidewall portion 1709 is fitted around the outside of the first sidewall portion 1705.

Outside of the first sidewall portion 1705 that defines the storage section 1701, there is provided a first overhanging portion 1704a that is formed by a part of the first plate portion 1704 in an overhanging manner. Therefore, even when the storage section 1701 and the lid section 1702 are closed, and the second sidewall portion 1709 of the lid section 1702 is fitted around the first sidewall portion 1705 of the storage section 1701, the first overhanging portion 1704a prevents the storage section 1701 from getting into the lid section 1702, and thus the thickness of the storage case may be maintained as a whole.

There are formed locking recesses 1705a in a trough shape on the outer wall surface on both sides of the first sidewall portion 1705 and a locking recess 1705b in a trough shape almost at the center of the outer wall surface on the rear side, and locking projections 1709a at the positions on the inner wall surface of the second sidewall portion 1709 corresponding to the locking recesses 1705a and a locking projection 1709b at the position corresponding to the locking recess 1705b.

Therefore, when the storage section 1701 and the lid section 1702 are closed, the locking projection 1709a engages the locking recess 1705a, and the locking projection 1709b engages the locking recess 1706b so as to prevent an accidental opening of the storage section 1701 and the lid section 1702.

The first sidewall portion 1705 is formed with engaging recesses 1811a, 1811b on the first sidewall portion 1705, and the second sidewall portion 1709 is formed with engaging recesses 1811a, 1811b and the same number of positioning ribs 1862a, 1862b on the inner wall surface thereof. When the storage case 1850 is closed, the engaging recesses 1811a, 1811b engage the positioning ribs 1862a, 1862b respectively. This engagement revents the first sidewall portion 1705 and the second sidewall portion 1709 from moving in parallel with each other.

When the storage case 1850 is closed, the positioning ribs 1862a, 1862b are inserted into the engaging recesses 1811a, 1811b respectively for positioning of the members. Therefore, engagement between the locking projections 1709a, 1709b and the locking recesses 1705a, 1706b is ensured, and thus the lid section 1702 can be positioned at the appropriate position.

A plurality of cassette holding members 1813 are formed on the side of the storage section between the inner surface of the first plate portion 1704 and the inner wall surface of the first sidewall section 1705. In the same manner, a plurality of cassette holding members 1814 are formed on the side of the lid section between the inner surface of the second plate portion 1708 and the inner wall surface of the second sidewall portion 1709. When the magnetic tape cassette 1881 is stored in the storage case 1850 by these cassette storage holding members 1813, 1814, and the storage case 1850 is closed, the magnetic tape cassette 1881 will never come into direct contact with the first plate portion 1704 and the second plate portion 1708, and the first sidewall portion 1705 and the second sidewall portion 1709 under normal conditions.

Referring now to FIG. 51, the magnetic tape cassette 1881 will be described. FIG. 51 is a perspective view of the magnetic tape cassette 1881 viewed from the bottom side, and thus the upper cassette half 1883 is shown below the lower cassette half 1885.

There are formed circular openings 1887a, 1887b at two locations on the lower cassette half 1885, and engaging portions 1889a, 1889b integrally formed with the reel hubs (not shown) on which the magnetic tape is wound are exposed therefrom. The engaging portions 1889a, 1889b have a function to unwinding and winding the magnetic tape when it is mounted in the video tape recorder (VTR).

On the front side of the magnetic tape cassette 1881, an outer lid 1891 is provided for pivotal movement, and when it is mounted in the VTR or the like, the magnetic tape is pulled out after the outer lid 1891 is pivoted as shown by the arrow A in FIG. 51. There is formed a recessed front opening 1893 inside the outer lid 1891 at near the center in such a manner that the upper and lower cassette halves 1883, 1885 are notched, and there is provided a shoulder 1895 on one end of the front opening 1893. Both of them perform specific functions when the magnetic tape cassette 1881 is mounted in the VTR.

In order to mount the magnetic tape set 1881 in the storage case 1850, the magnetic tape cassette 1881 is inserted in the first sidewall portion 1705 with the front opening 1893 faced downward, which is the position turned upside down from the position shown in FIG. 51, and with the front opening 1893 faced toward the opening locking rib 1707. Consequently, the magnetic tape cassette 1881 is stored in the storage section 1701 as shown by phantom line in FIG. 50. Then, by overlaying the lid section 1702 on the storage section 1701 by the use of the connecting section 1703 as to close a book, the locking projections 1709a, 1709b engage the locking recesses 1705a, 1706b to close the storage section 1701 and the lid section 1702, and thus the magnetic tape cassette 1881 is protected and prevented dust from entering therein.

The construction of the storage case 1850 and the magnetic tape cassette 1881 and the closing action thereof has been described so far. On the other hand, when the magnetic tape cassette 1881 is used, it is necessary to take the magnetic cassette 1881 from the storage case 1850 by releasing engagement between the locking projections 1709a, 1709b and the locking recesses 1705a, 1706b. In order to take out the magnetic cassette, the storage section 1701 and the lid section 1702 are pulled in the opposite directions with fingers placed on one end of the storage case 1850 as shown by phantom lines in FIG. 52 and FIG. 53. However, the storage case 1850 of the related art has a following problem.

In a state where the storage section 1701 and the lid section 1702 are closed, as shown in FIG. 52, a first overhanging portion 1704a projects from the end of the storage section 1701, and a second overhanging portion 1708a projects from the end of the lid section 1702. The person who tries to open the storage case 1850, or the user, places his/her thumbs in about the center of the storage case 1850, or in the vicinity of the position where the locking projection 1709b and the locking recess 1706b are engaged, and pulls them in the opposite directions with his/her thumbs hooked on the first and second overhanging portions 1704a, 1708a as shown in FIG. 52 and FIG. 53 by phantom lines.

When such a pulling operation is performed, the locking projection 1709b gets out of the locking recess 1706b, and at almost the same time with it, the locking projection 1709a gets out of the locking recess 1705a and the storage case 1850 is opened. However, a force is required to release engagement between the locking projection 1709b and the locking recess 1706b, and when a force is exerted by thumbs, apart of the second sidewall portion 1709 are pressed in the direction shown by an arrow a in FIG. 52. As a consequent, there is a problem in that the locking projection 1709b is pressed toward the locking recess 1706b and thus the storage case 1850 resists being opened on the contrary.

In order to solve this problem, a measure to eliminate the locking projection 1709b and the locking recess 1706b is conceivable. However, in such a construction, engagement between the storage section 1701 and the lid section 1702 becomes loose, which may result in another problems such as accidental opening of, and increase in possibility of entering of dust or the like into, the storage case 1850. Since dust attached on the magnetic tape may cause a drop out of signals during recording and playing, it is necessary to lock the storage section 1701 and the lid section 1702 tightly.

With such a problem in view, the third object of the present invention is to provide a magnetic tape cassette storage case which is superior in hermeticity between the storage section and the lid section, and which is easy to open and close.

Various types of storage cases for magnetic tape cassettes are proposed depending on the configuration of the magnetic tape cassette to be stored. Referring now to FIG. 54 to FIG. 57, a storage case and a magnetic tape cassette for DVCs of the related art will be described by way of example.

The storage case 2150 shown in FIG. 54 comprises a storage section 1901 for storing the magnetic tape cassette 2081 shown in FIG. 55, a lid section 1902 for covering the storage section 1901, and a connecting section 1903 for connecting the storage section 1901 and the lid section 1902. The storage section 1901 comprises a first plate portion 1904, a first sidewall portion 1905 formed integrally along the outer periphery of the first plate portion 1904, reel engaging ribs 1906a, 1906b formed on the first plate portion 1904 at the positions somewhat closer to the rear side than to the front side, and a rib 1907 formed on the first plate 1904 at the position somewhat closer to the front side in a V-shape in cross section. When the magnetic tape cassette 2081 shown in FIG. 55 is properly stored, it is loosely fitted in the first sidewall portion 1905 as shown by a phantom line in FIG. 54.

The lid section 1902 comprises a second plate portion 1908 and a second sidewall portion 1909 formed integrally along three sides of the outer periphery of the second plate portion 1908. The connecting section 1903 comprises thin portions 2010a, 2010b formed on both sides of the third plate portion 2010, which enables the storage section 1901 and the lid section 1902 to close as a book. When the storage case 2150 is closed, the second sidewall portion 1905 and the second sidewall portion 1909 are fitted in parallel with each other.

Outside of the first sidewall portion 1905 that defines the storage section 1901, there is provided an overhanging portion 1904a that is formed by a part of the first plate portion 1904 in an overhanging manner. Therefore, even when the storage section 1901 and the lid section 1902 are closed, and the second sidewall portion 1909 of the lid section 1902 is fitted around the first sidewall portion 1905 of the storage section 1901, the overhanging portion 1904a prevents the storage section 1901 from getting into the lid section 1902, and thus the thickness of the storage case may be maintained as a whole. The outer surface of the first sidewall portion 1905 is formed with a recessed locking portion 1905a and the inner side surface of the second sidewall portion 1909 is formed with a locking projection 1909a at the position corresponding to the locking portion 1905a when the storage section 1901 and the lid section 1902 are closed. Therefore, when the storage section 1901 and the lid section 1902 are closed, the locking projection 1909a engages the locking portion 1905a to prevent an accidental opening of the storage section 1901 and the lid section 1902.

The first sidewall portion 1905 is formed with engaging recess 2011a, 2011b, and the inner surface of the second sidewall portion 1909 is provided with the same number of positioning ribs 2062a, 2062b as the engaging recesses. When the case is closed, the engaging recess 2011a engages with the positioning rib 2062a. In the same manner, the engaging recess 2011b engages with the positioning rib 2062b. Such engagement prevents the first sidewall portion 1905 and the second sidewall portion 1909 from moving in parallel with each other. When the case is closed, the positioning ribs 2062a, 2062b are inserted into the engaging recesses 2011a, 2011b for positioning between members. Therefore, engagement between the locking projections 1909a, 1909b and the locking portions 1905a, 1905b is ensured, and thus the lid section 1902 can be positioned at the appropriate position.

A plurality of cassette holding members 2013 are formed on the side of the storage section between the inner surface of the first plate portion 1904 and the inner surface of the first sidewall portion 1905. In the same manner, a plurality of cassette holding member 2014 are formed on the side of the lid section between the inner surface of the second plate portion 1908 and the inner surface of the second sidewall portion 1909. When the magnetic tape cassette is stored in the storage case 2050 by these cassette holding members 2013 and 2014, and the storage case 2050 is closed, the magnetic tape cassette will never come into direct contact with the first plate portion 1904 and the second plate portion 1908, and the first sidewall portion 1905 and the second sidewall portion 1909 under normal conditions.

Referring now to FIG. 55, the magnetic tape cassette 2081 is described. FIG. 55 is a perspective view of the magnetic tape cassette 2081 viewed from the bottom side, and thus the upper cassette half 2083 is shown below the lower cassette half 2085. There are formed circular openings 2087a, 2087b at two locations on the lower cassette half 2085, and engaging portions 2089a, 2089b integrally formed with the reel hubs (not shown) on which the magnetic tape is wound are exposed therefrom. The engaging portions 2089a, 2089b have a function to unwinding and winding the magnetic tape when it is mounted in the video tape recorder (VTR).

On the front side of the magnetic tape cassette 2081, an outer lid 2091 is provided for pivotal movement, and when it is mounted in the VTR or the like, the magnetic tape is pulled out after the outer lid 2091 is pivoted as shown by the arrow A in FIG. 55. There is formed a recessed front opening 2093 inside the outer lid 2091 at near the center in such a manner that the upper and lower cassette halves 2083, 2085 are notched, and there is provided a shoulder 2095 on one end of the front opening 2093.

In order to mount the magnetic tape cassette 2081 in the storage case 2150, the magnetic tape cassette 2081 is inserted in the first sidewall portion 1905 with the front opening 2093 faced downward, which is the position turned upside down from the position shown in FIG. 55, and with the front opening 2093 faced toward the rib 1907.

In such a storage case described above, when a instantaneous or continuous pressing force acts upon the second plate portion 1908 of the lid section 1902 in the vertical direction in the state that the storage case is closed, the following phenomenon is observed.

In a first place, a resilient deformation occurs on the second plate portion 1908. The resilient deformation is, for example, a deformation shown by dashed lines in FIG. 56. As is apparent from FIG. 56, such deformation hinders parallel fitting between the second sidewall portion 1909 on the lid section 1902 and the first sidewall section 1905 on the storage section 1901, thereby hindering engagement between the positioning ribs 2062a, 2062b and the engaging recesses 2011a, 2011b respectively. In other words, as a result of the resilient deformation, as shown in FIG. 57, the second sidewall portion 1909 and the positioning ribs 2062a, 2062b are shifted outwardly with respect to the storage case 2150 (in the direction shown by the arrow Dr in FIG. 57) and deformed, so that imperfect engagement between the positioning ribs 2062a, 2062b and the engaging recesses 2011a, 2011b occurs. In addition, as a result of the pressing force and the imperfect engagement described above, a phenomenon that the lid section 1902 abnormally gets into the storage section 1901 occurs. The resilient deformation is obvious in the direction longitudinally of the storage case. When it is further pressed, deformation along the shorter dimension as well, thereby the entire storage case 2150 suffers from deformation.

In addition, when the deformed state of the storage case 2150 continues for a long time, each member is plastically deformed, and thus restoration to the normal state may become impossible. In other words, the entire storage case 2150 may be deformed permanently, and thus it may cause troubles in hermeticity, engaging performance, cassette storing capability of the storage case 2150 that used to be satisfactory.

With such a circumstance in view, it is the fourth object of the present invention to provide a storage case in which a shift or deformation of the sidewall portion resulting from resilient deformation of the members may be prevented.

Various types of storage cases for magnetic tape cassettes are proposed depending on the configuration of the magnetic tape cassette to be stored. Referring now to FIG. 58 and FIG. 59, the storage case and the DVC used in the broadcasting station of the related art will be described by way of example.

The storage case 2350 shown in FIG. 58 comprises a storage section 2201 for storing the magnetic tape cassette 2381 shown in FIG. 59, the lid section 2202 for covering the storage section 2201, and a connecting section 2203 for connecting the storage section 2201 and the lid section 2202 for pivotal movement. The storage section 2201 comprises a first plate portion 2204, a first sidewall portion 2205 formed integrally along the outer periphery of the first plate portion 2204, reel locking ribs 2206a, 2206b formed on the first plate portion 2204 at the positions somewhat closer to the rear side than to the front side, and a opening locking rib 2207 formed on the first plate 2204 at the position a bit close to the front side in a V-shape in cross section. When the magnetic tape cassette 2381 shown in FIG. 59 is properly stored, it is fitted in the first sidewall portion 2205 as shown by a phantom lien in FIG. 58.

The lid section 2202 comprises a second plate portion 2208 and a second sidewall portion 2209 formed integrally along three sides of the outer periphery of the second plate portion 2208. The connecting section 2203 comprises thin portions 2310a, 2310b formed on both sides of the third plate portion 2010, which enables the storage section 2201 and the lid section 2202 to close as a book. When the storage case 2350 is closed, the first sidewall portion 2205 and the second sidewall portion 2209 are fitted in parallel with each other.

Outside of the first sidewall portion 2205 that defines the storage section 2201, there is provided an overhanging portion 2204a that is formed by a part of the first plate portion 2204 in an overhanging manner. Therefore, even when the storage section 2201 and the lid section 2202 are closed, and the second sidewall portion 2209 of the lid section 2202 is fitted around the first sidewall portion 2205 of the storage section 2201, the overhanging portion 2204a prevents the storage section 2201 from getting into the lid section 2202, and thus the thickness of the storage case may be maintained as a whole.

The outer surface of the first sidewall portion 2205 is formed with a recessed locking portion 2205a and the inner side surface of the second sidewall portion 2209 is formed with a locking projection 2209a at the position corresponding to the locking portion 2205a when the storage section 2201 and the lid section 2202 are closed. Therefore, when the storage section 2201 and the lid section 2202 are closed, the locking projection 2209a engages the locking portion 2205a to prevent an accidental opening of the storage section 2201 and the lid section 2202.

The first sidewall portion 2205 is formed with an engaging recess 2311a, 2311b, and the inner surface of the second sidewall portion 2209 is provided with the same number of positioning ribs 2362a, 2362b as the engaging recesses. When the storage case is closed, the engaging recesses 2311a, 2311b engage with the positioning ribs 2362a, 2362b. Such engagement prevents the first sidewall portion 2205 and the second sidewall portion 2209 from moving in parallel with each other. When the storage case is closed, the positioning ribs 2362a, 2362b are inserted into the engaging recesses 2311a, 2311b for positioning between members. Therefore, engagement between the locking projections 2209a, 2209b and the locking portions 2205a, 2205b is ensured, and thus the lid section 2202 can be positioned at the appropriate position.

A plurality of cassette holding members 2313 are formed on the side of the storage section between the inner surface of the first plate portion 2204 and the inner surface of the first sidewall portion 2205. In the same manner, a plurality of cassette holding member 2314 are formed on the side of the lid section between the inner surface of the second plate portion 2208 and the inner surface of the second sidewall portion 2209.

Referring now to FIG. 59, the magnetic tape cassette 2381 is described. FIG. 59 is a perspective view of the magnetic tape cassette 2381 viewed from the bottom side, and thus the upper cassette half 2383 is shown below the lower cassette half 2385. There are formed circular openings 2387a, 2387b at two locations on the lower cassette half 2385, and reference rings 2389a, 2389b that is a dimension standard formed on the lower reel of the tape reels with the magnetic tape wound thereon.

On the front side of the magnetic tape cassette 2381, an outer lid 2391, an top lid 2397, and an inner lid (not shown) are provided for pivotal movement, and when it is mounted in the VTR or the like, the magnetic tape is pulled out after the outer lid 2391 is pivoted as shown by the arrow A in FIG. 59. There is formed a recessed front opening 2393 inside the outer lid 2391 at near the center in such a manner that the upper and lower cassette halves 2383, 2385 are notched, and there is provided a shoulder 2395, which is a recessed portion having generally the shape of a section at one end of the front opening 2393. The shoulder 2395 is formed at the rear of the cassette with respect to the top lid 2397.

In order to mount the magnetic tape cassette 2381 in the storage case 2350, the magnetic tape cassette 2381 is fitted within the sidewall portion 2205 as shown in FIG. 58 by a phantom line in such a manner that the front opening 93 is faced toward the opening locking rib 2207, and the reel locking ribs 2206a, 2206b are pushed to be inserted within the circular engaging holes B formed at the centers of the hubs of the tape reels, whereby the magnetic tape cassette 2381 is stored in the storage case 2350.

However, in the structure of the storage case 2350 described above, the following problem was recognized when the magnetic tape cassette 2381 is stored. As shown in FIG. 60, in the case where the magnetic tape cassette 2381 is inserted upside down, the top lid 2397 may be compressed by the opening locking portion 2207a of the opening locking rib 2207. When the top lid 2397 is compressed, the top lid 2397, and thus the outer lid 2391 and the inner lid (not shown) connected to the top lid may be deformed. When it is compressed with a force, these lids may be damaged. Since these lid serves to cover the magnetic tape for protection, deformation of these lids may give damage to the magnetic tape.

As shown in FIG. 61, even in a state in which the magnetic tape cassette 2381 is properly inserted, the tape reel 2410 may be displaced in case of drop in such a state. Then, the reel locking ribs 2206a, 2206b come into collision with the engaging hole B formed on the hub 2415 of the tape reel 2410, and thus the reel locking ribs 2206a, 2206b are subjected to an excessive load. When such an excessive load is applied repeatedly, there may be a case where the reel locking rib may be broken.

With such a circumstance in view, the fifth object of the present invention is to provide a storage case in which deformation that may be occurred when it is subjected to an impact in case of a drop can be prevented as well as, deformation of the lid can be prevented even when the magnetic tape cassette is inserted in a wrong way.

Recent years, a compact digital video camera of good portability came into wide use as a TV camera exclusively used for recording coverage. This type of camera is compact in size, but high-quality pictures can be obtained by processing digital signal. Therefore, it is widely used as equipment for business use among cameramen for broadcasting station or specialists for recording coverage.

The DVC to be used in the portable digital video camera come in three sizes being different in recording time period, and sold in the dedicated cassette storage case.

The magnetic tape cassette such as the DVC or the like described above are in many cases used for recording covered scenes, or brought to the broadcasting station as a material for editing/rerecording, and thus contains important pictures or scenes recorded therein. Therefore, it is preferable to store the recorded contents or the details to be consulted at the worksite together with the magnetic tape cassette. By organizing in this way, information on the recorded contents of the magnetic tape cassette or other related information, for example, on the site or the like can be checked out easily with the recorded contents later at the meeting.

Generally, this type of information in association with the recorded contents are shown by adhering a label on the magnetic tape cassette and the storage case, or by inserting a sheet of paper or information sheets such as a leaflet on which the recorded contents are listed in a space in the storage case. However, since the thickness of the space in the storage case is only as small as the thickness of the magnetic tape cassette, the amount of information sheets that can be stored with the magnetic tape cassette is small.

Accordingly, in Japanese Patent Application No. 230835/1998, the applicant of the present invention proposes a magnetic tape cassette storage case in which a storage section for storing the magnetic tape cassette, a lid section having a peripheral wall surrounding the storage section, and a connecting section for connecting the storage section and the lid section so as to be able to close and open are integrally formed of synthetic resin, and holding ribs are formed on the inner surface of the peripheral wall of the lid section on both sides for holding the magnetic tape cassette between itself and the bottom wall of the storage section by coming into contact with the peripheral edge on the surface of the magnetic tape cassette when the magnetic tape cassette is stored, and a sheet-holding rib is formed on at least one of holding ribs for holding one end of the information sheet between itself and the top plate, or the second plate portion of the lid section.

According to this magnetic tape cassette storage case, the information sheet can be stored in the storage case without jumping out, dropping off, or overhanging by clamping the end of the information sheet between the sheet-holding rib and the top plate when the information sheet is stored.

When such a magnetic tape cassette storage case is formed by injection molding, the holding rib with an undercut portion is molded by a slide core or a rocking core.

However, the direction of cutting or rocking of the core is the direction toward the center of the metal mold (inward of the metal mold), the core have to enter into the metal mold significantly toward the center thereof. In addition, when the overhanging amount of the undercut portion of the holding rib in association with the sheet-holding rib is significant, the line formed at the junction between the core and the metal mold extends to the center of the top plate of the lid of the magnetic tape cassette storage case. Therefore, for the storage case for transparent magnetic tape cassette, the appearance and the interior visibility may be spoiled.

Accordingly, the present invention is directed to solve the problem described above, and thus it is the sixth object to provide a less expensive metal mold for magnetic tape cassette storage cases and a magnetic tape cassette storage case with preferable appearance and interior visibility.

There are various types of magnetic tape cassettes, and the one used in the digital video camera described above is called DVC.

A magnetic tape cassette storage case used in the related art (storage case for DVCs) is shown in FIG. 62 by way of example. The storage case 2580 comprises a storage section 2581 for storing the magnetic tape cassette M, and a lid section 2591 connected to the storage section 2581 via a connecting section including the plate portion 2590 and the thin portion 2589. The storage section 2581 comprises a bottom plate 2582, or a first plate portion, having a plurality of mounting projections 2587, 2588 on the inner surface (upper surface in the figure) according to the recessed shape of the magnetic tape cassette M, and sidewalls 2583, 2583 and an end wall 2584, or a first sidewall portion, standing along the periphery of the bottom plate 2582 for fitting the magnetic tape cassette A. The upper end and the outer surface of the sidewall 2583 are formed with a positioning notch 2585 and a locking recess 2586 respectively for engaging the lid section 2591.

The lid section 2591 comprises a top plate 2592, or a second plate portion, and sidewalls 2593, 2593, and an end wall 2594, or the second sidewall portion, standing on the inner surface, or the surface opposing to the storage section 2581 of the top plate 2592 for fitting around the sidewall 2583 and the end wall 2584 of the storage section 2581. The inner surface of the sidewall 2593 is formed with a positioning rib 2595 and a locking claw 2596 for engaging the positioning notch 2585 and the locking recess 2586 of the storage section 2581 respectively. The inner surface of the sidewall 2593 is formed with a supporting rib 2597 having a bevel 2597a. The supporting rib 2597 supports the magnetic tape cassette M by the bevel 2597a when the magnetic tape cassette M is stored in the storage section 2581 and the lid section 2591 is closed.

The positioning rib 2595 and the supporting rib 2597 are in contact with the top plate 2592 at one end, and extend along the sidewall 2693. In contrast to it, the locking claw 2596 is provided near the distal end of the sidewall 2593 and is not in contact with the top plate 2592.

The storage case 2580 is molded by injection molding or the like. The metal mold comprises a main body of the metal mold, or the movable die for molding the inner side of the storage case 2580, and a fixed die for molding outside of the storage case 2580. The metal mold comprises a cavity for undercut portion on its side surface for molding a undercut portion such as a locking claw 2596 or the like, an ejector pin that inclines while ejecting the molded article out from the movable die by its tip surface (hereinafter referred to as "inclining pin"), and a slide core. While the inclining pin is inclining, the undercut portion is ejected from the cavity on the side surface of the inclining pin.

In the magnetic tape cassette storage case 2580 or the magnetic tape cassette storage case similar to the case 2580 of which the heights of the sidewall 2593 and the end wall 2594 of the lid section 2591 are in excess of a prescribed value, mold breathing tends to be worsened. This tendency is obvious especially for the storage case for the magnetic tape cassettes of which the heights of the sidewall 249 and the end wall 2594 of the lid section 2591 are not less than 6 mm, though it depends on the width of the gas bent or the position where the gas bent is disposed. Even when the heights of the sidewall 93 and the end wall 94 are less than 6 mm, imperfect mold breathing occurred.

When mold breathing is insufficient, bubbles are trapped in the sidewall 2593 of the storage case, which spoils the appearance of the transparent magnetic tape cassette storage case formed especially of polypropylene or the like.

With such a problem in view, it is the seventh object of the present invention to provide a metal mold for the storage cases for magnetic tape cassettes with good breathing, and a magnetic tape cassette storage case of good appearance that can be molded by the metal mold described above.

DISCLOSURE OF THE INVENTION

The first object of the present invention is achieved by providing a magnetic tape cassette storage case comprising:
a storage section for storing a magnetic tape cassette;
a lid section for covering the storage section; and
a connecting section for connecting the storage section and the lid section so as to enable the opening-closing motion;
the storage section and the lid section each including a plate portion and a sidewall portion provided along the outer periphery of the plate portion;
the sidewall portion of the lid section being fitted along the outside of the sidewall portion of the storage section so that an locking portion formed inside of the sidewall portion of the lid section engages an locked portion formed on the outside of the sidewall portion of the storage section when the storage section and the lid section are closed;
characterized in that a notch having at least the same height as the sidewall portion of the storage section is formed on the inner side of the sidewall portion of the lid section at the end near the connecting section.

In the storage case of the structure described above, even when the sidewall portion of the lid section is subjected to a pressurizing force and thus deflected, the notch formed on the inner end of the sidewall portion of the lid section at the end near the connecting section abuts against the sidewall portion of the storage section to allow the sidewall portion of the lid section to be fitted on the outside of the sidewall portion of the storage section when the storage section and the lid section are closed.

Therefore, the notch can prevent imperfect closing of the storage case.

Here, the notch is preferably a bevel of a flat surface.

The second object of the present invention is achieved by providing a magnetic tape cassette storage case comprising:
a storage section for storing a magnetic tape cassette; a lid section for covering the storage section; and a connecting section for connecting the storage section and the lid section so as to enable the opening-closing motion formed integrally of synthetic resin; characterized in that a rib is provided along the periphery of the outside surface of at least one of the storage section and the lid section; in that the outside surface surrounded by the rib is formed into a flat portion; and in that an information sheet holding portion is provided by welding opposite sides of a transparent sheet on the outside surface so as to cover a part of the flat portion.

The storage case is provided with a rib along the periphery of the outside surface of at least one of the storage section for storing the magnetic tape cassette and the lid section, and the portion surrounded by the rib is formed into a flat portion and a part of the flat portion is covered by the transparent sheet to form a information sheet holding portion.

Therefore, the information sheet on which the recorded contents or the like relating to the magnetic tape cassette may be held between the flat portion and the transparent sheet, in other words, in the information sheet holding portion. In addition, since the information sheet held therein runs along the flat portion, deformation can be prevented, and the number of the information sheets to be held can be increased according to the height of the rib.

In the present invention, covering a part of the flat portion by the transparent sheet means that a part that is not covered by the transparent sheet exists to the extent that the information sheet is not hindered from being taken out.

The rib to be provided along the periphery of the plate portion may not be provided all around the periphery as far as it can prevent the sheet from coming into contact with the surface on which the storage case is placed when it is placed thereon. The rib may be provided respectively along the three sides of the plate portion, or along the two opposite sides of the plate portion all the way or in part.

The third object of the present invention is achieved by providing a magnetic tape cassettes storage case comprising:
a storage section for storing a magnetic tape cassette;
a lid section for covering the storage section;
a connecting section for connecting the storage section and the lid section so as to enable the opening-closing motion;
the storage section including a first plate portion, a first sidewall portion provided along the outer periphery of the first plate portion, a locking recess provided on the outer wall surface of the first sidewall portion, and a first overhanging portion overhanging outwardly from the first sidewall portion;
the lid section including a second plate portion, a second sidewall portion provided along the outer periphery of the second plate portion, a locking projection provided on the inner wall surface of the second sidewall portion, and a second overhanging portion overhanging outwardly from the second sidewall portion; and
the second sidewall portion being fitted along the outside of the first sidewall portion so that the locking recess and the locking projection are engaged when the lid section is covered on the storage section;
characterized in that a part of the second sidewall portion, and at least the portion on which the locking projection is provided is formed to be flush with the first overhanging portion and the second overhanging portion.

According to the magnetic tape cassette storage case of the structure described above, when the storage case is closed by covering the lid section on the storage section, the locking projection on the second sidewall portion provided along the outer periphery of the second plate portion engages the locking recess on the first sidewall portion provided along the outer periphery of the first plate portion.

Though the end portions of the first and second plate portion project as a first and second overhanging portion on the closed surface, the portion of the second sidewall portion on which the locking projection is provided is formed as a thick portion, and thus the portion where the locking projection and the locking recess engage is flush with the first and second overhanging portion.

Therefore, since the fingers are not placed on the thick portion to open the storage case and the thick portion resists deformation of the second wall portion, the storage case can easily be opened.

It is also possible to provide a locking projection at the end of the second sidewall portion where the thick portion is provided, and to provide a locking recess at the end of the first plate portion at the location corresponding to the locking projection when the lid section is covered on the storage section.

In this arrangement, the portion where the locking projection is provided is formed into a thick portion, and the locking projection provided on the second sidewall portion engages at an end of the first plate portion, in other words the locking recess provided on the overhanging portion. Therefore, when the storage case is opened, engagement between the locking projection and the locking recess prevents deflected deformation of the second sidewall portion, and thus the multiplier effect with the thick portion enables easier opening of the storage case.

Alternatively, it is also possible to provide a plurality of locking projection in the vicinity of the end portion of the second wall portion, or of the portion where the thick portion is provided, and to provide a locking recess at one end of the first plate portion at the location corresponding to the plurality of locking projection when the storage section is covered by the lid section.

In this arrangement, the portion where the locking projection is provided is formed into a thick portion and a plurality of locking projection provided on the second sidewall portion engage one end of the first plate portion, in other word, a plurality of locking recesses provided on the overhanging portion. Therefore, even when a force is applied to the second sidewall portion by the fingers to open the storage case, engagement between a plurality of locking projection and the locking recess prevents deflected deformation of the second sidewall portion, and thus the multiplier effect with the thick portion enables easier opening of the storage case.

The third object of the present invention is achieved by providing a magnetic tape cassette storage case comprising:

a storage section for storing a magnetic tape cassette;

a lid section for covering the storage section;

a connecting section for connecting the storage section and the lid section so as to enable the opening-closing motion;

the storage section including a first plate portion, a first sidewall portion provided along the outer periphery of the first plate portion, a locking recess provided on the outer wall surface of the first sidewall portion, and a first overhanging portion overhanging outwardly from the first sidewall portion;

the lid section including a second plate portion, a second sidewall portion provided along the outer periphery of the second plate portion, a locking projection provided on the inner wall surface of the second sidewall portion, and a second overhanging portion overhanging outwardly from the second sidewall portion; and the second sidewall portion being fitted along the outside of the first sidewall portion so that the locking recess and the locking projection are engaged when the lid section is covered on the storage section;

characterized in that a part of the first overhanging portion and the second overhanging portion and at least the portion on which the locking recess and the locking projection are provided is formed to be flush with the sidewall portion.

According to the magnetic tape cassette storage case in the arrangement described above, when the storage case is close by covering the lid section on the storage section, the locking projection of the second sidewall portion provided along the outer periphery of the second plate portion engages the locking recess of the first sidewall portion provided along the outer periphery of the first plate portion.

Though the end portions of the first and second plate portions project from the closed surface as a first and second overhanging portions, the portion on which the locking recess on the first sidewall portion and the locking projection of the second sidewall portion are notched. Therefore, the first and second overhanging portions are eliminated at the portion where the locking projection and the locking recess are engaged, and thus they are flush with each other.

Therefore, since the fingers are not placed on the notched portion to open the storage case, the storage case can easily be opened.

The third object of the present invention is achieved by providing a storage case for magnetic tape cassettes comprising:

a storage section for storing a magnetic tape cassette;

a lid section for covering the storage section;

a connecting section for connecting the storage section and the lid section so as to enable the opening-closing motion;

the storage section including a first plate portion, a first sidewall portion provided along the outer periphery of the first plate portion, a locking projection provided on the outer periphery of the first plate portion and protecting inwardly, and a first overhanging portion overhung outwardly from the first sidewall portion;

the lid section including a second plate portion, a second sidewall portion provided along the outer periphery of the second plate portion, a locking recess provided on the outer wall surface of the second sidewall portion, and a second overhanging portion projecting from the second sidewall portion toward the outer periphery;

characterized in that the second sidewall portion is fitted around the outside of the first sidewall portion and the locking projection and the locking recess engages when the lid section is covered on the storage section.

According to the magnetic tape cassette storage case of the structure described above, when the storage case is closed by covering the lid section on the storage section, the locking recess provided on the outer wall surface of the second sidewall portion engages the locking projection provided on the outer periphery of the first plate portion and projecting inwardly.

Therefore, when the second sidewall portion is pressurized to open the storage case, the locking projection and the locking recess do not engage, and thus the storage case can easily be opened.

The fourth object of the present invention is achieved by providing a magnetic tape cassette storage case comprising:

a storage section for storing a magnetic tape cassette;

a lid section for covering the storage section;

connecting section for connecting the storage section and the lid section so as to enable the opening-closing motion;

the storage section including a first plate portion and a first sidewall portion provided along the outer periphery of the first plate portion;

the lid section including a second plate portion and a second sidewall portion provided along the outer periphery of the second plate portion;

the second sidewall portion being provided with at least one positioning rib on the inner surface thereof; and the second sidewall portion being provided with an engaging recess for engaging with the positioning rib when the lid section is covered on the storage section;

characterized in that the positioning rib includes a fitting portion formed inwardly with respect to the lid section and being longer than the longitudinal length of the positioning rib, so that the fitting portion abuts against the first sidewall portion when the lid section is covered on the storage section.

According to this arrangement of the present invention, even when a force is applied to the second plate portion and causes a resilient deformation when the case is in the closed state, since the positioning rib, and thus the fitting portion being integral with the second sidewall portion, abuts against the inner surface of the first sidewall portion, the positioning rib will not be shifted or deformed outwardly of the first sidewall portion.

Therefore, shift or deformation of the second sidewall portion will not be generated. In addition, the lid section is prevented from digging into the storage section.

In the storage case described above, it is needless to say that various types of locking mechanisms for preventing accidental opening of the storage section and the lid section can be employed, and specifically, a construction in which locking is made on the sidewall portion that opposes to the connecting section in parallel when the lid is closed is also included.

The fourth object is achieved by providing a magnetic tape cassette storage case comprising:

a storage section for storing the magnetic tape cassette;

a lid section for covering the storage section;

a connecting section for connecting the storage section and the lid section so as to enable the opening-closing motion;

the storage section including a first plate portion and a first sidewall portion provided along the outer periphery of the first plate portion;

the lid section including a second plate portion and a second sidewall portion provided along the outer periphery of the second sidewall portion; and the first sidewall portion including an overhanging portion overhanging outwardly from the first sidewall portion;

characterized in that a fitting groove in which the edge of the second sidewall portion is fitted is formed on the overhanging portion.

In the structure of the present invention described above, even when a force is applied to the second plate portion and causes a resilient deformation when the case is in the closed state, since the edge of the second wall portion and the fitting groove are fitted, the fitted portion serves as an element to prevent the outward movement. Therefore, the second wall portion resists deformation, and thus the second wall portion will not be shifted outwardly with respect to the entire case.

As a consequent, the lid section can be prevented from digging into the storage section. This characteristic brings about the same effect when a pressurizing force is applied to the first plate portion.

In this storage case, it is needless to say that various types of locking mechanisms can be employed, and specifically, a construction in which locking is made on the sidewall portion that opposes to the connecting section in parallel when the lid is closed in also included.

Providing the locking mechanism on the sidewall portion that opposes to the connecting section in parallel when the lid is closed can prevent the storage case from irregular opening. Preventing irregular opening can prevent the first sidewall portion and the second sidewall portion from accidental resilient deformation, and thus shift or deformation of the sidewall portion of the storage case caused by the resilient deformation may be prevented.

According to the present invention, the magnetic tape cassette storage case having the characteristics described above is proposed. It is needless to say that this magnetic tape cassette storage case has both of the advantages described above.

The fifth object of the present invention is achieved by providing a magnetic tape cassette storage case comprising:

a storage section for storing the magnetic tape cassette;

a lid section for covering the storage section;

a connecting section for connecting the storage section and the lid section so as to enable the opening-closing motion; and the storage section including a plate portion and a sidewall portion provided along the outer periphery of the plate portion;

characterized in that the plate portion is formed with a reel locking rib for engaging the engaging hole on the hub of the tape reel and a recess locking rib for engaging the recess formed at the rear of the cassette with respect to the lid of the lower cassette half;

in that the recess locking rib is set to the height lower than the height of the reel locking rib;

in that where the distance between the reference ring of the lower reel constituting the tape reel and the circular opening that corresponds to the outer periphery of the reference ring and formed on the lower cassette half is b, and the distance between the engaging hole of the hub and the reel locking rib is a, the relation is a>b;

in that the distance c from the both side surfaces of the cassette and the rear surface of the cassette to the sidewall portion of the storage section facing to these respective surfaces and the distance c between the recess and the recess locking rib are set to the same value.

According to the structure of the present invention described above, since the recess locking rib that engages the recess of the lower cassette half when the cassette is properly inserted is formed at the rear of the cassette with respect to the lid, even when the cassette is inserted upside down by mistake, it does not abut against the lid that covers the magnetic tape.

Therefore, since the lid and the recess locking rib do not abut against each other even when the user inserted the cassette into the storage section of the storage case in a wrong way, deformation and damage of the lid can be prevented and thus the magnetic tape is protected.

The height of the recess locking rib is set to the height lower than the reel locking rib for locking the hub of the reel on which the magnetic tape is wound.

Therefore, since the height of the recess locking rib 15 not that high, even when the user inserted the cassette into the storage section of the storage case in the proper orientation but in the state of being shifted from the proper position in the direction B by mistake, deformation and damage of the lid (inner lid) is prevented. In addition, even when the cassette is inserted into the storage section of the storage case upside down and in the state of being shifted in the fro-and-aft direction from the proper position, deformation and damage of the lid (top lid) is prevented.

The distance b between the reference ring of the lower reel and a circular opening formed on the lower cassette half is set to the smaller value than the distance a between the engaging hole of the hub and the reel engaging rib.

Therefore, even when the storage case with the cassette stored drops, the reel reference ring comes into collision with the wall of the circular opening of the lower cassette half in the first place to absorb the impact, whereby excessive load is not applied to the reel locking rib.

Since the distance c from the both side surface of the cassette and the rear surface of the cassette to the sidewall portion of the storage section opposing to these surfaces, and the distance c between the recess and the recess locking rib are the same value, the clearance where the storage case and the cassette come into contact is uniform.

Therefore, since a load applied under vibration is uniform, the occurrence of scratches or powder due to rubbing between the storage case and the cassette can be dispersed.

The sixth object of the present invention is achieved by a metal mold for magnetic tape cassette storage cases comprising:

a storage section for storing a magnetic tape cassette, a lid section including a peripheral wall surrounding the storage section, a connecting section for connecting the storing section and the lid section so as to enable opening-and-closing motion integrally formed of synthetic resin, at least one holding rib that abuts the peripheral edge of the surface of the magnetic tape cassette when the magnetic tape cassette is stored for holding the magnetic tape cassette between itself and the plate portion of the storage section being formed on the inner surface of the peripheral wall of the lid section, and an overhanging sheet holding rib extending inwardly of the peripheral wall for holding the sheet end of the information sheet between itself and the plate portion of the lid section being formed on at least one of the holding ribs, characterized in that a rib-molding core for forming the holding rib accompanied by a sheet holding rib is provided on the movable die for forming the inner side of the magnetic tape cassette storage case so as to be able to project therefrom, and to pivot in the direction along the peripheral wall when it is projected from the movable die.

According to the metal mold for magnetic tape cassette storage case of the present invention, since the direction of the pivotal movement of the rib-molding core when it is projected from the movable die runs along the peripheral wall of the magnetic tape cassette storage case, the line formed at the junction between the rib-molding core and the meal mold is formed along the sidewall of the magnetic tape cassette storage case. Therefore, the line at the junction between the rib-molding core and the metal mold extending to the center of the magnetic tape cassette storage case is not formed, thereby preventing the appearance and the interior visibility from being spoiled.

Since the sheet holding rib is generally thin for the extent of projection, the extent of overhang of the under cut is small, and thus the extent of pivotal movement of the rib-molding core may be small and the metal mold may be manufactured at low cost.

The rib-molding core according to the present invention may be a core specially constructed for molding the holding rib accompanied by a sheet holding rib, or it may also serve as a pushing pin for releasing the molded article from the metal mold. In the latter case, the molding surface for molding the holding rib is formed on the side surface of the distal end of the pushing pin.

The sixth object of the present invention is achieved by providing a magnetic tape cassette storage case comprising:

a storage section for storing a magnetic tape cassette;

a lid section having a peripheral wall surrounding the storage section;

a connecting section for connecting the storage section and the lid section so as to enable the open-and-close motion integrally molded of synthetic resin;

at least one holding rib that abuts the peripheral edge of the surface of the magnetic tape cassette when the magnetic tape cassette is stored for holding the magnetic tape cassette between itself and the plate portion of the storage section being formed on the inner surface of the peripheral wall of the lid section, and an overhanging sheet holding rib extending inwardly of the peripheral wall for holding the sheet end of the information sheet between itself and the plate portion of the lid section being formed on at least one of the holding ribs, characterized in that the holding rib accompanied by the sheet holding rib is formed with a seat at the proximal end on the side of the plate portion of the lid section and with a back holder at the proximal end on the peripheral wall side.

According to the magnetic tape cassette storage case of the present invention, by making the configuration of the seat and rib-molding core in agreement, the line formed by the junction between the rib-molding core and the metal mold can be eliminated, and thus the appearance and the interior visibility are not spoiled. In addition, since the rib-molding core does not come into contact with the molded lid section of the magnetic tape cassette storage case when it accomplishes a pivotal movement, there is no chance to scratch the lid section of the magnetic tape cassette storage case. By providing a back holder on the holding rib, when the rib-molding core accomplishes a pivotal movement, not only the end surface of the rib-molding core, but also the side surface thereof immediately move away from the peripheral wall of the molded magnetic tape cassette storage case, and thus the peripheral wall of the magnetic tape cassette storage case is not scratched.

The seventh object of the present invention is achieved by providing a metal mold for molding magnetic tape cassette storage cases constructed by the combination of a first case and a second case each having a plate and a peripheral wall, in which the peripheral wall of at least one of the first case and the second case includes a wall of 6 mm or more in height, characterized in that the wall having a rib being in contact with the plate and extending along the wall from among the walls described above is formed in part by the ejector pin that pushes the case out from the main body of the metal mold by the distal end surface while passing through the main body of the metal mold having a cavity for the rib on its side surface for molding the inside of the case, and the wall that does not have a rib from among the walls described above is formed in part by the ejector pin for pushing the case out from the main body of the metal mold by the distal end surface passing through the main body of the metal mold for molding the inside of the case.

In other words, in the metal mold for magnetic tape cassette storage case of the present invention, the wall having a rib being in contact with the top plate and extending along the peripheral wall, such as a positioning rib or a supporting rib on the lid section from among the sidewalls and the end wall of at least 6 mm in height constituting the peripheral wall is formed in part by the ejector pin having a cavity for the rib on the side surface for pushing the case, or the molded article, by the distal end surface. The wall that does not have the rib from between the sidewalls and the end wall of at least 6 mm in height is molded by the ejector pin in part.

When the sidewalls and the end wall constituting the peripheral wall do not have the rib, a part of each wall is formed by the ejector pin. At this time, the ejector pin is preferably disposed in the cavity near the location where resin is filled at last, which can make breathing smoother.

As an ejector pin, a inclining pin or an ejector pin that pushes the molded article out in the direction parallel to the movement of the main body of the movable metal mold may be employed. The clearance between the main body of the metal mold and the ejector pin that passes through the main body of the metal mold at the time of molding is preferably 0.01–0.03 mm. If the clearance is below 0.01 mm, pushing-out operation cannot be made smoothly, and if it exceeds 0.03 mm, bur or the like will be generated.

According to the metal mold for magnetic tape cassette storage case in this arrangement, breathing can be performed reliably in the case of molding the magnetic tape cassette storage case having a peripheral wall of at least 6 mm in height, thereby preventing babbles from being trapped in the sidewalls or the like of the storage case. Therefore, the magnetic tape cassette storage case with a good appearance may be obtained.

The seventh object of the present invention is achieved by providing a magnetic tape cassette storage case constructed by the combination of a first case and a second case each having a plate and a peripheral wall, in which the peripheral wall of at least one of the first case and the second case includes a wall of 6 mm or more in height;

characterized in that the wall having a rib being in contact with the plate and extending along the wall from among the walls described above is formed in part by the ejector pin that pushes the case out from the main body of the metal mold by the distal end surface while passing through the metal mold body having a cavity for the rib on its side surface for molding the inside of the case, and the wall that does not have a rib from among the walls described above is formed in part by the ejector pin for pushing the case out from the main body of the metal mold by the distal end surface passing through the main body of the metal mold for molding the inside of the case.

DESCRIPTION OF THE DRAWINGS

FIG. 42 is a drawing showing the principal portion of the metal mold including a rib-molding core for molding the holding rib of the magnetic tape cassette storage case according to the twentieth embodiment, in which FIG. 42(a) is a conceptual cross-sectional view of the holding rib viewed from the front, and FIG. 42(b) is a conceptual cross-sectional view of the holding rib viewed from the side.

FIG. 43 is a process drawing showing from molding operation to releasing operation in the metal mold according to the twentieth embodiment, in which FIG. 43(a) is a conceptual cross-sectional view of the molding operation, FIG. 43(b) is a conceptual cross sectional view when the die is opened, and FIG. 43(c) is a conceptual cross-sectional view of releasing operation.

BEST MODE FOR CARRYING OUT THE INVENTION

Referring now to the attached drawings, the first embodiment of the present invention will be described.

Figure 1:
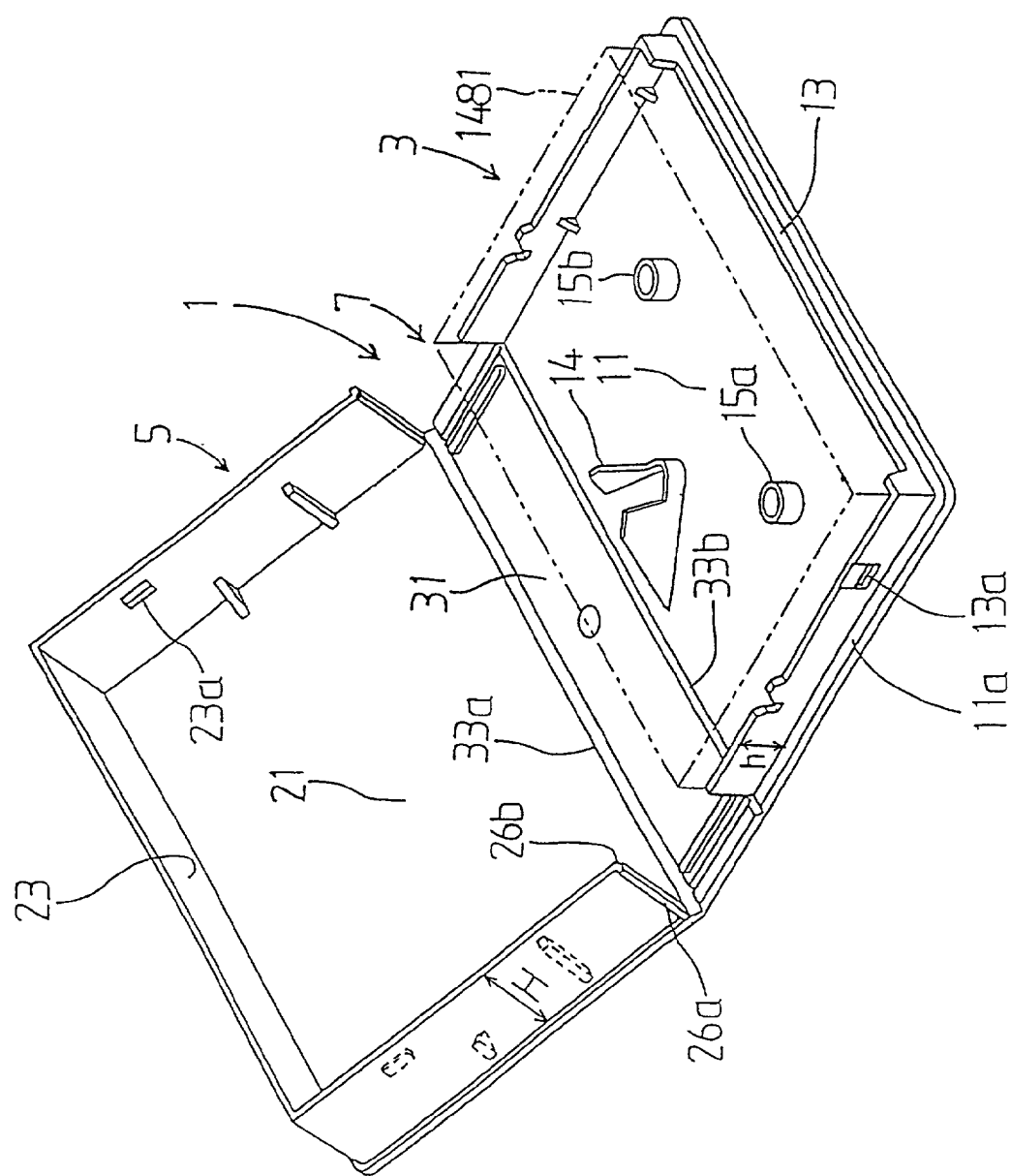
FIG. 1 is a perspective view showing a magnetic tape cassette storage case according to the first embodiment of the present invention.

FIG. 1 is a perspective view showing the structure of the storage case for magnetic tape cassette. For the explanation of this embodiment, the magnetic tape cassette shown in FIG. 47 will be used as appropriate.

The storage case 1 is formed, for example, of polypropylene for enabling the hinged movement, and has such a structure that the storage section 3 and the lid section 5 are connected via the connecting section 7. The storage section 3 comprises a first plate portion 11, a first sidewall portion 13 formed integrally along the three sides of the outer periphery of the first plate portion 11, a pair of reel locking ribs 15a, 15b of hollow cylindrical shape formed on the first plate portion 11 at the positions somewhat closer to the rear side than to the front side, and a opening locking rib 14 formed on the first plate 11 at the position somewhat closer to the front side in a V-shape in cross section.

Figure 47:
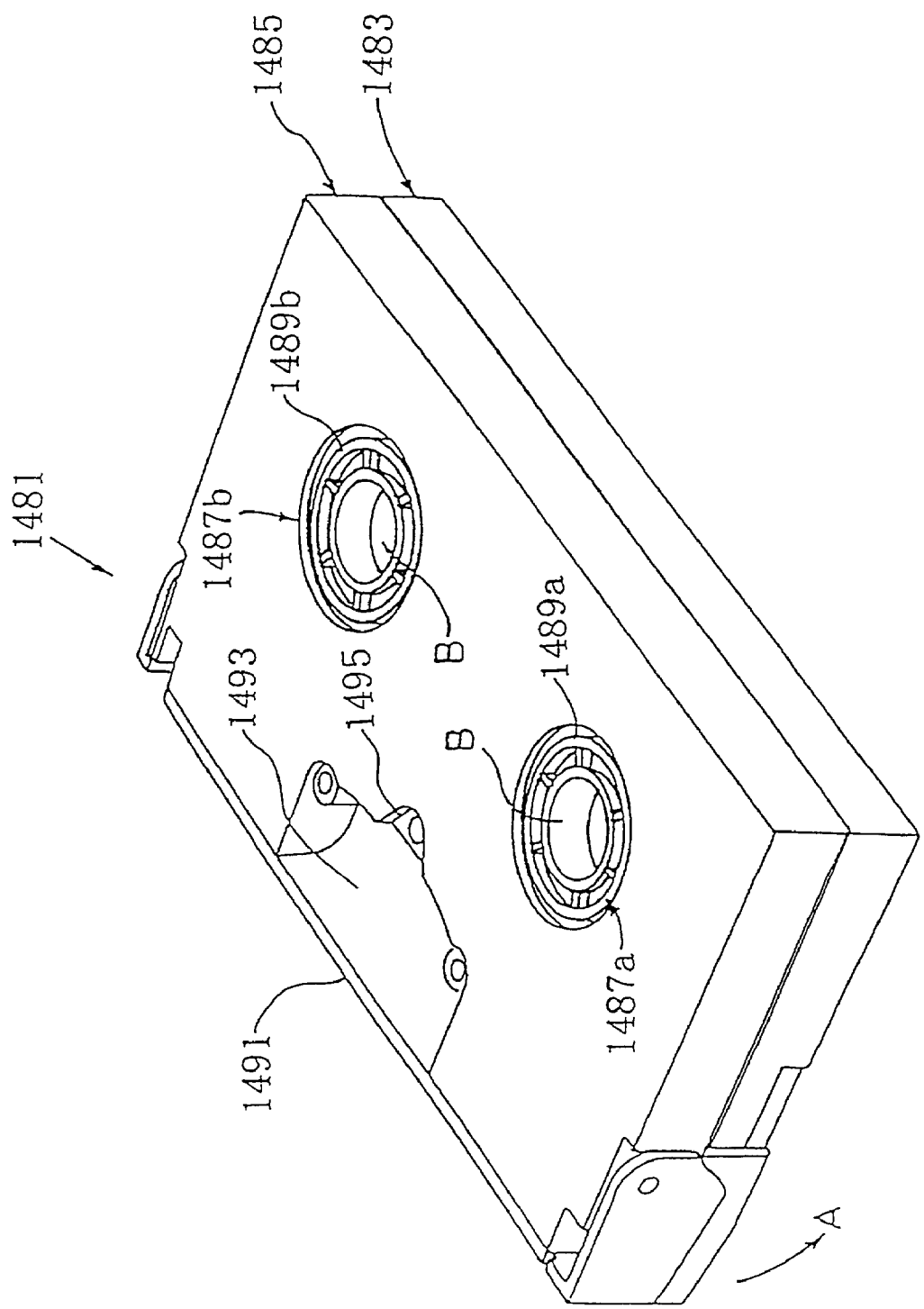
FIG. 47 is a perspective view showing an example of the magnetic tape cassettes.
Figure 48:
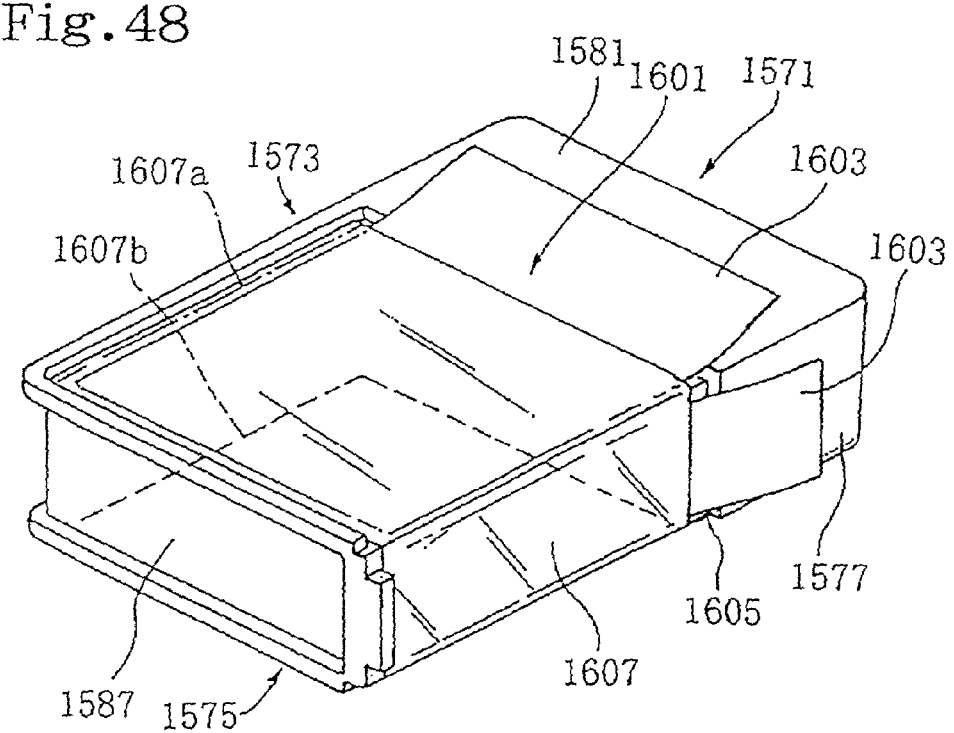
FIG. 48 is a perspective view showing an example of the magnetic tape cassette storage case of the related art.
Figure 49:
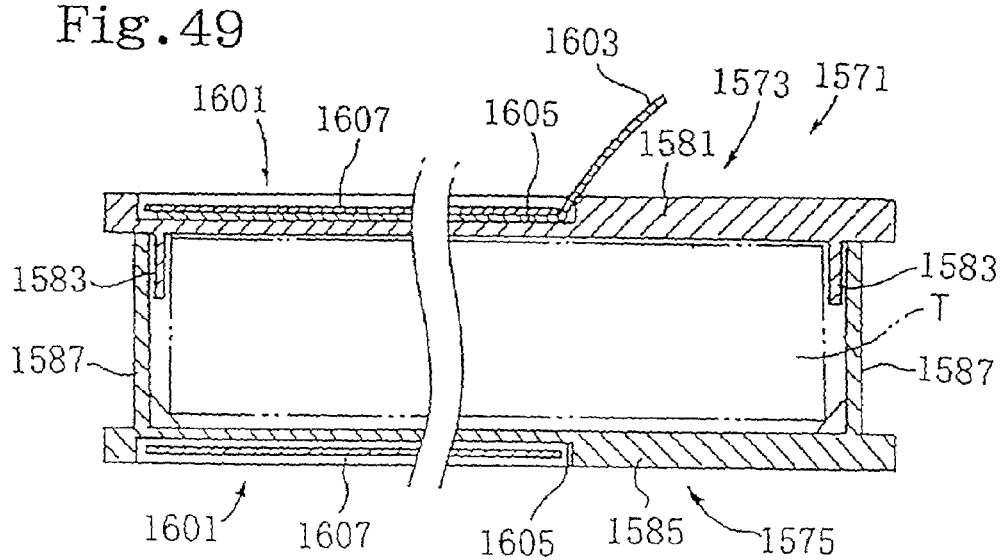
FIG. 49 is a cross-sectional view showing the construction of the information sheet holding portion of the related art.

When the magnetic tape cassette 1481 shown in FIG. 47 is stored, as shown by a phantom line in FIG. 1, the magnetic tape cassette 1481 is fitted in the first sidewall portion 13, and the reel locking ribs 15b, 15a are inserted and pressed into the circular engaging holes B formed at the centers of the engaging portions 1489a, 1489b of the magnetic tape cassette 1481, and simultaneously, the opening 1493 of the magnetic tape cassette 1481 is inserted and pressed into the opening locking rib 14, so that the magnetic tape cassette 1481 is restricted in position and thus is properly stored. It is also possible to form only one of the reel locking ribs 15a, 15b and the opening locking rib 14 on the first plate portion 11 of the storage section 3, or other members having different configuration may be employed for restricting the position of the magnetic tape cassette 1481.

The lid section 5 comprises a second plate portion 21, and a second sidewall portion 23 formed integrally along the three sides of the outer periphery of the second plate portion 21. The connecting section 7 comprises thin portions 33a, 33b on both sides of the third plate portion 31, which enables the storage section 3 and the lid section 5 to close as a book.

Outside of the first sidewall portion 13 that defines the storage section 3, there is provided an overhanging portion 11a that is formed by a part of the first plate portion 11 in an overhanging manner. Therefore, even when the storage section 3 and the lid section 5 are closed, and the second sidewall portion 23 of the lid section 5 is fitted around the first sidewall portion 13 of the storage section 3, the overhanging portion 11a prevents the storage section 3 from getting into the lid section 5, and thus the thickness of the storage case 1 may be maintained as a whole.

The outer surface of the first sidewall portion 13 is formed with a recess 13a as a locked portion, and the inner surface of the second sidewall portion 23 is formed with a projection 23a as a locking portion at the position corresponding to the recess 13a when the storage section 3 and the lid section 5 are closed. Therefore, when the storage section 3 and the lid section 5 are closed with each other, the projection 23a and the recess 13a engage to prevent an accidental opening of the storage section 3 and the lid section 5. The positions, the number, and the configurations of the projection 23a and the recess 13a are not limited to the embodiment shown in FIG. 1, but various modifications are possible.

Figure 2:
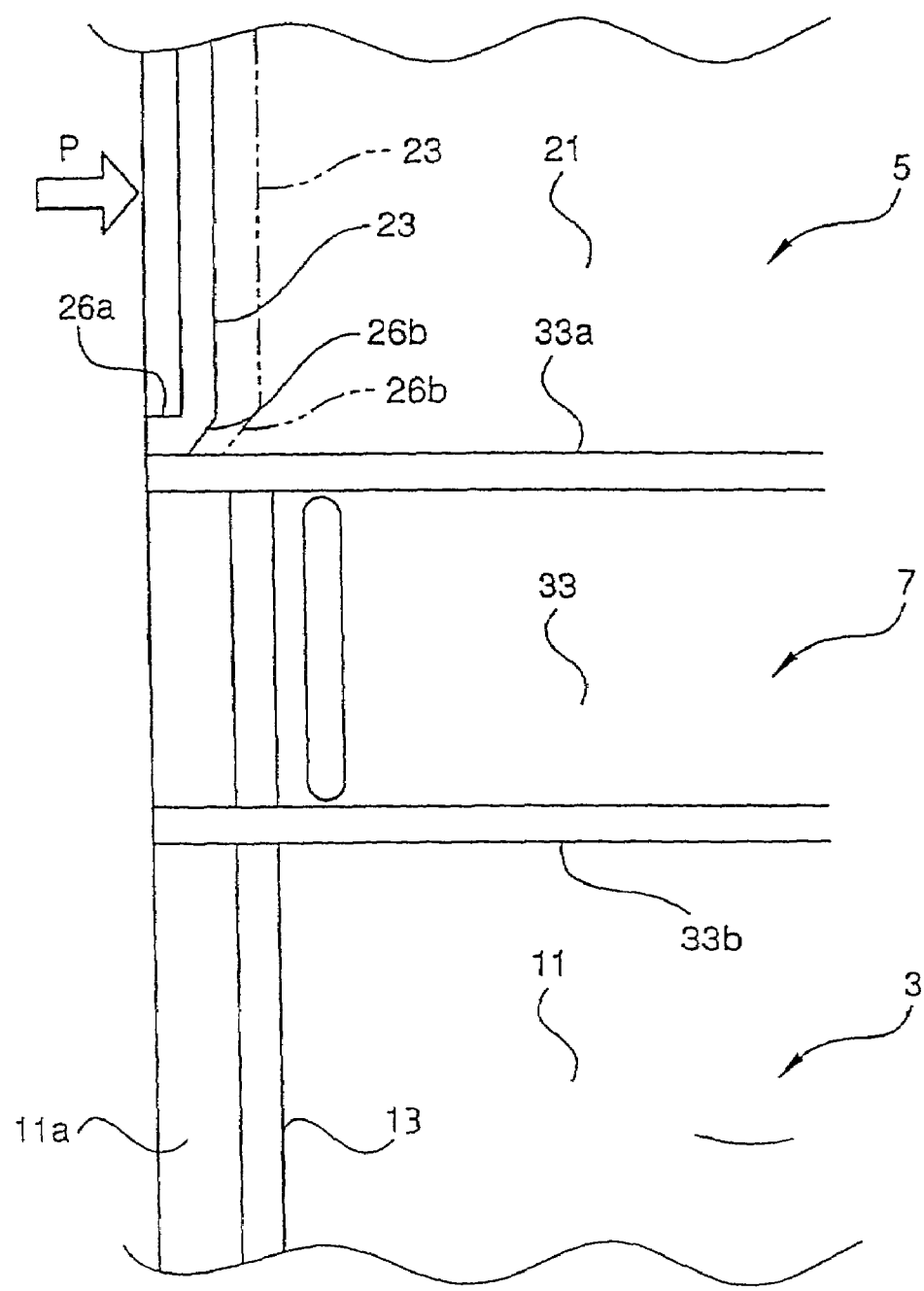
FIG. 2 is a partially enlarged plan view of FIG. 1.

As shown in FIG. 1 and FIG. 2, a reinforcing rib 26a is formed on the outside of the second sidewall portion 23 of the lid section 5 at the end closer to the connecting section, and a bevel 26b is formed at the inside of the rib 26a as a cut-off portion having the same height as the height H (shown in FIG. 1) of the second sidewall portion 23 of the lid section 5.

According to the storage case 1 of the present invention, when the storage section 3 and the lid section 5 are closed, even if the second sidewall portion 23 of the lid section 5 formed of polypropylene is in the deflected state shown by a phantom line in FIG. 2 by a pressurizing force applied in the direction of P, the bevel 26b provided on the second sidewall portion 23 of the lid section 5 abuts against the first sidewall portion 13 of the storage section 3, which ensures that the second sidewall portion 23 of the lid section 5 is fitted on the outside of the first sidewall portion 13 of the storage section 3. Therefore, imperfect closing of the storage case is prevented by the bevel 26b. The bevel 26b does not have to have the same dimension as the height H of the second sidewall section 23, or does not have to reach the surface of the plate portion 21, as far as it has a dimension not less than the height h (shown in FIG. 1) of the first sidewall portion 13 of the storage section 3. It is because a dimension as described above allows the sidewall portion 23 to be guided to the first sidewall portion 13 smoothly until the lid section 5 is completely closed, even when the sidewall section 23 is deflected. The bevel 26b is not limited to a flat surface, but may be a curved surface or the like, for example.

The first embodiment is not limited to the magnetic tape cassette storage case for the DVC, but is also applicable to the storage case for storing other types of cassettes.

Referring now to the accompanied drawings, the second embodiment of the present invention will be described.

Figure 3:
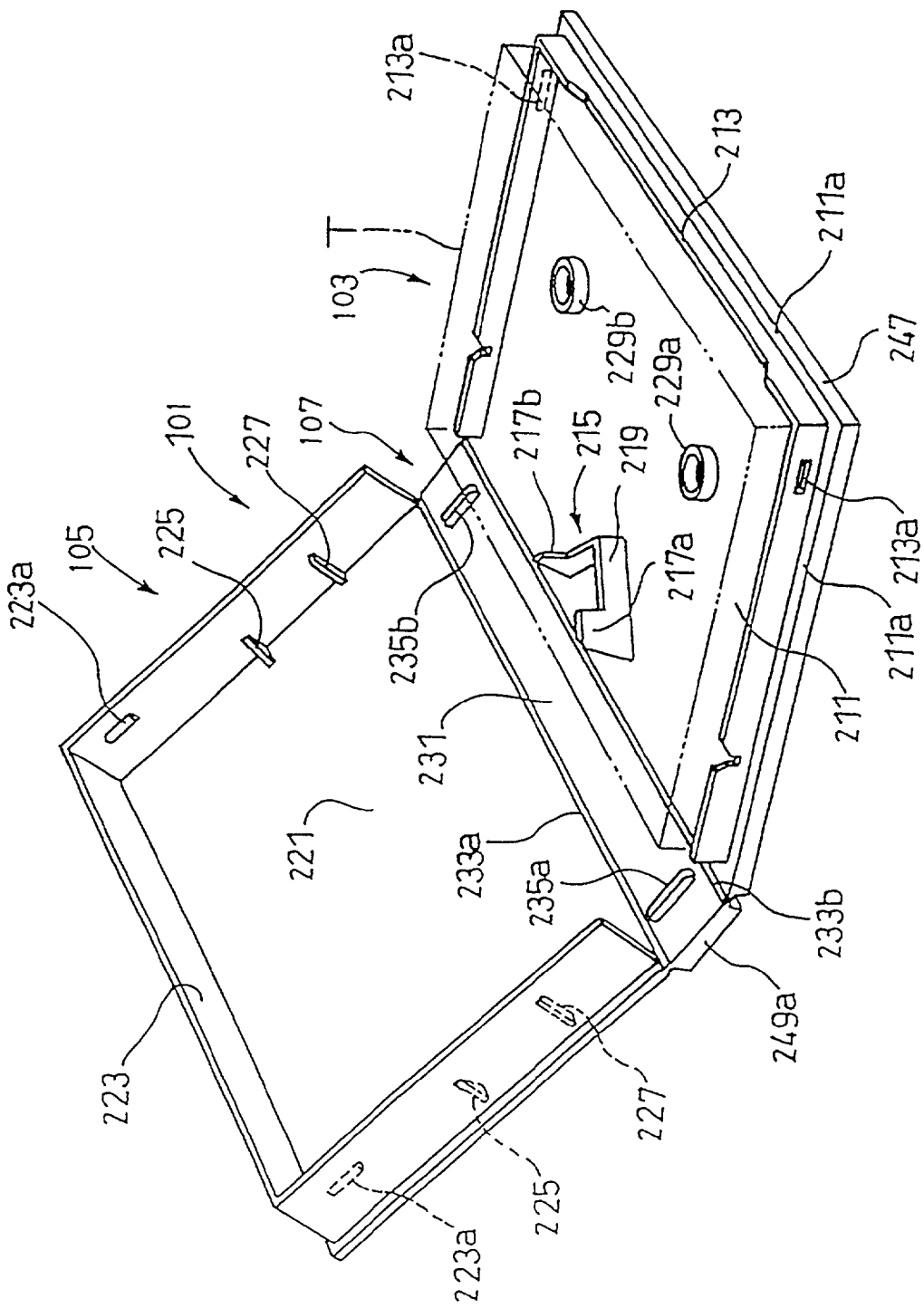
FIG. 3 is a perspective view showing a magnetic tape cassette storage case according to the second embodiment of the present invention.
Figure 4:
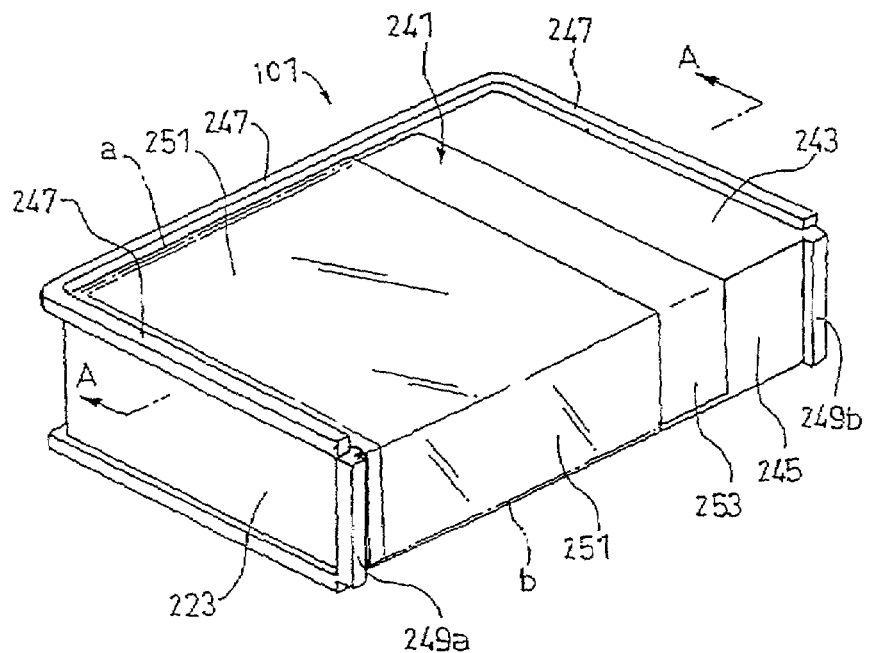
FIG. 4 is a perspective view showing the structure of the information sheet holding portion.
Figure 5:
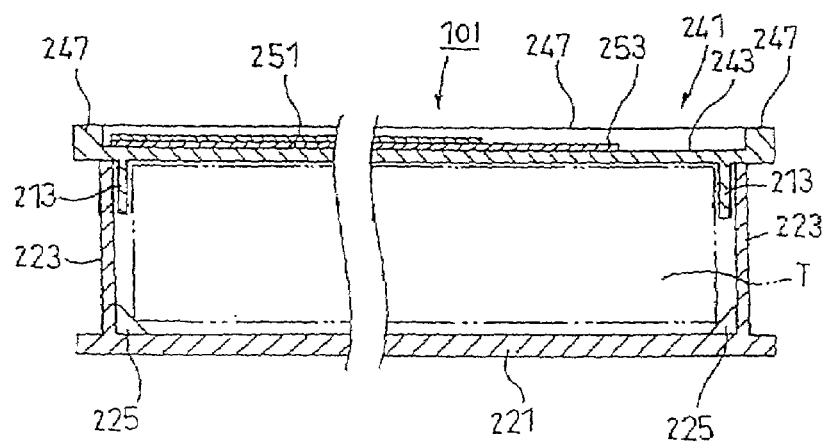
FIG. 5 is a cross-sectional view taken along the line A—A of FIG. 4.
Figure 6:
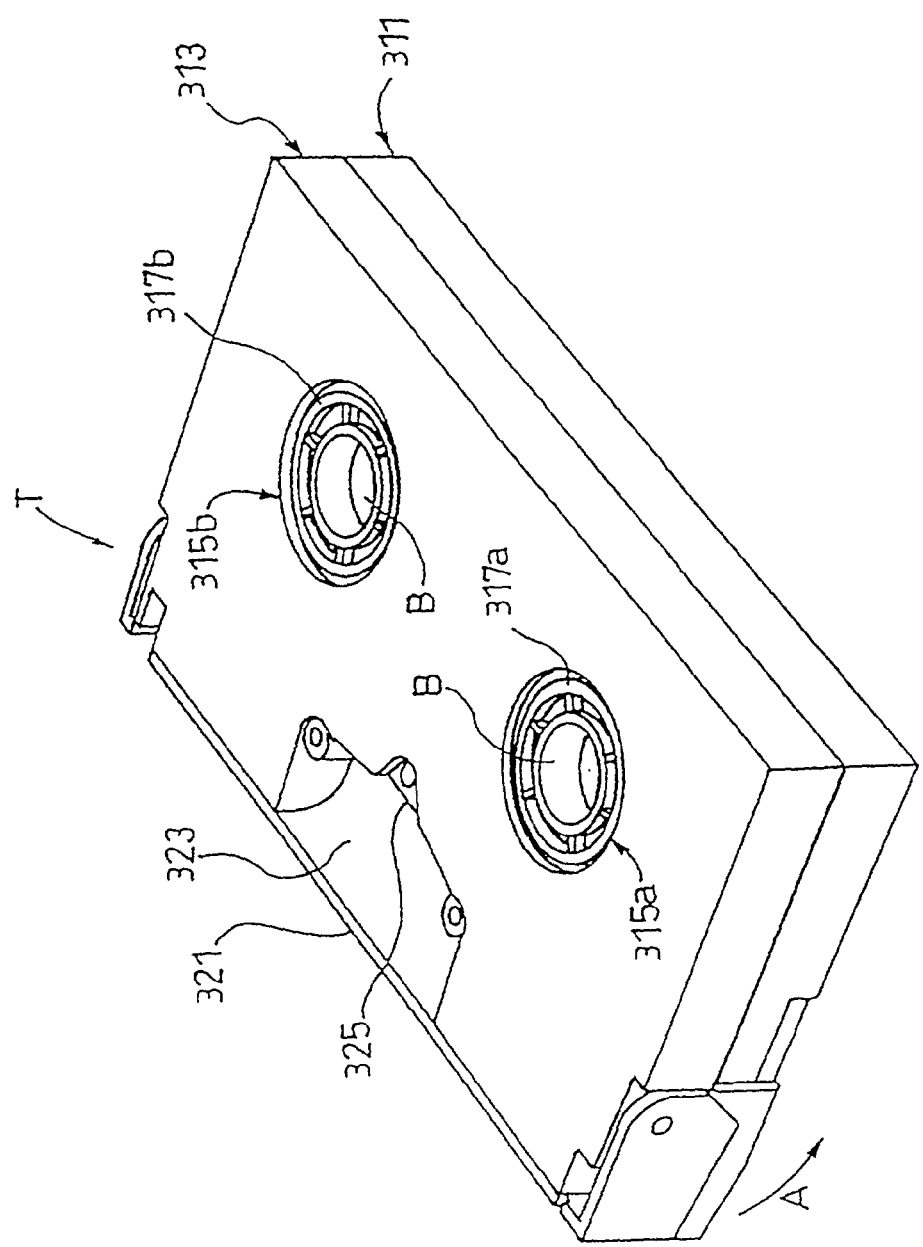
FIG. 6 is a perspective view showing an example of the magnetic tape cassettes.

FIG. 3 is a perspective view showing an inside structure of the magnetic tape cassette storage case; FIG. 4 is a perspective view showing the outer structure of the magnetic tape cassette storage case; and FIG. 5 is a cross-sectional view taken along the line A—A of FIG. 4. FIG. 6 is a perspective view of an example of the magnetic tape cassettes to be stored, viewed from the bottom side.

Referring now to FIG. 6, the magnetic cassette tape T will be described. FIG. 6 is a perspective view of the magnetic tape cassette T viewed from the bottom side, and thus the upper cassette half 311 is shown below the lower cassette half 313. The lower cassette half 313 is formed with circular openings 315a, 315b at two positions thereof, and the engaging portions 317a, 317b formed integrally with the reel hubs on which the magnetic tape is wound thereon (not shown) are exposed. These engaging portions 317a, 317b have a function to unwind and wind the magnetic tape when it is mounted in the recording/playing apparatus, and a function to be fitted on the reel locking rib to prevent rattling of the magnetic tape cassette T when it is stored in the storage case 271.

On the front side of the magnetic tape cassette T, an outer lid 321 is provided for pivotal movement, and when it is mounted in the recording/playing apparatus, the magnetic tape is pulled out after the outer lid 321 is pivoted as shown by the arrow A in FIG. 6. There is formed a recessed front opening 323 inside the outer lid 321 at near the center in such a manner that the upper and lower cassette halves 311, 313 are notched, and there is provided a shoulder 325 on one end of the front opening 323 on one end of the front opening 323. Both of them have a function of positioning when the magnetic tape cassette T is mounted in the recording/playing apparatus.

Referring now to FIG. 3 to FIG. 5, the storage case will be described. The storage case 101 is formed integrally of synthetic resin, and the storage section 103 and the lid section 105 are connected via the connecting section 107.

The storage section 103 comprises a first plate portion 211, a first sidewall portion 213 formed along three sides of the outer periphery thereof, a wrong insertion preventing rib 215 formed on the first plate portion 211 near the connecting section 107, a pair of reel locking rib 229a, 229b. When the magnetic tape cassette T is properly stored in the storage case 101, it is fitted within the sidewall portion 213 as shown by a phantom line in FIG. 3.

The lid section 105 comprises a second sidewall portion 223 formed integrally along three sides of the outer periphery of the second plate portion 211, a locking projection 223a formed on the inner surface of the second sidewall portion 223, and a cassette holding rib 225 and a reinforcing rib 227 formed at the corner between the second plate portion 221 and the second sidewall portion 223.

The connecting section 107 comprises thin portions 233a, 233b formed on both sides of the third plate portion 231 for hinged movement, and cassette holding ribs 235a, 235b formed in the vicinity of both ends of the third plate portion 231. When the storage section 103 and the lid section 105 are closed, both sides of the connecting section 107 are bent so that the storage section 103 and the lid section 105 can be closes as a book (See FIG. 4).

Outside of the first sidewall portion 213 constituting the storage section 103, there is provided an overhanging portion 211a that is formed by a part of the first plate portion 211 in an overhanging manner. Therefore, even when the storage section 103 and the lid section 105 are closed, and the second sidewall portion 223 of the lid section 105 is fitted around the first sidewall portion 213 of the storage section 103, the over hanging portion 211a prevents the storage section 103 from getting into the lid section 105, and thus the thickness of the storage case 101 may be maintained as a whole. The outer surface of the first sidewall portion 213 is formed with a recessed locking portion 213a.

On the other hand, the locking projection 223a formed on the lid section 105 is formed on the inner surface of the second sidewall portion 223 at the position corresponding to the locking portion 213a when the storage section 103 and the lid section 105 are closed. Therefore, when the storage section 103 and the lid section 105 are closed with each other, the locking projection 223a is locked to the locking portion 213a to prevent the storage section 103 and the lid section 105 from being separated. The positions and the numbers of the locking portion 213a and the locking portion 223a to be formed are not limited to the embodiment shown in FIG. 3, but various modifications may be made.

The wrong insertion preventing rib 215 serves to store the magnetic tape cassette T in the storage case 101 and prevent rattling when the lid section 105 is closed as shown in FIG. 4. The wrong insertion preventing rib 215 engages the front opening 323 of the magnetic tape cassette T. The reel locking ribs 229a, 229b engage the holes B formed at the centers of the engaging portions 317a, 317b of the magnetic tape cassette T. The wrong insertion preventing rib 215 and the reel locking ribs 229a, 229b enables the magnetic tape cassette T to be stored in the storage case 101 without applying undue force to the magnetic tape cassette T and without rattling.

The information sheet holding portion 241 will now be described.

According to FIG. 3, the information sheet holding portion 241 is formed over the backside of the storage section 103 and the connecting section 107. Therefore, in a state where the storage section 103 and the lid section 105 are closed with the storage section 103 placed upside, the information sheet holding portion 241 is appeared on the upper surface of the storage case 101 as shown in FIG. 4 and FIG. 5.

The information sheet holding portion 241 comprises a flat portion 243 formed over the backside of the first plate portion 211 constituting the storage section 103, a flat portion 245 formed over the backside of the third plate portion 231 constituting the connecting section 107, rib 247 formed along three sides of the flat portion 243, ribs 249a, 249b formed on both sides of the flat portion 245, and a sheet 251 welded so as to partly cover the flat portions 243, 245.

Describing the positions of the ribs 247, 249a according to FIG. 3, the rib 247 corresponds to the lower side of the overhanging portion 211a, and the rib 249a corresponds to the back surface of the cassette holding rib 235a on the viewer's side.

The seat 251 is formed of flexible transparent synthetic resin. One end of the seat 251 is welded to the flat portion 243 at the welding position a along the rib 247 shown by a dot dash line in FIG. 4, and the other end is welded to the welding position b shown by a dot dash line. The welding position b is located at about the backside of the groove portion 233a.

When the magnetic tape cassette T is stored in the storage case 101, the information sheet 253 on which the recorded contents or the like are listed is inserted into the information sheet holding portion 241. In this embodiment, the problem described above does not occur at all.

In other words, even when the information sheet 253 is larger than the sheet 251, it runs along the flat portions 243, 245 as far as it is the size that can be accommodated in the rib 247. Therefore, it is neither deformed nor protruded from the rib 247, and thus dirt or damage of the information sheet 253 can be prevented.

When the number of information sheets 253 is increased, the sheet 251 stretches. However, as far as the information sheet 253 can be housed within the height of the ribs 247, 249a, 249b, it is never rubbed directly, thereby preventing dirt and damage as described above. Therefore, when it is placed, for example, on the desk with the upper surface shown in FIG. 4 and FIG. 5 faced down, the information sheet 253 does not come in direct contact with the desk or the like. Even when it is placed on top of another, prevention of dirt and damage is achieved.

In contrast to it, when the information sheet 253 was small and was entered completely under the sheet 251, it was troublesome to take it out in the related art. However, according to this embodiment, all the user have to do is just to insert his/her finger under the sheet 251 and pulled it out along the flat portions 243, 245 in the lateral direction.

As is described thus far, the storage case 101 of this embodiment is able to prevent dirt or damage of the information sheet 253 irrespective of the size or the number of the information sheet 253, and is easy to load and to take out the information sheet 253. Even when many pieces of information sheets 253 are loaded, it is easy to take them out, thereby improving usability of the storage case 101 itself.

Though the second embodiment has been described thus far, the present invention is not limited thereto.

For example, the information sheet holding portion 241 formed by covering a part of the flat portion with a sheet may be provided on the backside of the lid section 105. Likewise, it may be provided all over the backsides of the storage section 103, the connecting section 107, and the lid section 105. In this case, a rib that projects to the higher position than the level of the transparent sheet is provided at least along a part of the periphery of the plate portion constituting the information sheet holding portion.

Referring now to the attached drawings, the third embodiment of the present invention will be described.

Figure 7:
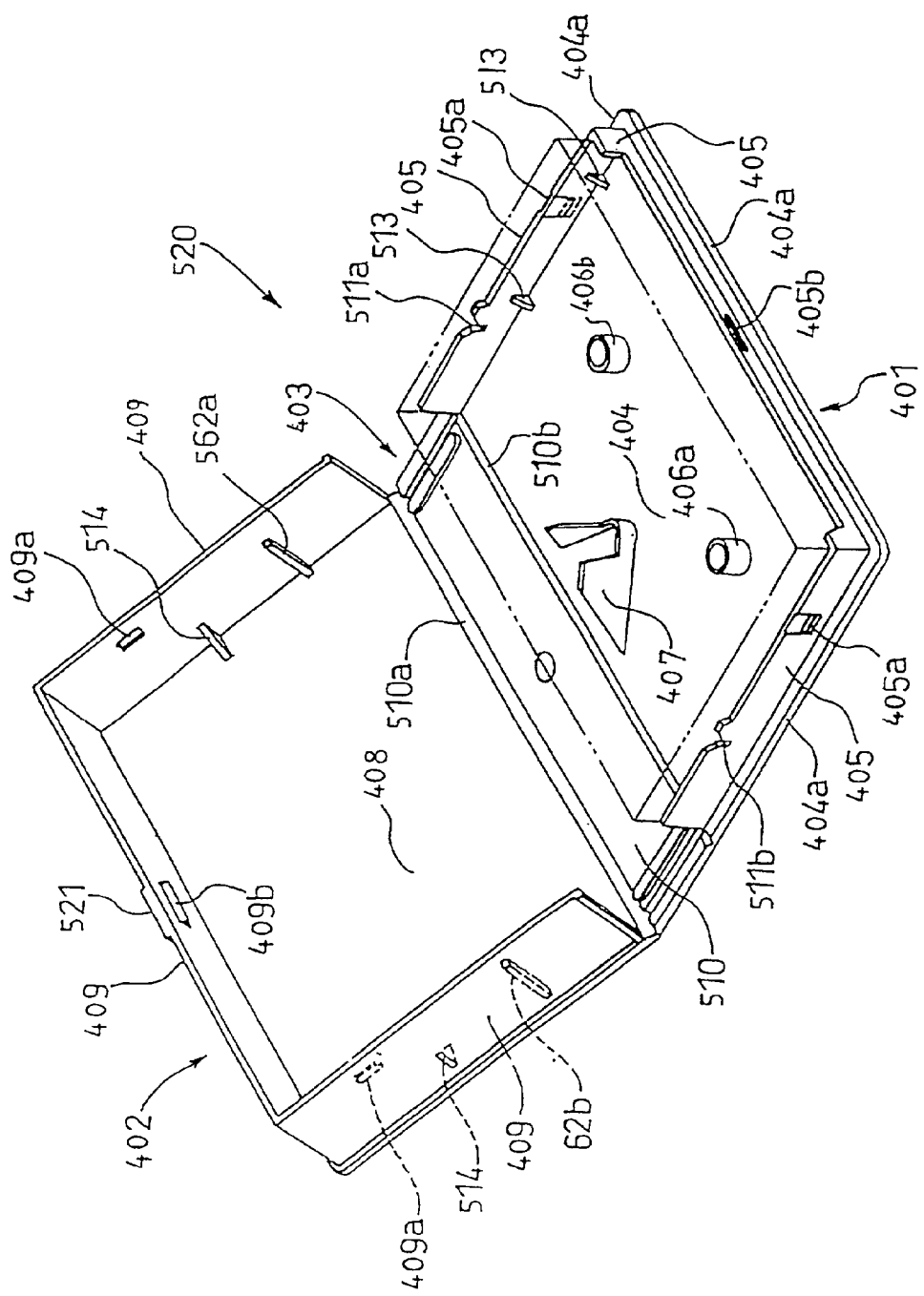
FIG. 7 is a perspective view showing the structure of the magnetic tape cassette storage case according to the third embodiment of the present invention in the opened state.
Figure 8:
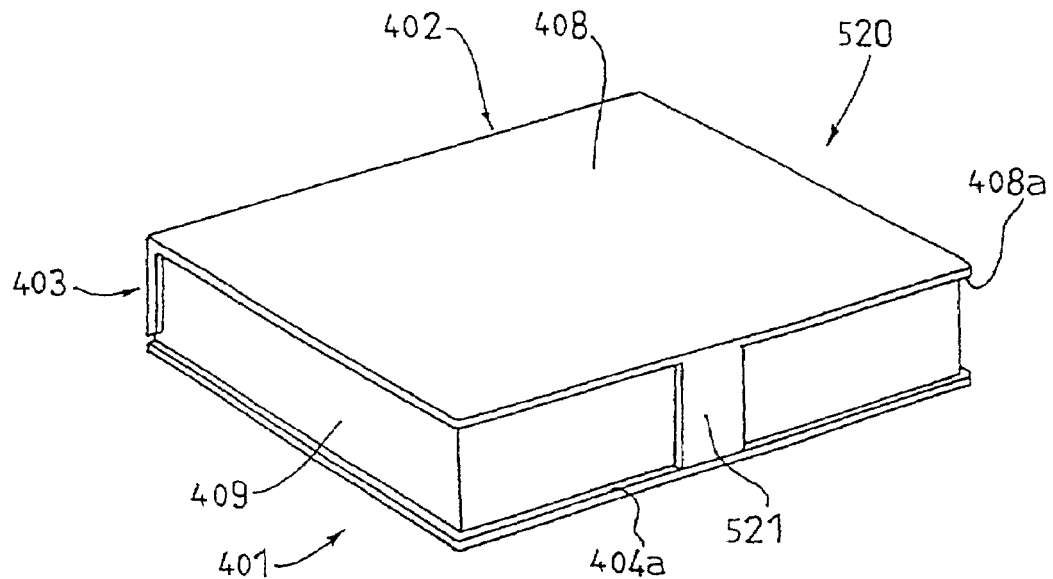
FIG. 8 is a perspective view showing the structure of the magnetic tape cassette storage case in the closed state.
Figure 9:
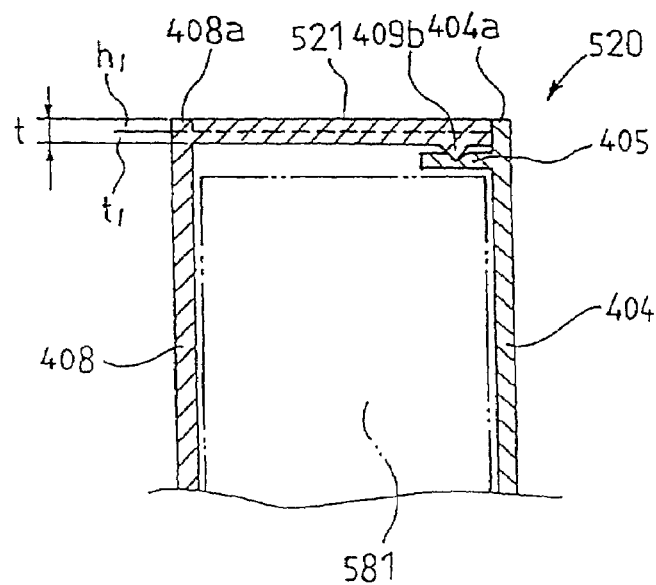
FIG. 9 is a cross-sectional view showing the structure and the action of the thick portion.
Figure 10:
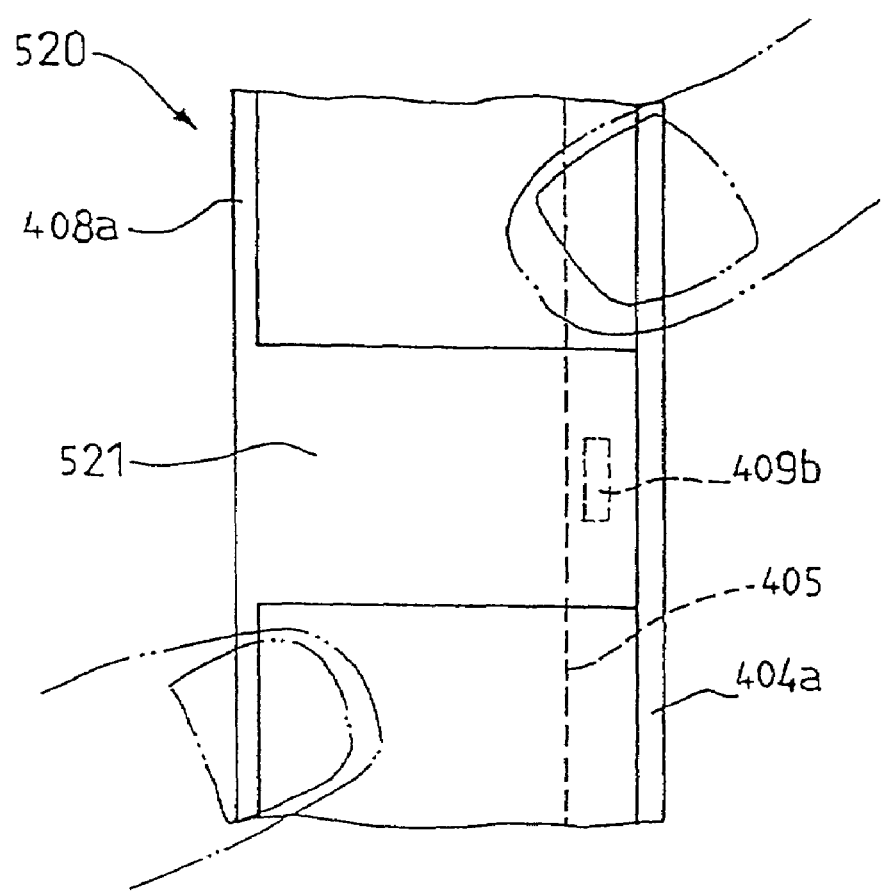
FIG. 10 is an enlarged plan view showing the action of a principal portion of the magnetic tape cassette storage case in the opened state.

FIG. 7 is a perspective view showing the structure of the storage case; FIG. 8 is a perspective view of the storage case in a closed state; FIG. 9 is a cross-sectional view showing the structure of the principal portion of the storage case; and FIG. 10 is a plan view of a principal portion of the storage case illustrating the opening operation.

Figure 50:
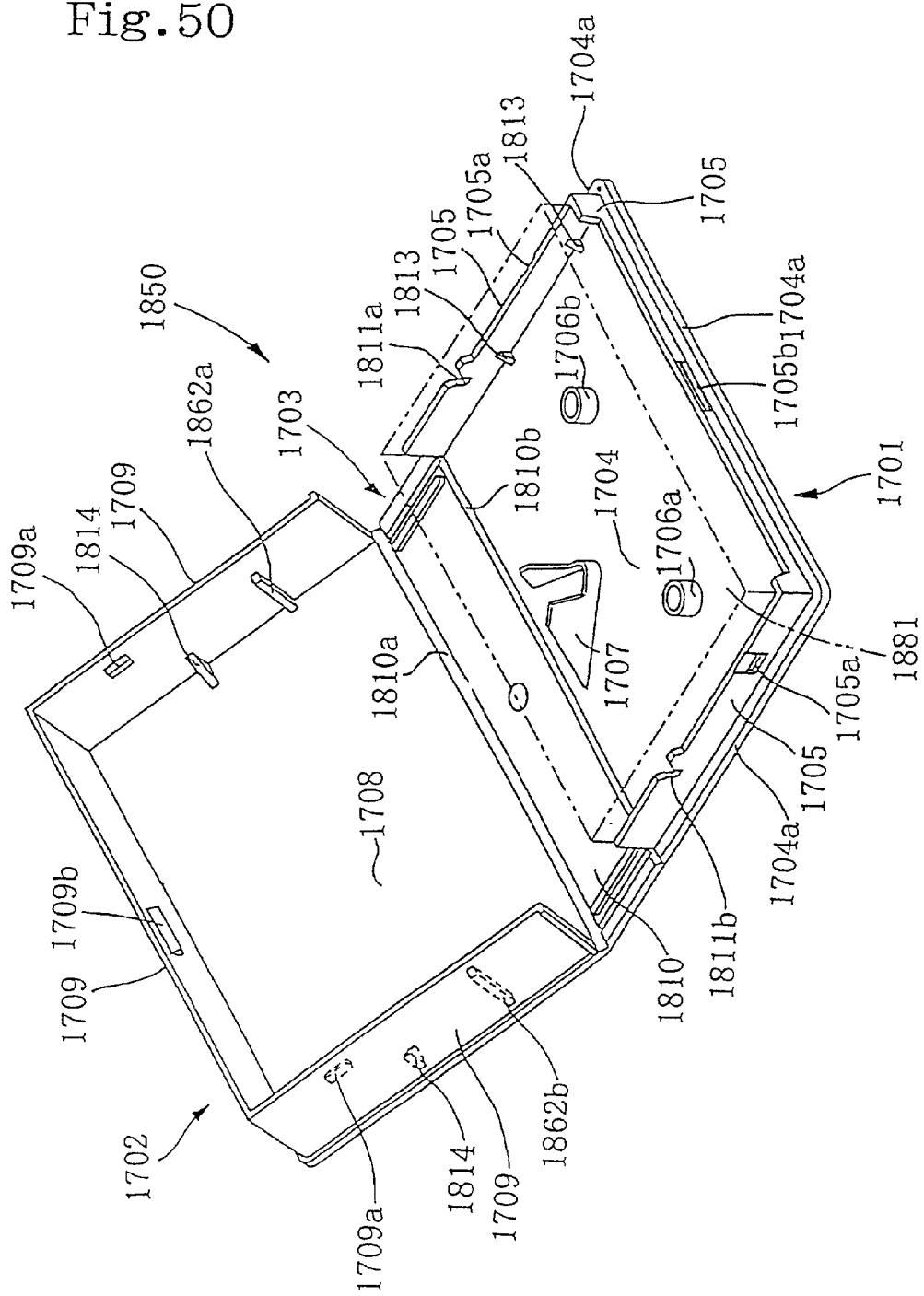
FIG. 50 is a perspective view showing the structure of the magnetic tape cassette storage case of the related art in the closed state.
Figure 51:
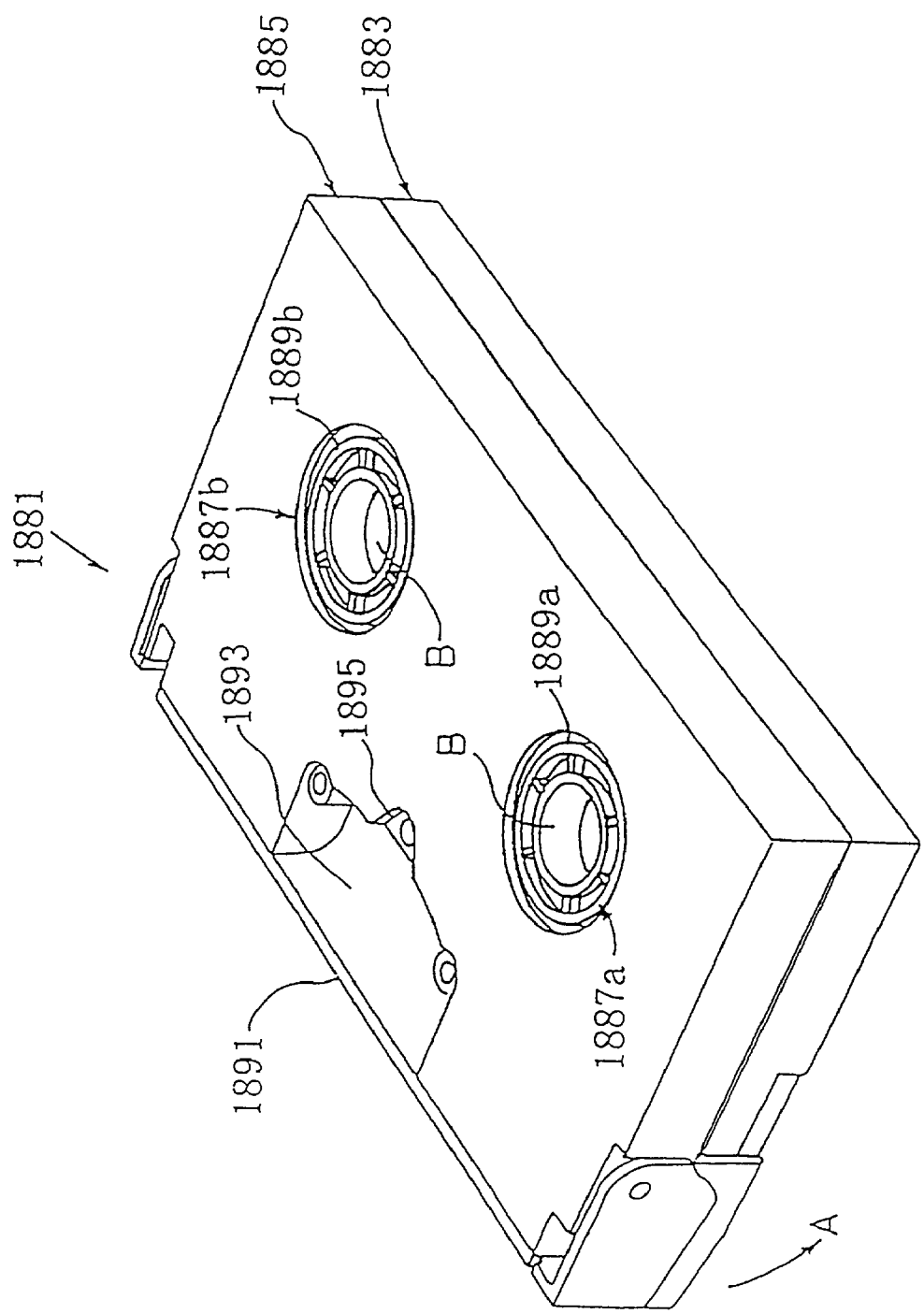
FIG. 51 is a perspective view showing the structure of the magnetic tape cassette.
Figure 52:
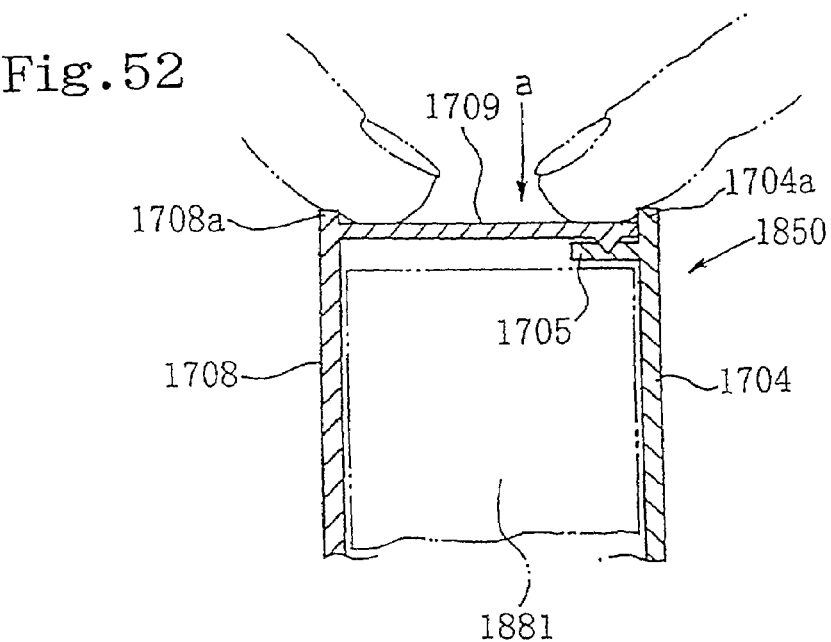
FIG. 52 is a cross-sectional view showing the structure of the locking projection and the locking recess.
Figure 53:
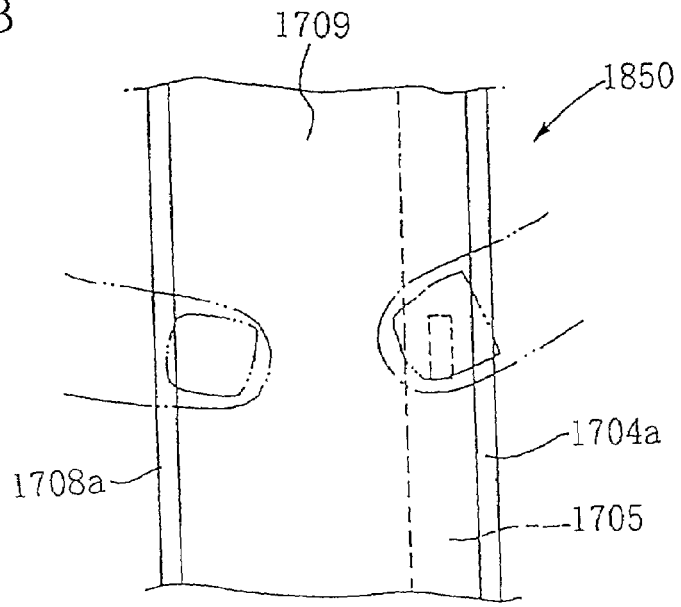
FIG. 53 is an enlarged plan view of a principal portion of the magnetic tape cassette storage case showing the action to open the same.

The structure of the storage case of the present invention is the same as the storage case 1850 shown in FIG. 50 except for the portions that are the characteristics of the present invention. Therefore, the portions other than the characteristics of the present invention will not be described here unless otherwise specially required.

FIG. 7 shows the storage case 520 for magnetic tape cassettes according to the third embodiment of the present invention in the opened state, and FIG. 8 is a perspective view showing in the closed state. In the storage case 520, the second sidewall portion 409 constituting the lid section 402 is formed with thick portion 521 on the outer wall surface thereof. The thick portion 521 is formed at the position corresponding to the outside of the locking projection 409b in this embodiment, and the length thereof is the same as the second sidewall portion 409 and the width W is lightly wider than the width of the locking projection 409b.

According to this structure, when the storage case 520 is closed as shown in FIG. 8, the locking projection 409b engages with the locking recess 405b, and the outside of the engaging position is covered by the thick portion 521. Since the thickness t of the thick portion 521 corresponds to the sum of the thickness t1 of the second sidewall portion 409 and the height h1 of the first and second overhanging portions 404a, 408a as shown in FIG. 9, they are flush with each other over the width W at the position where the thick portion 521 is formed. Therefore, when the storage case 520 is opened, the user holds the portion other than the thick portion 521 with his/her fingers as shown in FIG. 10 since the portion where the thick portion 521 is formed is slippery for holding with his/her fingers.

In other words, in the structure of this embodiment, when the storage case 520 is opened, the position where the user holds deviates from the locking position between the locking projection 409b and the locking recess 405b. In addition, providing the thick portion 521 enforce the portion of the second sidewall portion 409 where the locking projection 405 is formed. Therefore, as shown by a phantom line in FIG. 10, even when the user puts power into the first and second overhanging potions 404a, 408a with fingers in order to open the storage case 520, the locking projection 409b is not pressed toward the locking recess 405b, and thus it can be opened smoothly.

Figure 11:
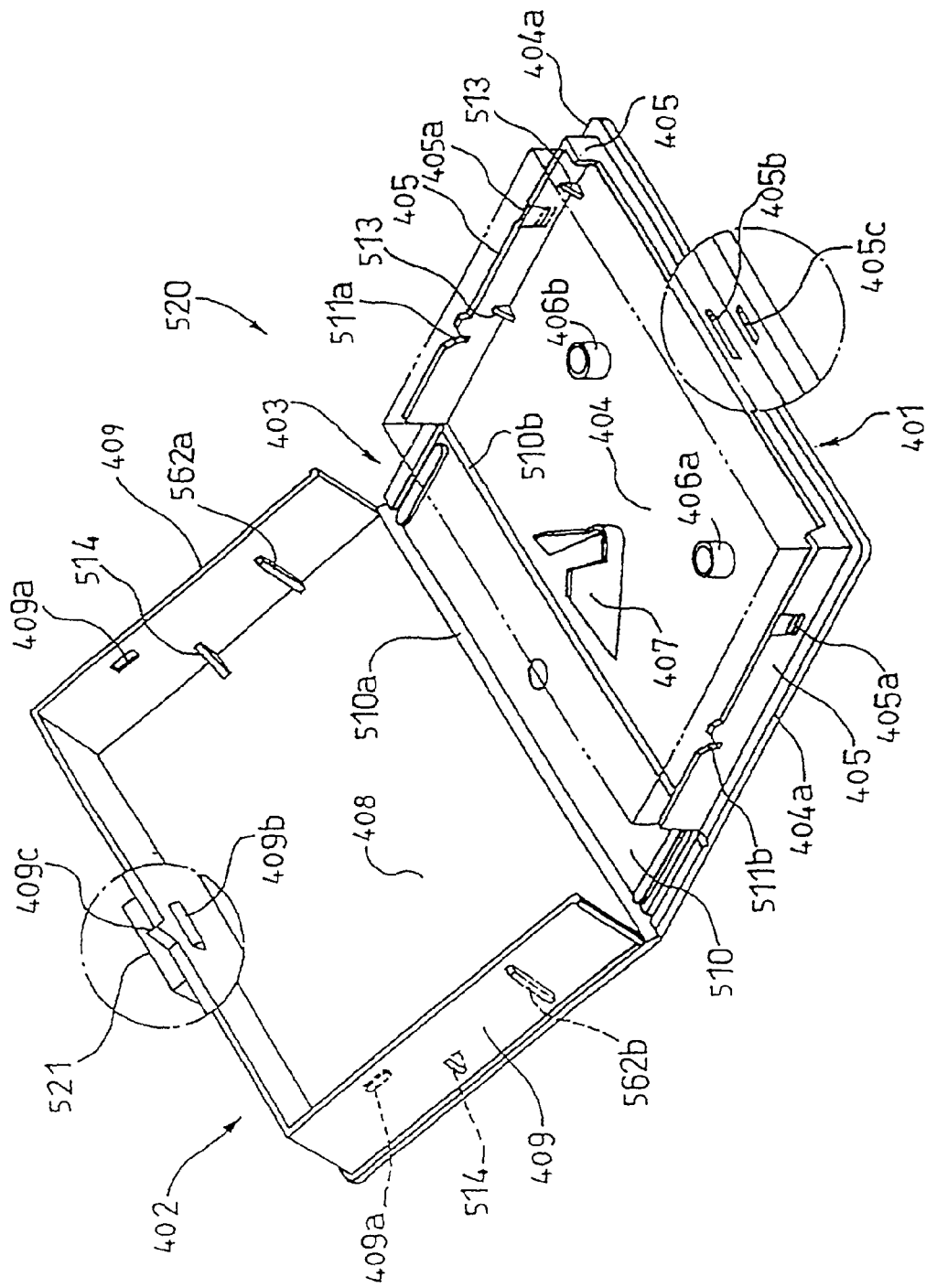
FIG. 11 is a perspective view showing the structure of the magnetic tape cassette storage case according to the fourth embodiment of the present invention in the opened state.
Figure 12:
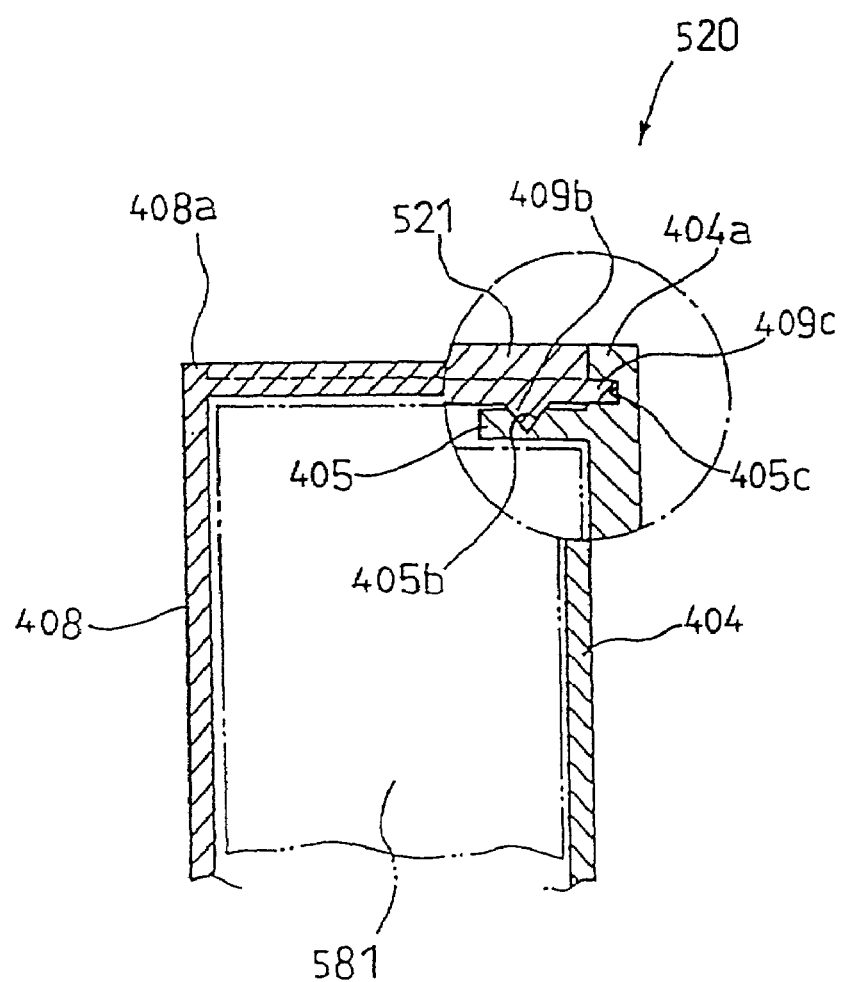
FIG. 12 is a cross-sectional view showing the structure and the action of the thick portion.

Referring now to FIG. 11 and FIG. 12, the fourth embodiment of the present invention will be described. FIG. 11 is a perspective view showing the structure of the storage case in the opened state, and FIG. 12 is a cross-sectional view of the principal portion showing the locked state. The difference between this embodiment and the third embodiment is that the locking structure is provided in addition to the thick portion 521. Therefore, the portions other then the characteristics of this embodiment will not be described here unless otherwise specially required.

The storage case 520 of this embodiment is formed with a locking recess 405*c* on the first overhanging portion 404*a*, and a locking projection 409*c* is provided at the position corresponding to the locking recess 405*c* when the end portion of the second sidewall portion 409, or the lid section 402, is closed as shown in FIG. 11 by enlarging the principal portion. In this structure, when the storage section 401 and the lid section 402 are closed as shown in FIG. 12, the rocking projection 409*b* engages the locking recess 405*b*, and the locking projection 409*c* engage the locking recess 405*c*.

On the other hand, when the storage case 520 is opened, since there is provided a thick portion 521 as in the case of the first embodiment, the user tries to open the case by holding the storage case 520 with his/her fingers placed at the overhanging portions 404*a*, 408*a*, which is deviated from the thick portion 521, as is described in conjunction with FIG. 10.

In this case, even when the user puts power into his/her fingers, the storage case can be opened easily by the following two actions. The first action is that the thick portion 521 prevents the second sidewall portion 409 from being deformed, so that it resists the pressing action of the locking projection 409*b* with respect to the locking recess 405*b*. The second action is that the locking projection 409*c* provided at the end of the second sidewall portion 409 engages the locking recess 405*c*, so that it resists pressing.

Therefore, when the user tries to open the storage case 520, the multiplier effect of the first and the second reasons eliminate deflected deformation of the thick portion 521, and thus of the entire second sidewall portion 409, thereby facilitating the operation to open the storage case 520.

Figure 13:
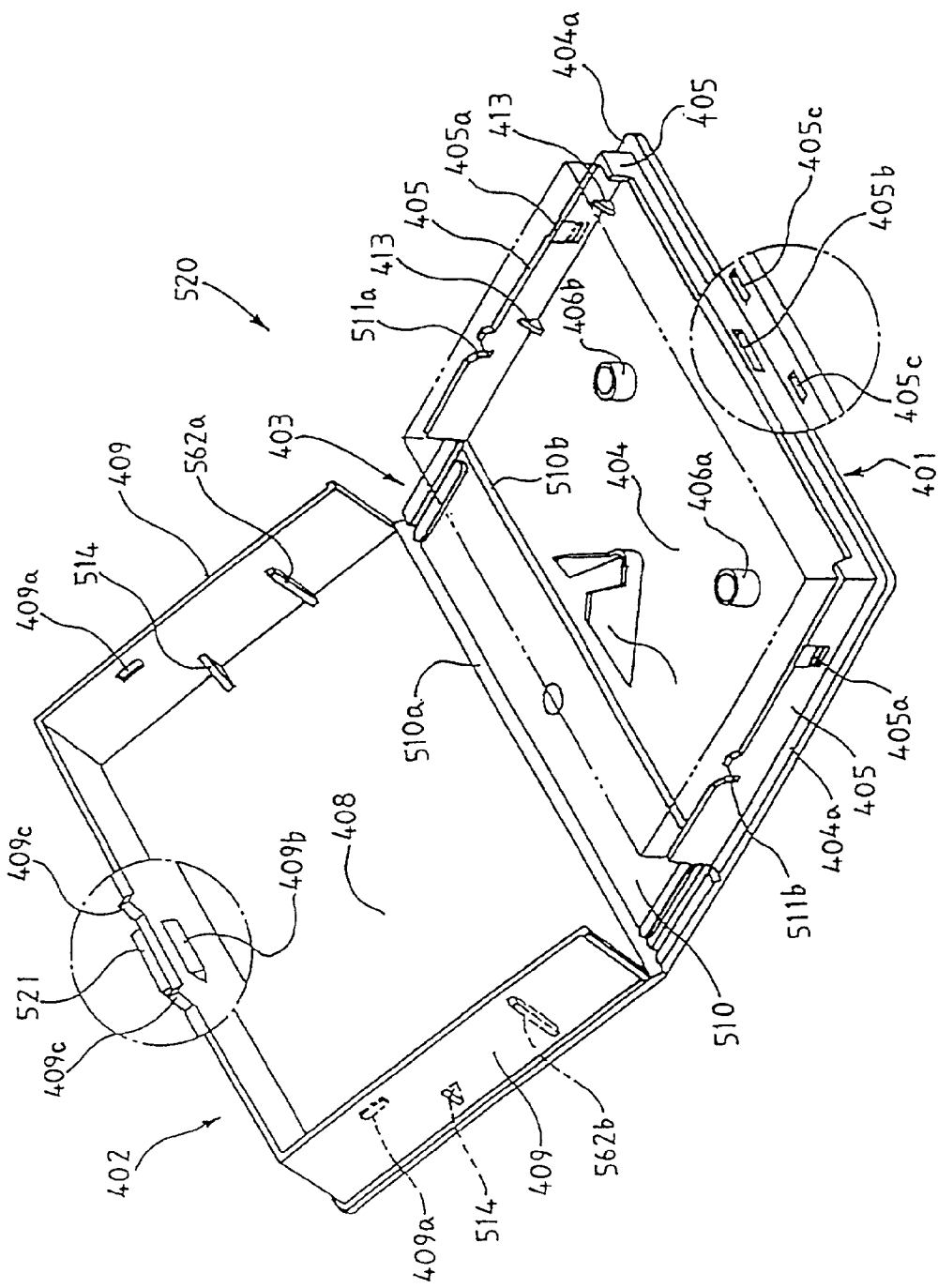
FIG. 13 is a perspective view showing the structure of the magnetic tape cassette storage case according to the fifth embodiment of the present invention in the opened state.
Figure 14:
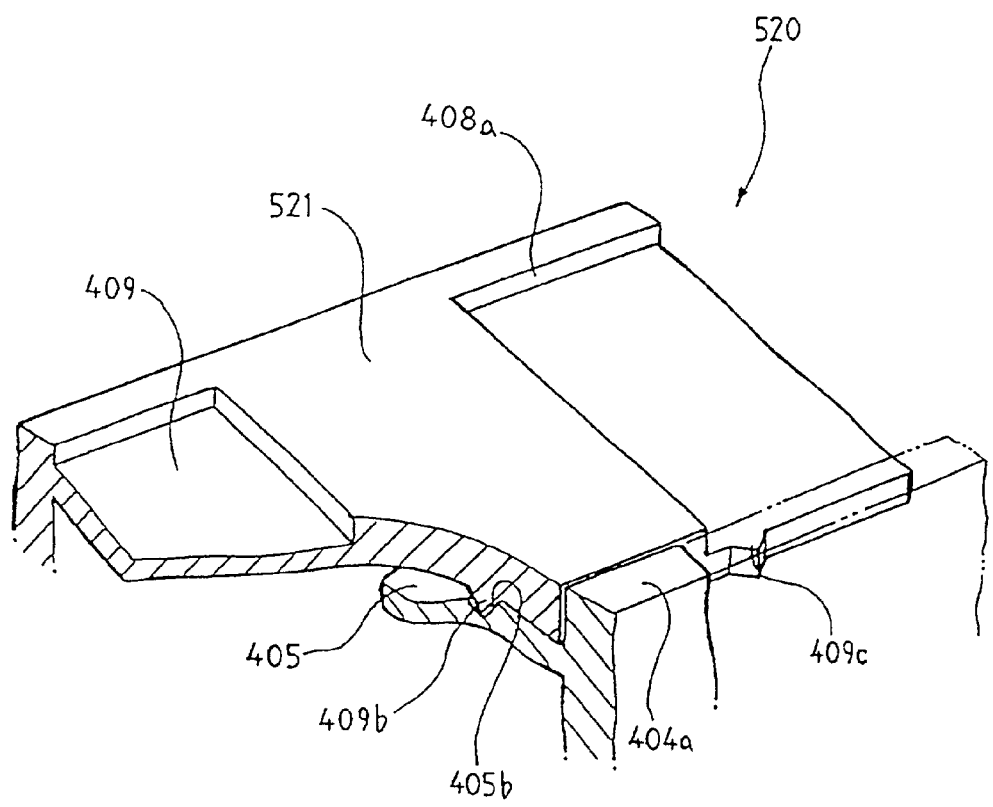
FIG. 14 is an enlarged perspective view of the principal portion showing the structure and the action of the thick portion.

Referring now to FIG. 13 and FIG. 14, the fifth embodiment of the present invention will be described. FIG. 13 is a perspective view showing the structure of the storage case in the opened state, and FIG. 14 is a perspective view, partly in cross-section, of the principal portion showing the locked state. The difference between this embodiment and the first embodiment is that the locking structure is provided in addition to the thick portion 521. Therefore, the portions other than the characteristics of this embodiment will not be described here unless otherwise specially required.

The storage case 520 in this embodiment is, as shown in FIG. 13 by enlarging the principal portion, provided with two locking recesses 405*c* on the first overhanging portion 404*a*, and two locking projections 409*c* are provided at the positions corresponding to the locking recesses 405*c* when the end of the second sidewall portion 409, or the lid section 402, is closed. Two locking recesses 405*c* are provided on both sides of the locking recess 405*b*, and two locking projections 409*c* are provided on both sides of the thick portion 521.

In this structure, when the storage section 401 and the lid section 402 are closed, as shown in FIG. 14, the locking recess 405*b* engages the locking projection 409*b*, and the locking projection 409*c* engages the locking recess 405*c* on both sides of the thick portion 521, in other words, at the position where the user places his/her fingers on when the storage case 520 is opened.

When the storage case 520 is opened, since there is provided a thick portion 521 as in the case of the third embodiment, the user tries to open the case by holding the storage case 520 with his/her fingers placed at the overhanging portions 404*a*, 408*a*, which is deviated from the thick portion 521, as is described in conjunction with FIG. 10.

In this case, even when the use puts power into his/her fingers, the storage case can be opened with the following two actions. The first action is that the thick portion 521 prevents the second sidewall portion 409 from being deformed, so that it resists the pressing action of the locking projection 409*b* with respect to the locking recess 405*b*. The second action is that the locking projection 409*c* provided at the end of the second sidewall portion 409 engages the locking recess 405*c* at the position where the fingers are placed, so that it resists pressing.

Therefore, when the user tries to open the storage case 520, even when he/she puts power into his/her fingers, the second sidewall portion 409 is not deformed because the locking projection 409*c* is supported by the locking recess 405*c*. In addition, since the thick portion 521 is provided, the position where the locking projection 409*b* and the locking recess 405*b* are engaged is not subjected to a force, and thus the storage case 520 can easily be opened.

Though the third to fifth embodiments has been described thus far, the present invention is not limited to those embodiments, but various deformations may be made. For example, it is also applicable to make the whole portion of the second sidewall on which the locking projection is formed thicker, and form a recess on a part of it for placing a finger. Alternatively, when the position of the locking projection and the locking recess is not at the center of the elongated side of the sidewall portion as in the case of the third to fifth embodiments, the same action and effect can be expected by forming a thick portion at the position corresponding to the position of the locking projection and the locking recess as a matter of course.

Figure 15:
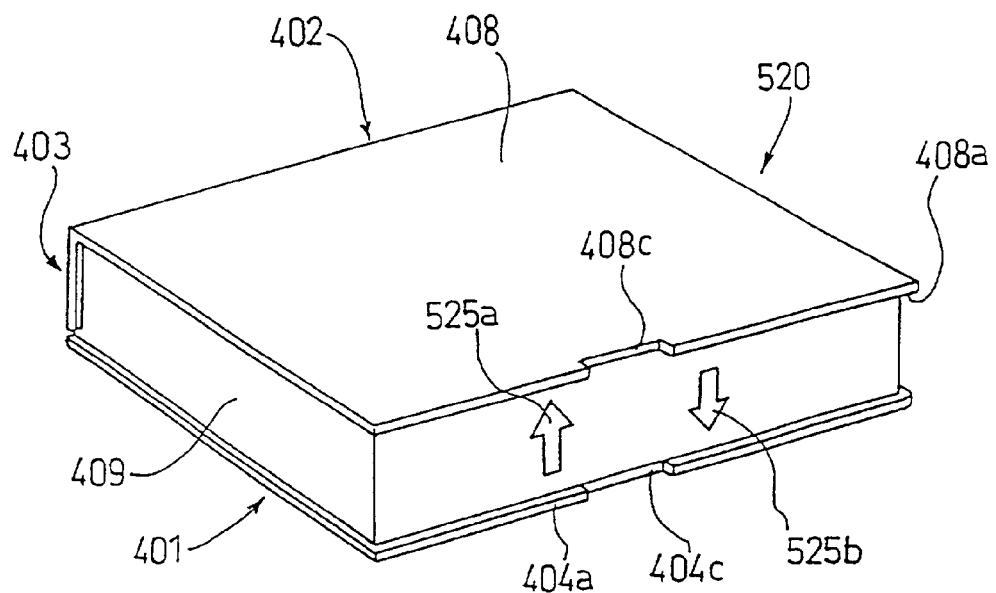
FIG. 15 is a perspective view of the magnetic tape cassette storage case according to the sixth embodiment of the present invention in the closed state.
Figure 16:
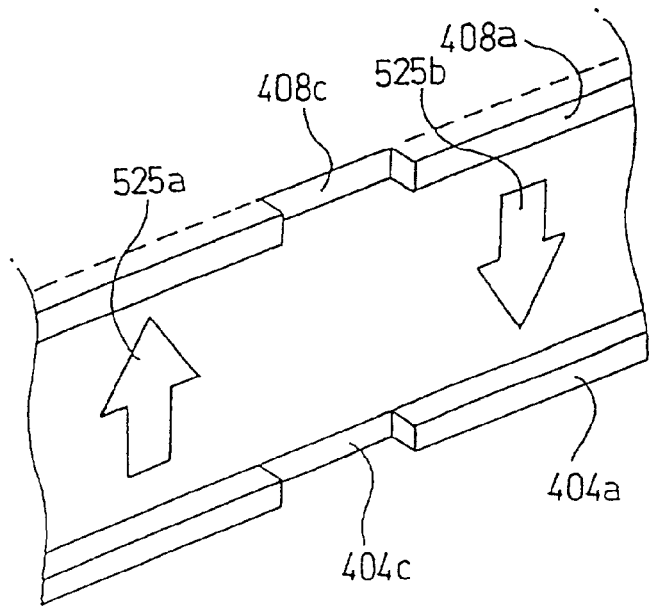
FIG. 16 is an enlarged view showing the structure of the principal portion of the magnetic tape cassette storage case of FIG. 15.

Referring now to FIG. 15 and FIG. 16, the sixth embodiment of the present invention will be described. FIG. 15 is a perspective view of the storage case in closed state, FIG. 16 is an enlarged view showing the structure of the principal portion of the storage case shown in FIG. 15. The different point between this embodiment and the third to fifth embodiments is that the notches 404*c*, 408*c* are provided to be flush with the sidewall portion 409 instead of the thick portion 521. Therefore, the portions other than the characteristics of this embodiment will not be described here unless otherwise specially required.

The storage case 520 in this embodiment is, as shown in FIG. 15 and FIG. 16, formed with notches 404*c*, 408*c* on the first and second overhanging portions 404*a*, 408*a* respectively. The notches 404*c*, 408*c* are formed at the positions corresponding to the outside of the locking projection 409*b* and the locking recess 405*b* in this embodiment, and the width is slightly wider than the width of the locking projection 409*b*. There are also provided arrows 525*a*, 525*b* indicating the directions to open the storage case on both sides of the notches 404*c*, 408*c*. These arrows 525*a*, 525*b* aid the user to know the position to open. These arrows 525*a*, 525*b* may be provided in the third to fifth embodiments described above, but it is not necessarily required to provide these arrows 525*a*, 525*b*.

In this arrangement, since the portions of the first and second overhanging portions 404*a*, 408*a* where the notches 404*c*, 408*c* are formed are flush with the sidewall portion 409, even if the user placed his/her fingers on the position where the notches 404*c*, 408*c* are formed, it is slippery, and thus the user place his/her fingers on the positions deviated from the notches 404c, 408c, or more specifically, on the first and the second overhanging portions 404a, 408a in the vicinity of the arrows 525a, 525b. Therefore, even when the user places his/her fingers on the first and the second overhanging portions 404a, 408a and put power into his/her fingers to open the storage case 520, the locking projection 409b is not pressed toward the locking recess 405b and thus the storage case 520 can be opened smoothly.

Figure 17:
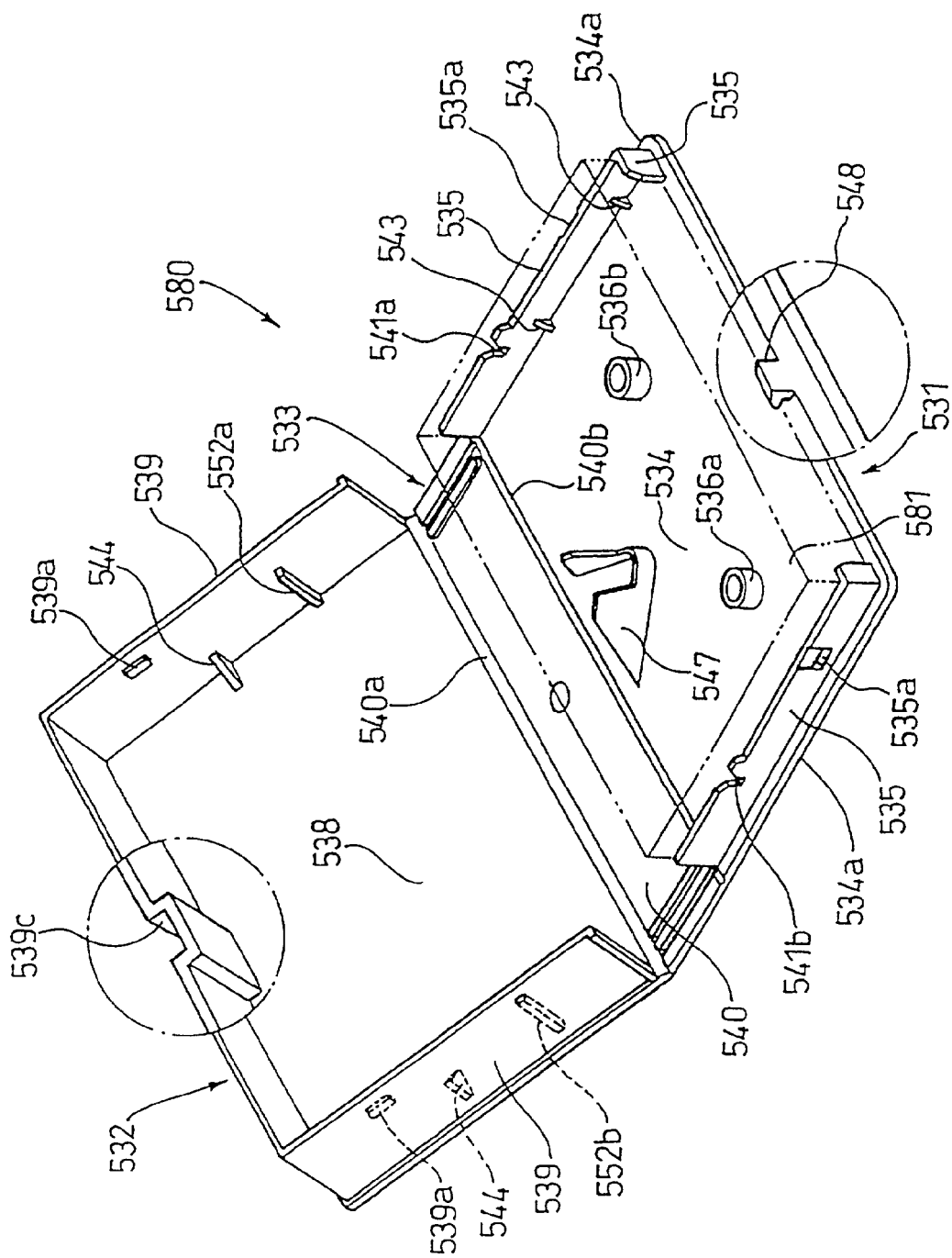
FIG. 17 is a magnetic tape cassette storage case according to the seventh embodiment of the present invention in the opened state.

The seventh embodiment of the magnetic tape cassette storage case is described in detail. FIG. 17 is a perspective view showing the structure of the storage case, and FIG. 18 is a cross-sectional view showing the principal structure of the storage case.

The structure of the storage case of this embodiment is the same as the storage case 1850 shown in FIG. 50 except for the portions that are the characteristics of the present invention. Therefore, the portions other than the characteristics of the present invention will not be described here unless otherwise specially required.

FIG. 17 is a storage case 580 for magnetic tape cassette 580 according to the seventh embodiment of the present invention in the opened state. In the storage case 580, a recess 539c is formed on the outer wall surface of the second sidewall portion 539 constituting the lid section 532. On the other hand, the first sidewall portion 535 is formed along two sides of the outer periphery of the first plate portion 534 constituting the storage section 531, and a locking projection 548 projecting inwardly is formed thereon as well. The second sidewall portion 539 is larger in width in comparison with the locking projection 548 described above, so as to facilitate the user to place his/her fingers.

Figure 18:
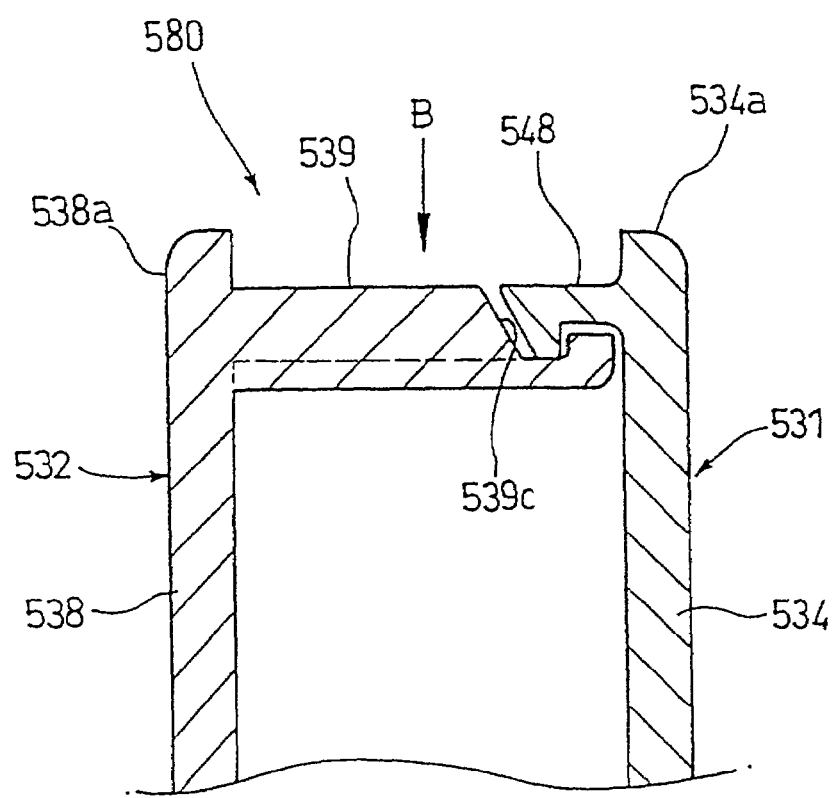
FIG. 18 is a cross-sectional view showing the structure of the principal portion of the storage case.

In this arrangement, when the storage case 580 is closed as shown in FIG. 18, the tip portion of the locking projection 548 engages the locking recess 539c. When the storage case 520 is opened, the user places his/her fingers on the first and the second overhanging portions 534a, 538a and presses on the thicker portion, or the second sidewall portion 539, in the direction B. Then the second sidewall portion 539 deflects in the direction B. As a consequent, the locking recess 539c moves in the direction B to release the engagement with the locking projection 548, and thus the storage case can be opened smoothly.

The magnetic tape cassette to be stored in the embodiment described above is not limited to the DVC, but other magnetic tape cassette may be stored by modifying the dimensions of the respective parts and the locking structure.

Referring now to the attached drawings, the eighth embodiment of the present invention will be described.

Figure 54:
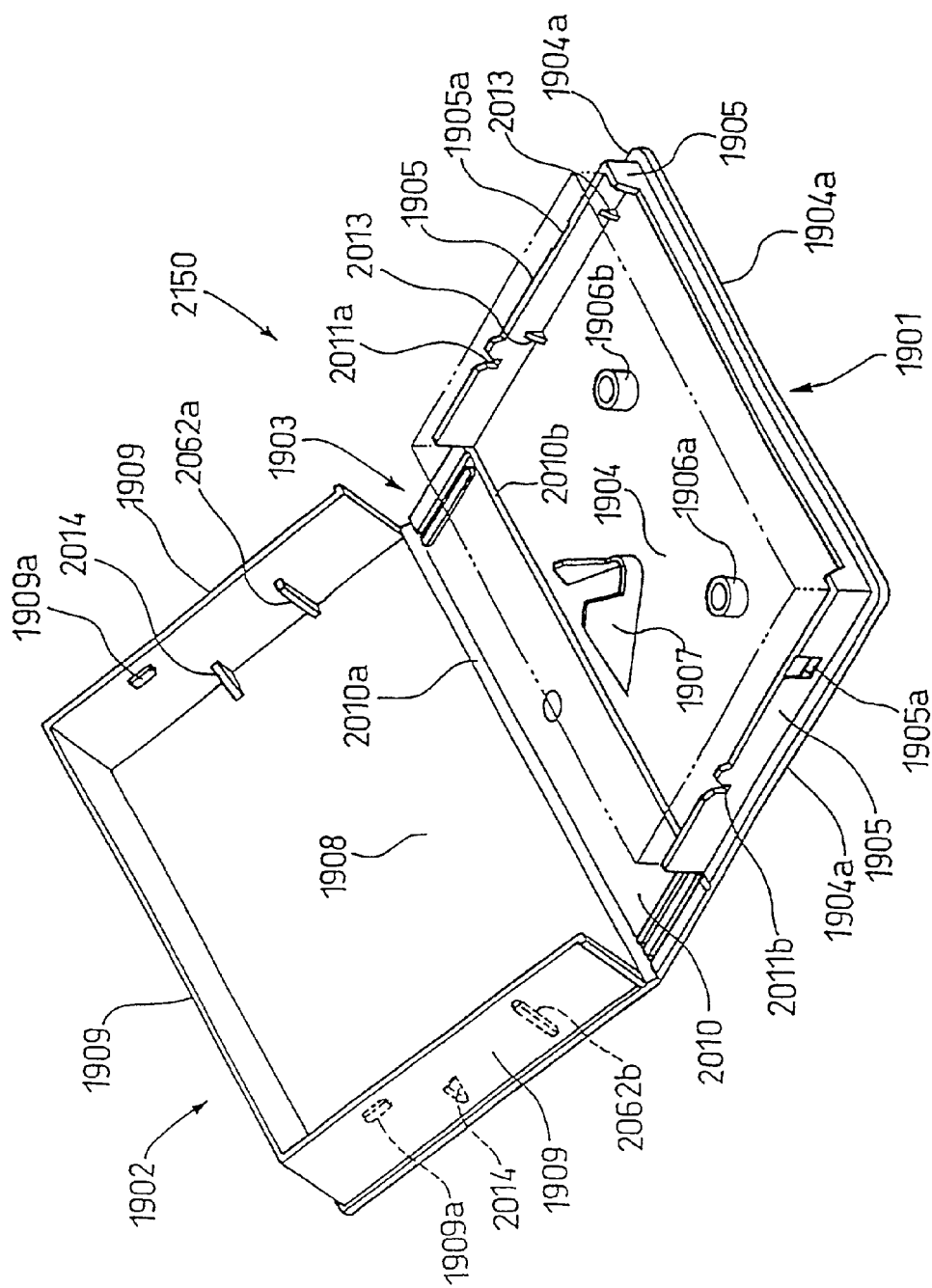
FIG. 54 is a perspective view showing an example of the magnetic tape cassette storage case of the related art.
Figure 55:
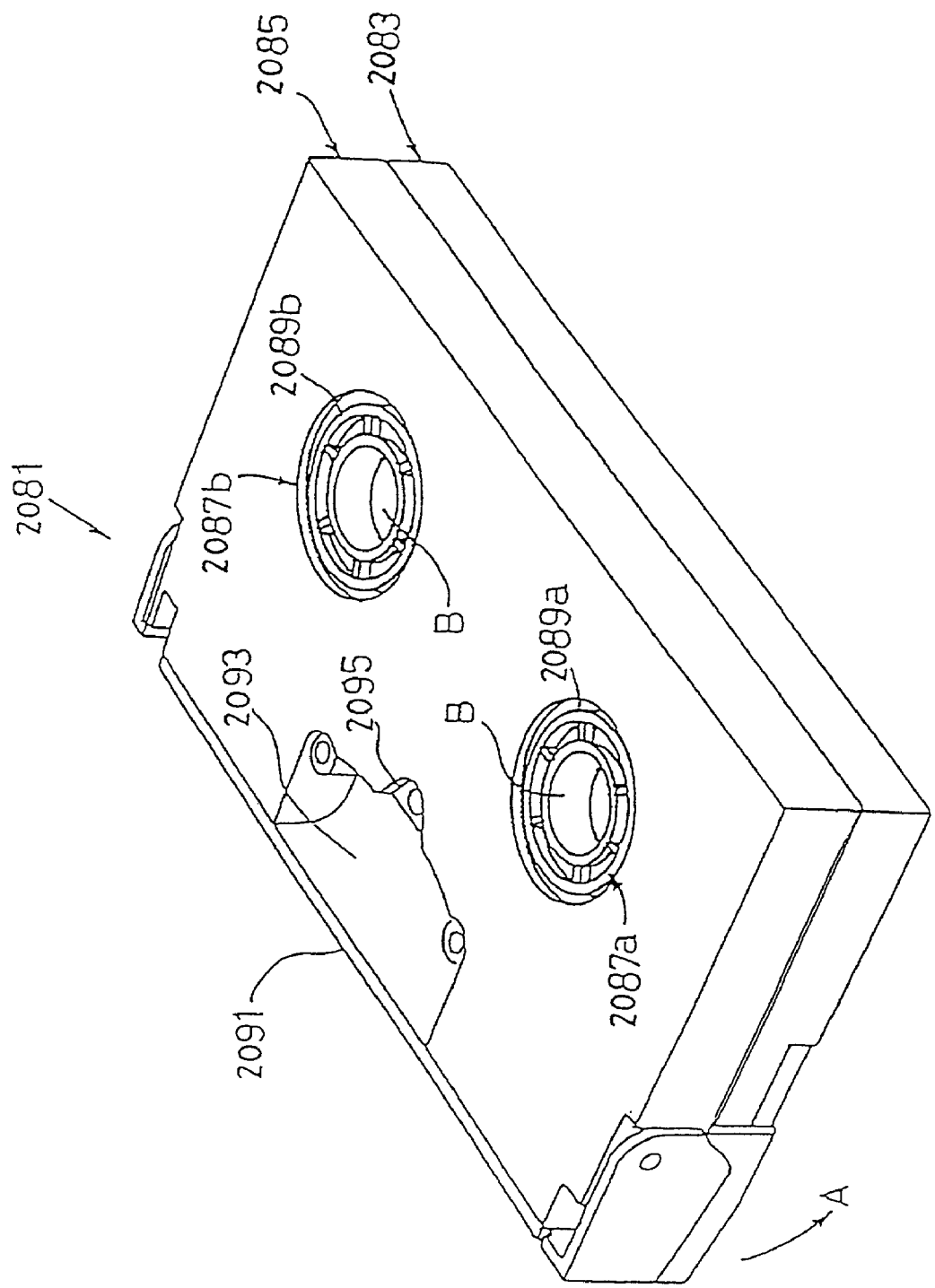
FIG. 55 is a perspective view of the magnetic tape cassette to be stored in the magnetic tape cassette storage case.
Figure 56:
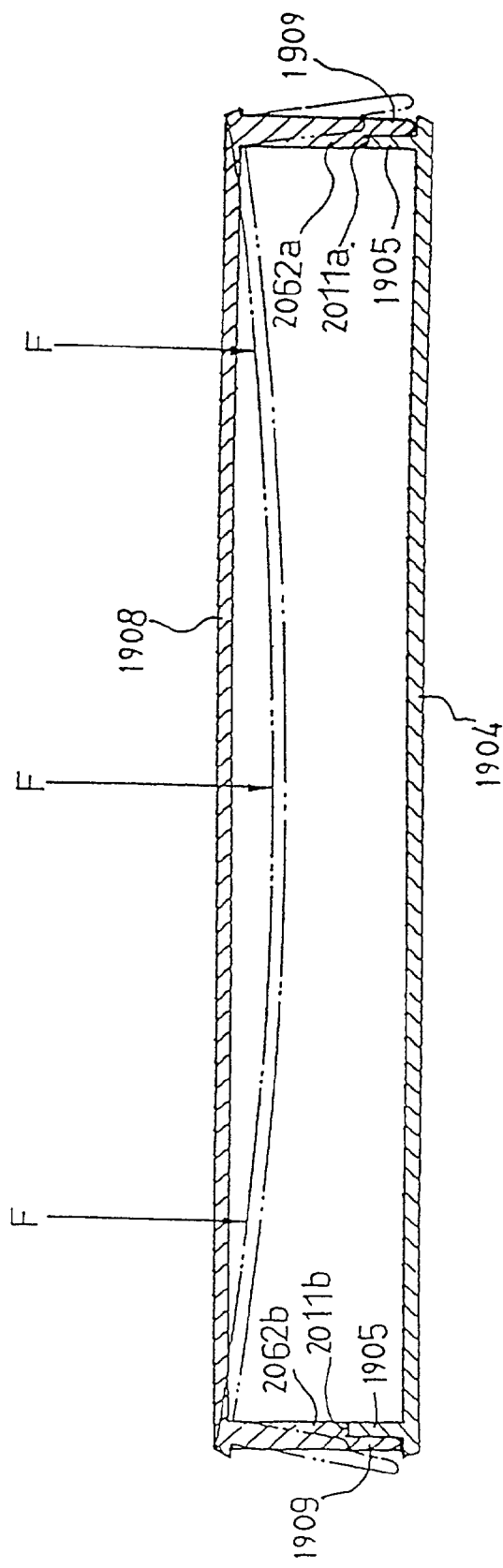
FIG. 56 is a drawing showing a state in which the lid section is deformed when a pressurized force is applied.
Figure 57:
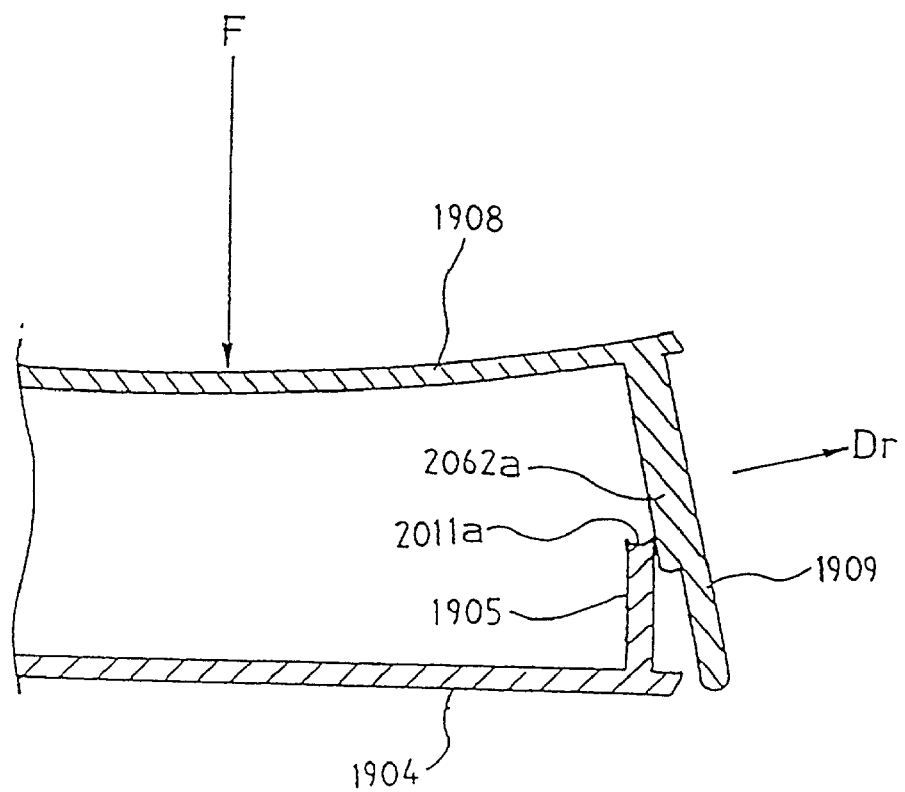
FIG. 57 is a drawing showing a state in which the storage section and the lid section are not engaged.
Figure 58:
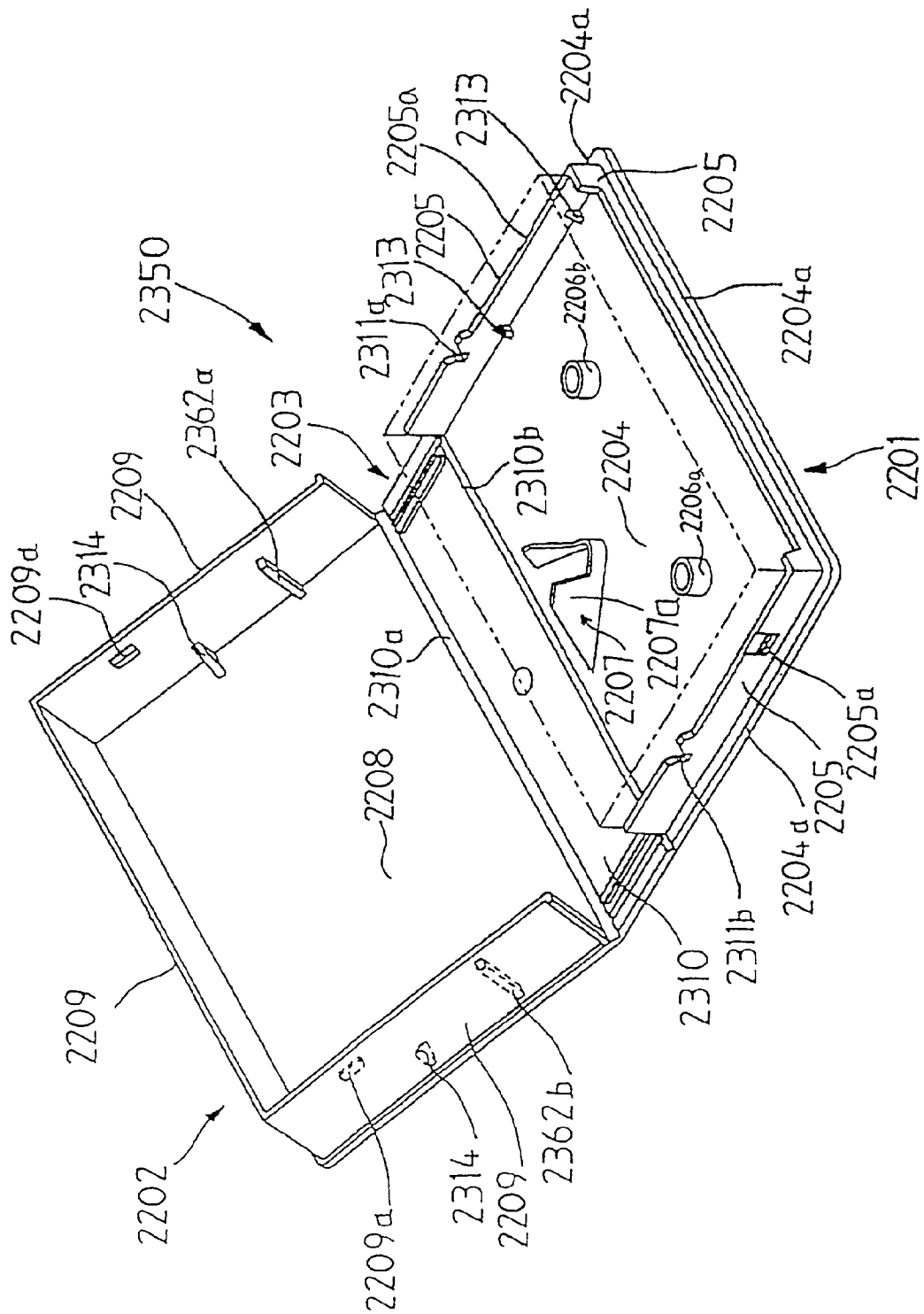
FIG. 58 is a perspective view showing an example of the magnetic tape cassette storage case of the related art.

The structure of the storage case of this embodiment is the same as the storage case 2150 shown in FIG. 54 except for the portions that are the characteristics of the present invention. Therefore, the portions other than the characteristics of the present invention will not be described or will be simplified here unless otherwise specially required.

Figure 19:
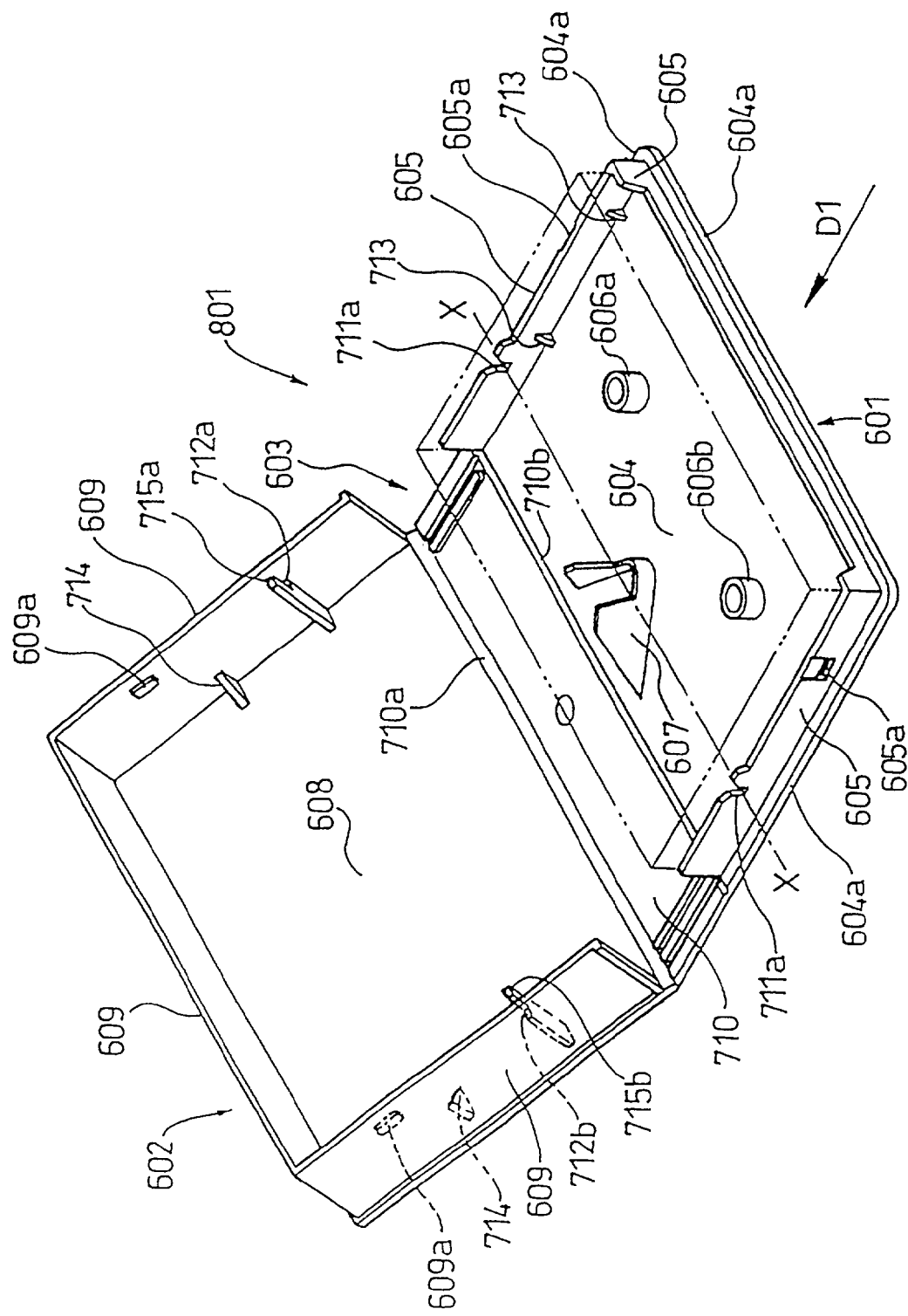
FIG. 19 is a perspective view showing the magnetic tape cassette storage case according to the eighth embodiment of the present invention.

FIG. 19 is a perspective view of the magnetic tape storage case according to the eighth embodiment of the present invention. The characteristic structure of this embodiment includes fitting portions 715a, 715b.

Figure 20:
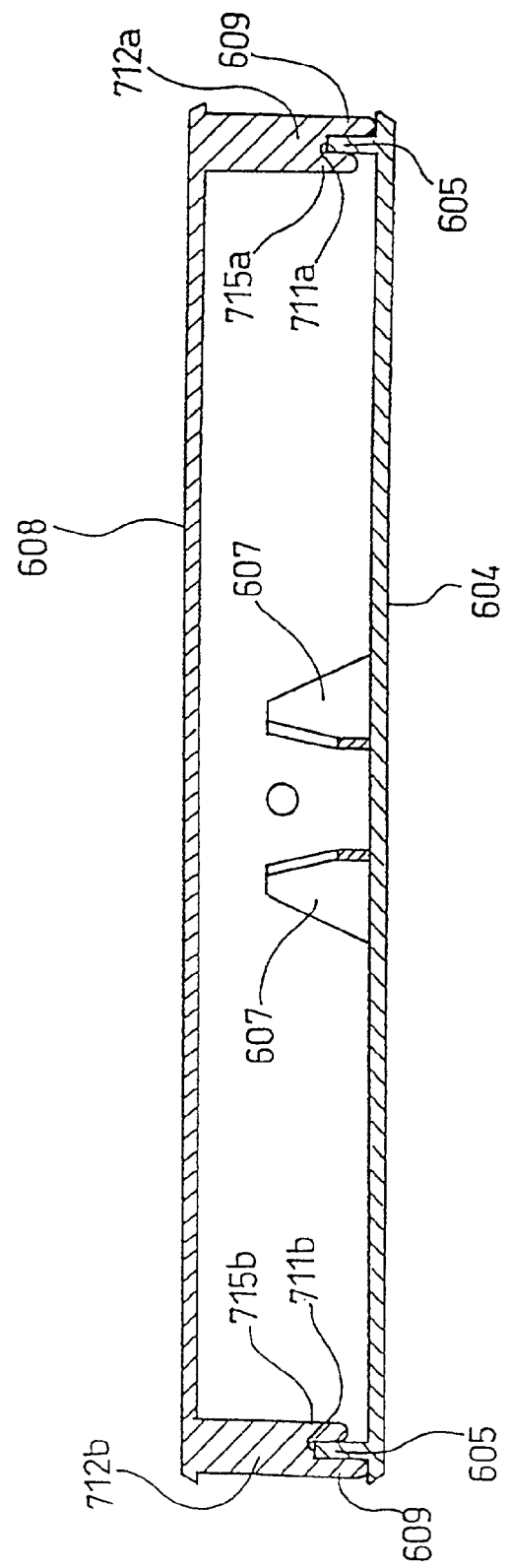
FIG. 20 is a cross-sectional view taken along the line X—X of FIG. 19.

Referring now to FIG. 20, the fitting portions 715a, 715b will be described. FIG. 20 is a cross-sectional view taken along the line X—X in FIG. 19, viewed in the direction shown by the arrow D1. However, the storage case 801 is in the closed state and the magnetic tape cassette is not stored therein. As is apparent from FIG. 20, the positioning ribs 712a, 712b fit on the fitting recesses 711a and 711b respectively, and the fitting portions 715a, 715b, which are in parallel with the positioning ribs 712a, 712b and extend inside the positioning ribs 712a, 712b, abut against the inner surface of the first sidewall portion 605. In this arrangement, the second sidewall portion 609 and the fitting portions 715a, 715b clamp the first sidewall portion 605 and the engaging recesses 711a, 711b, and as a consequent, displacement or deformation of the second sidewall portion 609 in the lateral direction in FIG. 20 is prevented. In addition, the fitting portions 715a, 715b serve as a deformation and displacement preventing member for the positioning ribs 712a, 712b.

Figure 21:
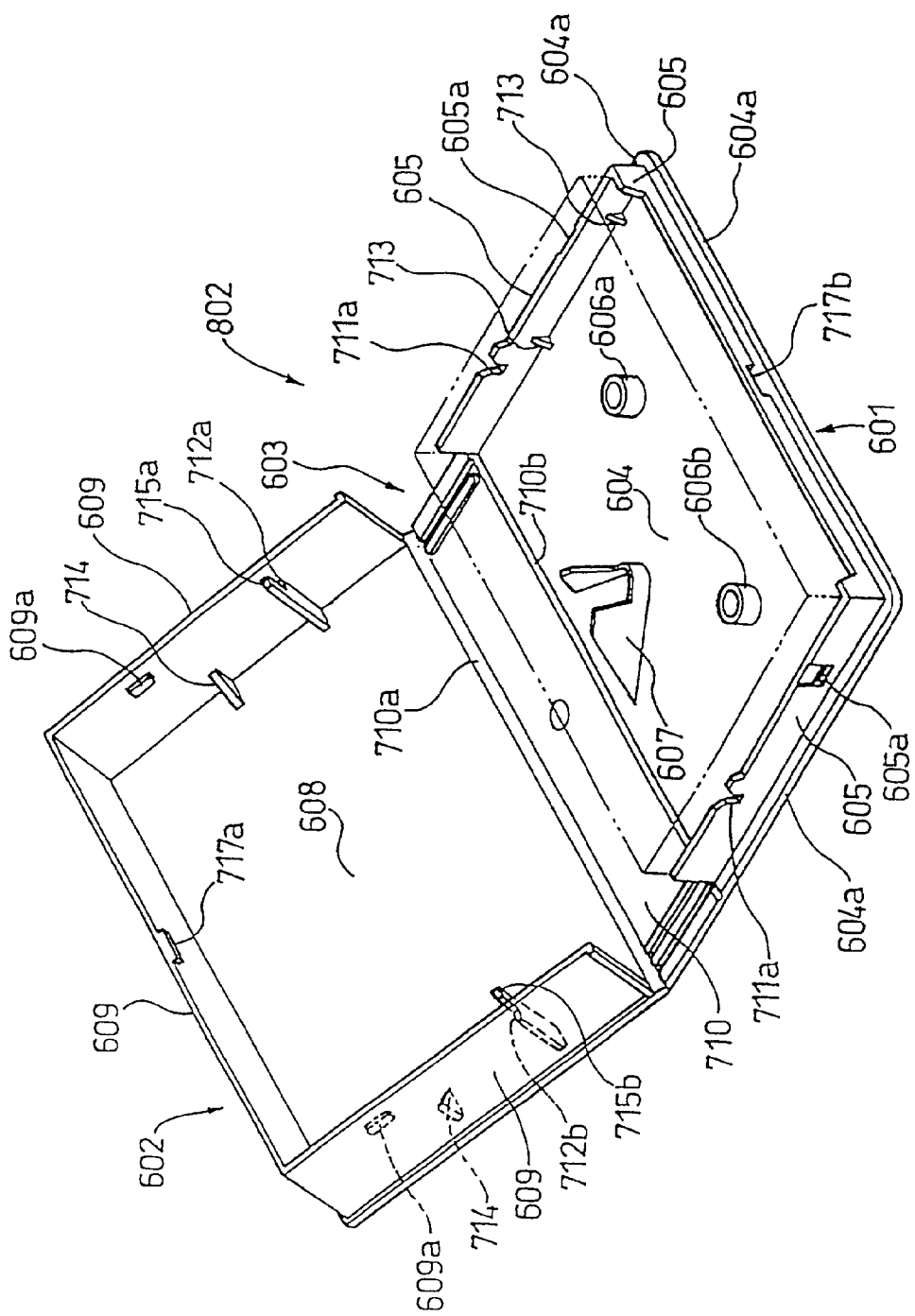
FIG. 21 is a perspective view of the magnetic tape cassette storage case according to the ninth embodiment of the present invention.

FIG. 21 shows a magnetic tape storage case 802 according to the ninth embodiment of the present invention. The characteristic structure of the present invention includes fitting portions 715a, 715b and a locking mechanism 717a, 717b. The locking mechanism comprises a projection 717a and a recess 717b, which are disposed at the longitudinal center of the second sidewall portion 609 and the first sidewall portion 605 respectively. In this embodiment, the projection 717a is formed on the lid section 602, and the recess 717b is formed on the storage section 601. However, it is also possible to form the recess on the lid section 602 and the projection on the storage section 601. With the provision of the locking mechanism, even when a vertically pressurizing force is applied to the plate potion of the storage case 802, irregular opening of the storage case can be prevented. By preventing irregular opening, the unforeseen resilient deformation of the sidewall portions 605, 609 can be prevented, and thus displacement or deformation of the sidewall portion of the storage case as a result of the resilient deformation may be prevented.

Figure 22:
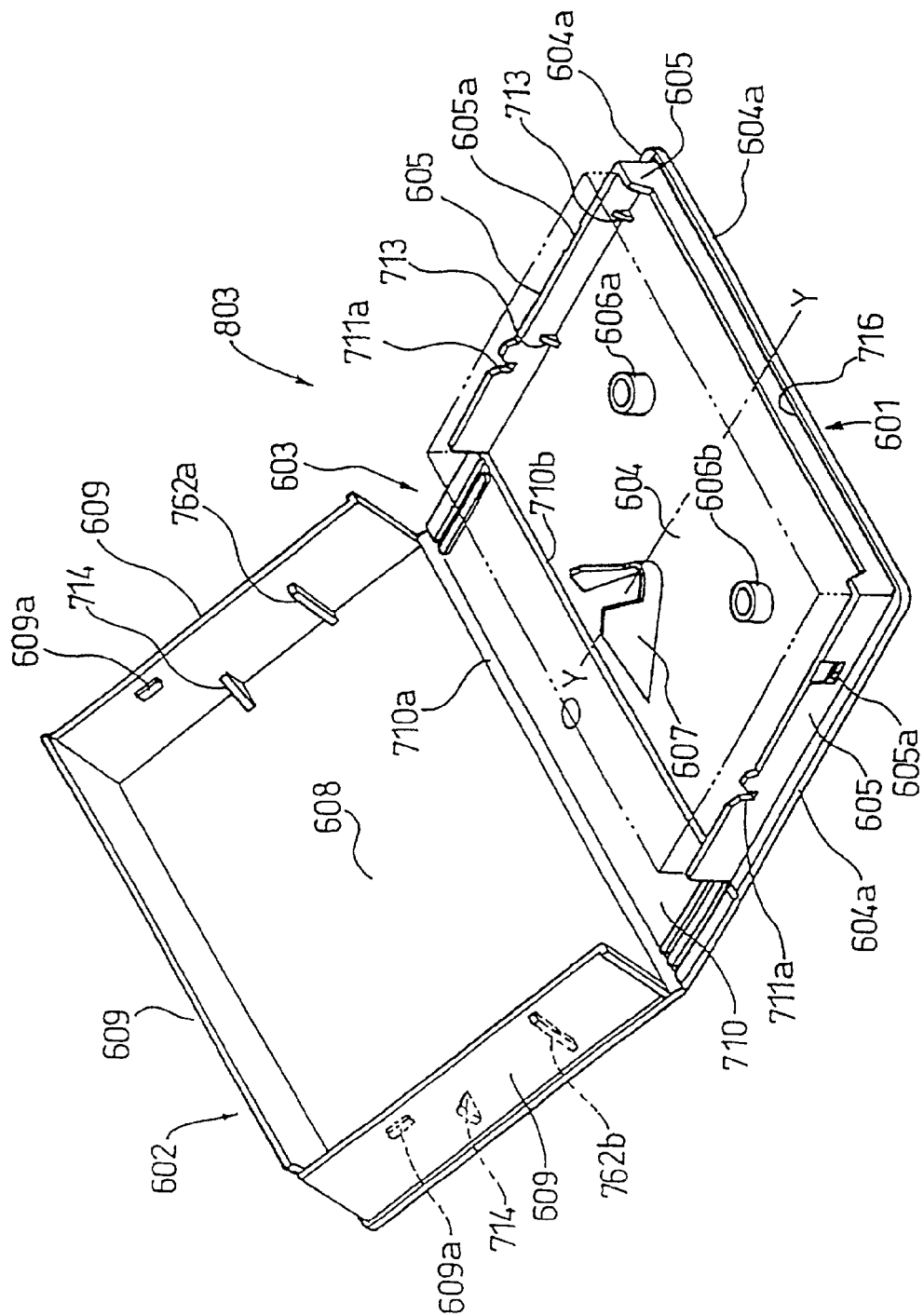
FIG. 22 is a perspective view of the magnetic tape cassette storage case according to the tenth embodiment of the present invention.

FIG. 22 shows a magnetic tape storage case 803 according to the tenth embodiment of the present invention. The characteristic structure of this embodiment includes a fitting groove 716. The elongated portion, which faces to the connecting section 603 in parallel when the case is closed, of the second sidewall portion 609 of the lid section 602 is molded so as to fit into the fitting groove 716. More specifically, the width to the edge of elongated portion is formed relatively wider than other portions.

Figure 23:
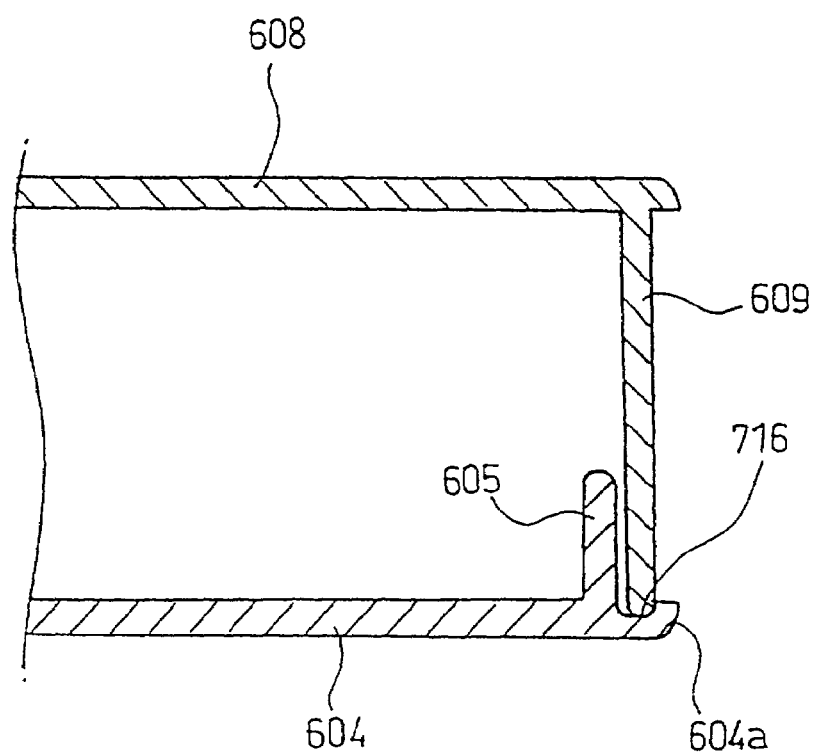
FIG. 23 is a cross-sectional view taken along the line Y—Y of FIG. 22.

Referring now to FIG. 23, the fitting groove 716 will be described. FIG. 23 is a cross-section taken along the line Y—Y in FIG. 22. The storage case 803 is in the closed state, and the magnetic tape cassette is not stored herein. As is apparent from FIG. 23, the edge of the second sidewall portion 609 is fitted in the fitting groove 716 extending on the overhanging portion 604a. With this fitting, displacement and deformation in the lateral direction in FIG. 22 can be prevented. In addition, though the fitting groove 716 that fits with the elongated portion of the second sidewall portion 609 is shown in this embodiment, it is also conceivable that a fitting groove in which the shorter portion of the second sidewall portion 709 is fitted is further provide.

Figure 24:
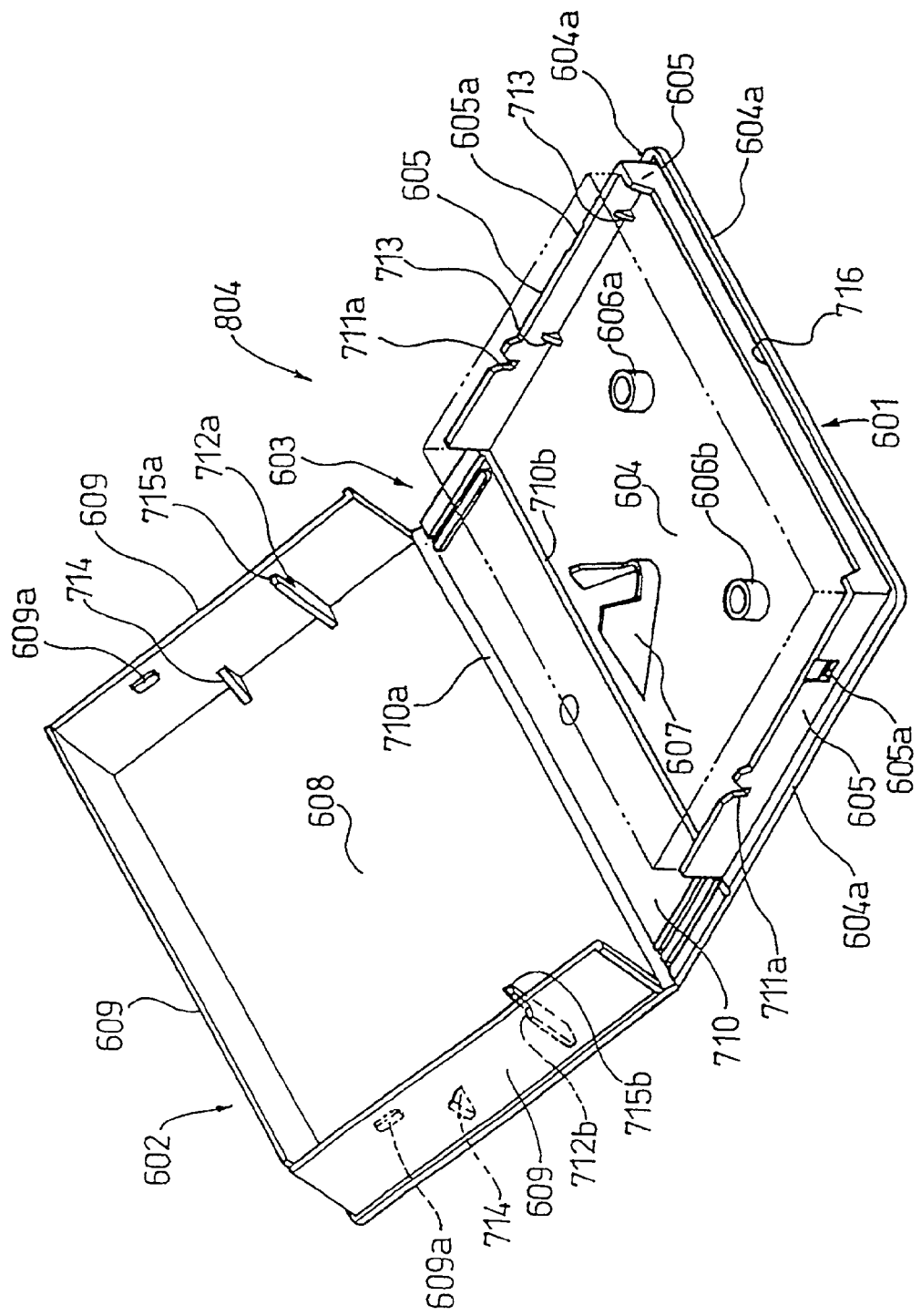
FIG. 24 is a perspective view of the magnetic tape cassette storage case according to the eleventh embodiment of the present invention.

In FIG. 24, the storage case for magnetic tapes 804 according to the eleventh embodiment of the present invention is shown. The characteristic structure of this embodiment includes fitting portions 715a, 715b and a fitting groove 716.

Figure 25:
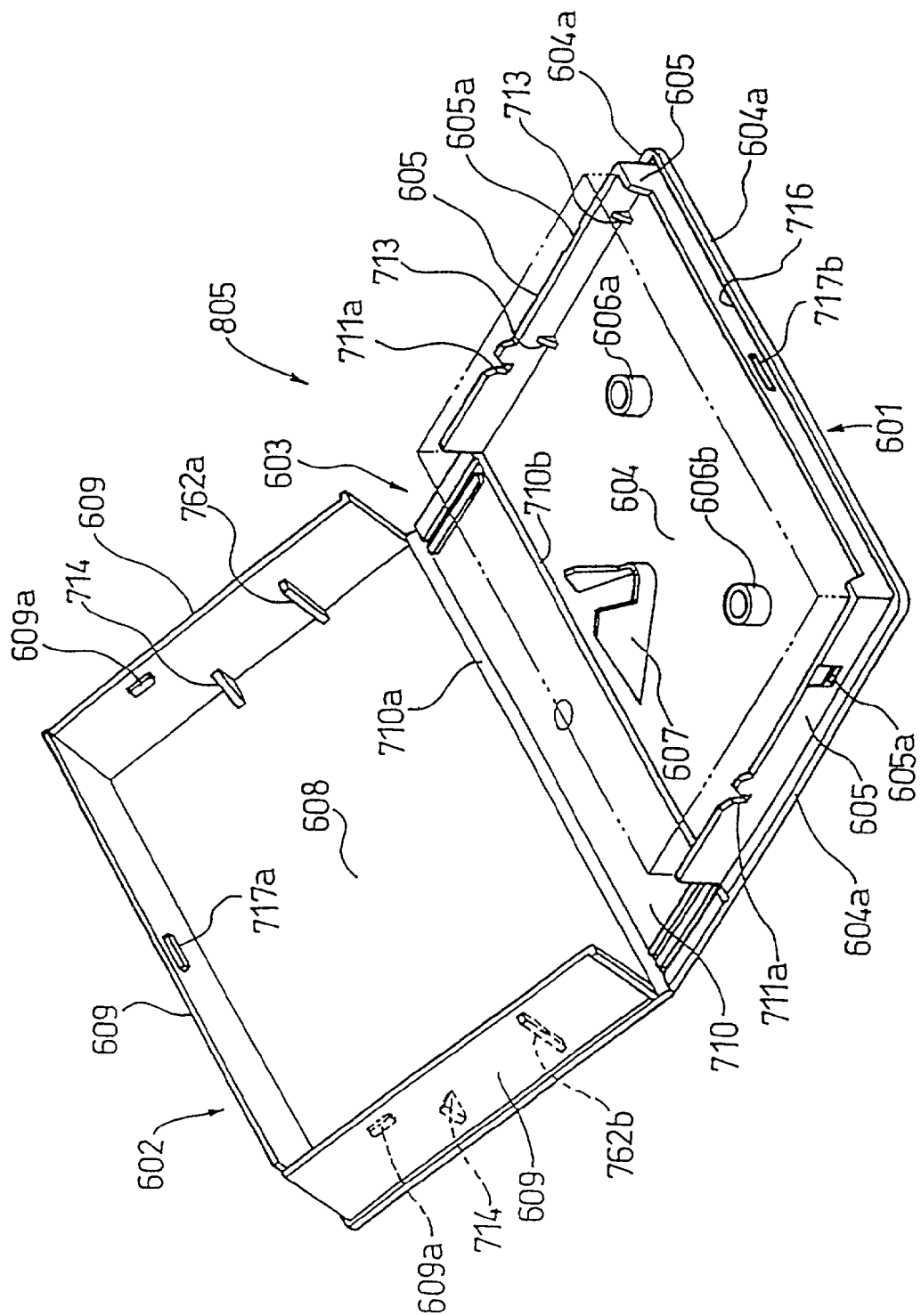
FIG. 25 is a perspective view of the magnetic tape cassette storage case according to the twelfth embodiment of the present invention.

FIG. 25 shows a storage case for magnetic tapes 805 according to the twelfth embodiment of the present invention. The characteristic structure of this embodiment includes a fitting groove 718 and a locking mechanism 717a, 717b.

Figure 26:
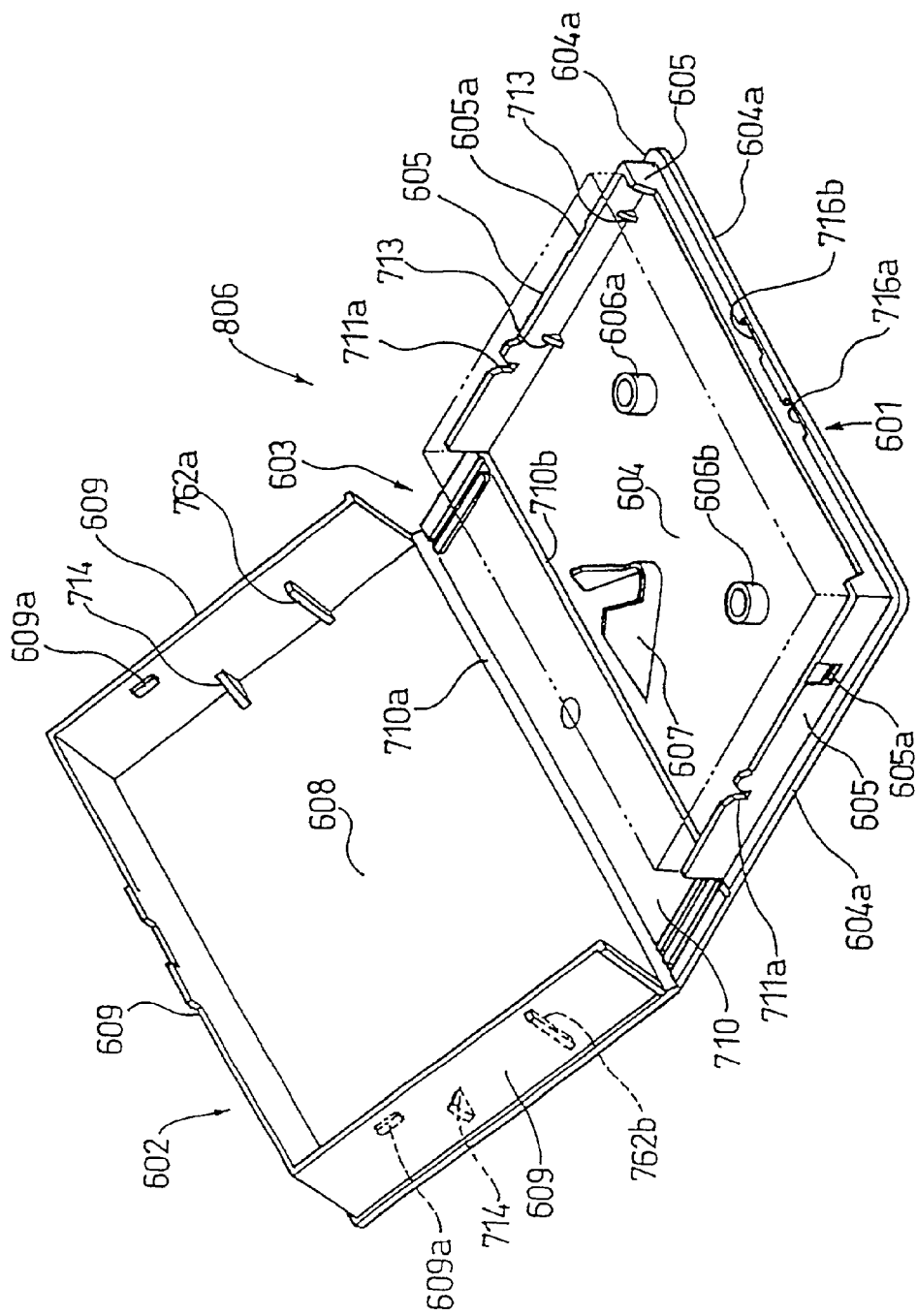
FIG. 26 is a perspective view of the magnetic tape cassette storage case according to the thirteenth embodiment of the present invention.

FIG. 26 shows a storage case for magnetic tapes 806 according to the thirteenth embodiment of the present invention. The characteristic structure of this embodiment includes a fitting grooves 716a, 716b. This embodiment is characterized in that two fitting grooves 716a, 716b exist, and in that the two portions of the second sidewall portion 609 are formed slightly wider in order to be fitted in the fitting grooves 716a, 716b. In addition, though the fitting grooves 716a, 716b to be fitted with the elongated portion of the second sidewall portion 609 is shown in this embodiment, it is also conceivable that the fitting groove in which the shorter portion of the second sidewall portion 609 is fitted is further provided.

Figure 27:
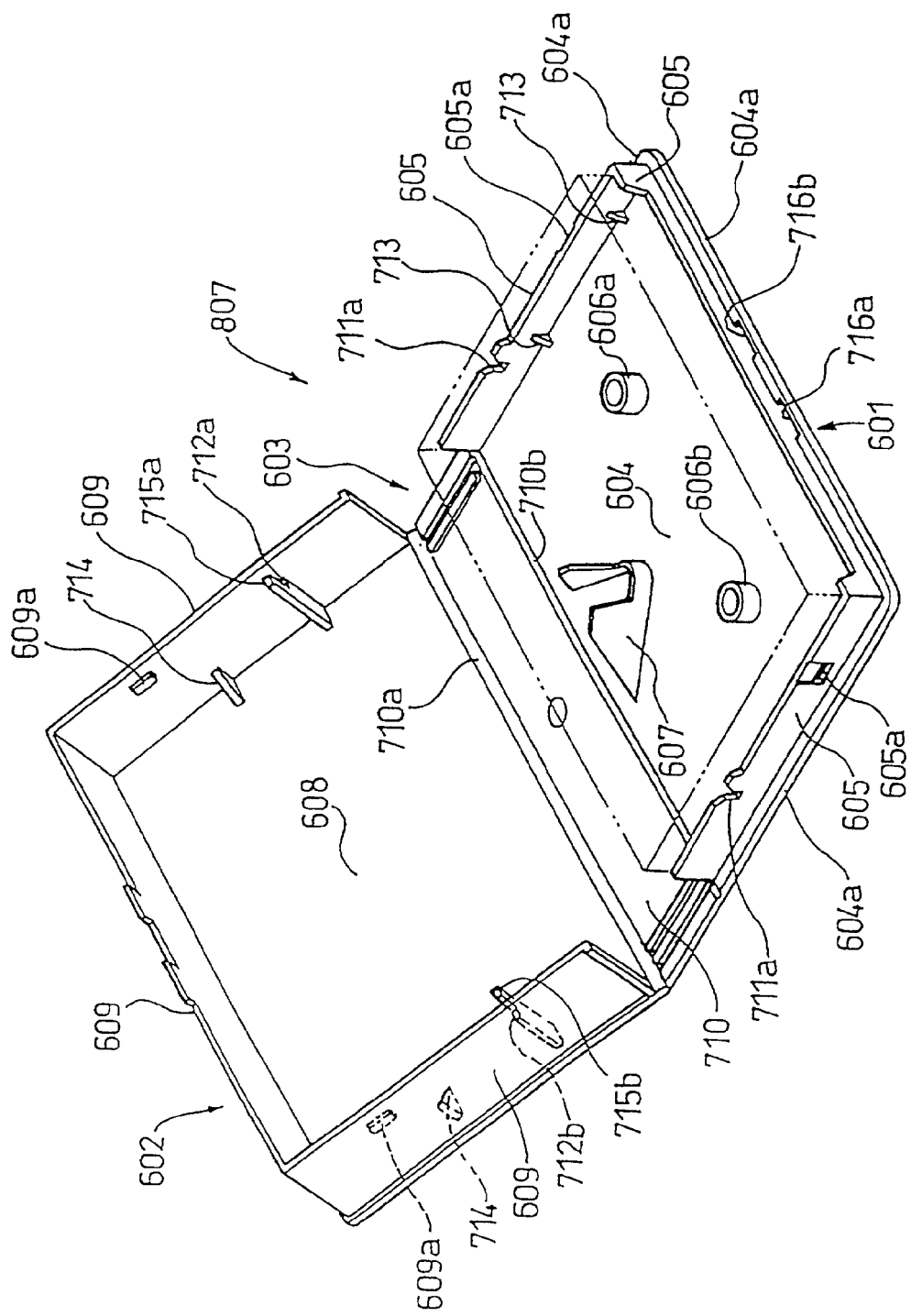
FIG. 27 is a perspective view of the magnetic tape cassette storage case according to the fourteenth embodiment of the present invention.

FIG. 27 shows a storage case for magnetic tapes 807 according to the fourteenth embodiment of the present invention. The characteristic structure of this embodiment includes the fitting portions 715a, 715b, and the fitting grooves 716a, 716b.

Figure 28:
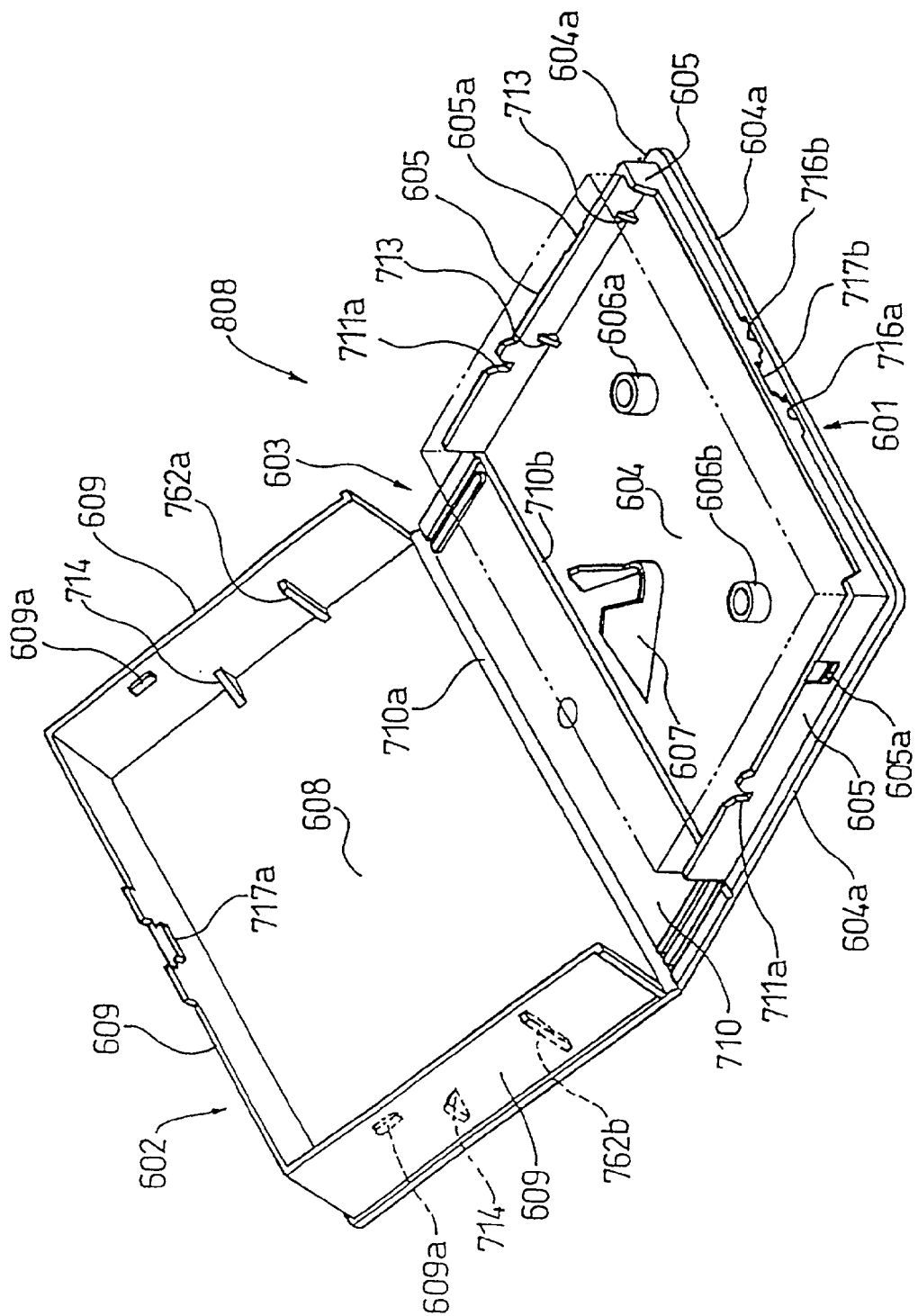
FIG. 28 is a perspective view of the magnetic tape cassette storage case according to the fifteenth embodiment of the present invention.

FIG. 28 shows a storage case for magnetic tapes 808 according to the fifteenth embodiment of the present invention. The characteristic structure of this embodiment includes fitting grooves 716a, 716b and a locking mechanism 717a, 717b.

Figure 29:
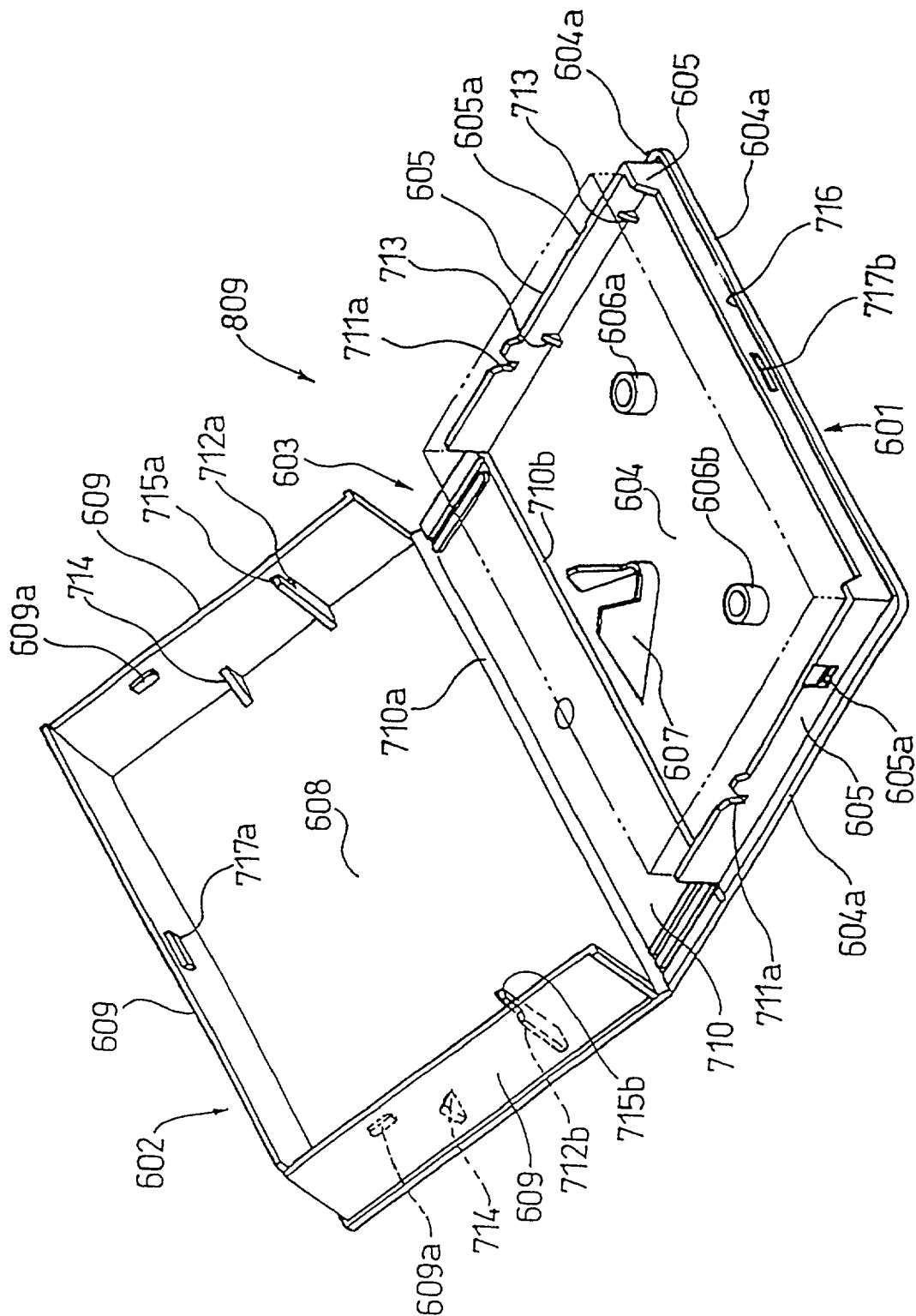
FIG. 29 is a perspective view of the magnetic tape cassette storage case according to the sixteenth embodiment of the present invention.

FIG. 29 shows a storage case for magnetic tapes 809 according to the sixteenth embodiment of the present invention. The characteristic structure of this embodiment includes fitting portions 715a, 715b, a fitting groove 716, and a locking mechanism 717a, 717b.

Figure 30:
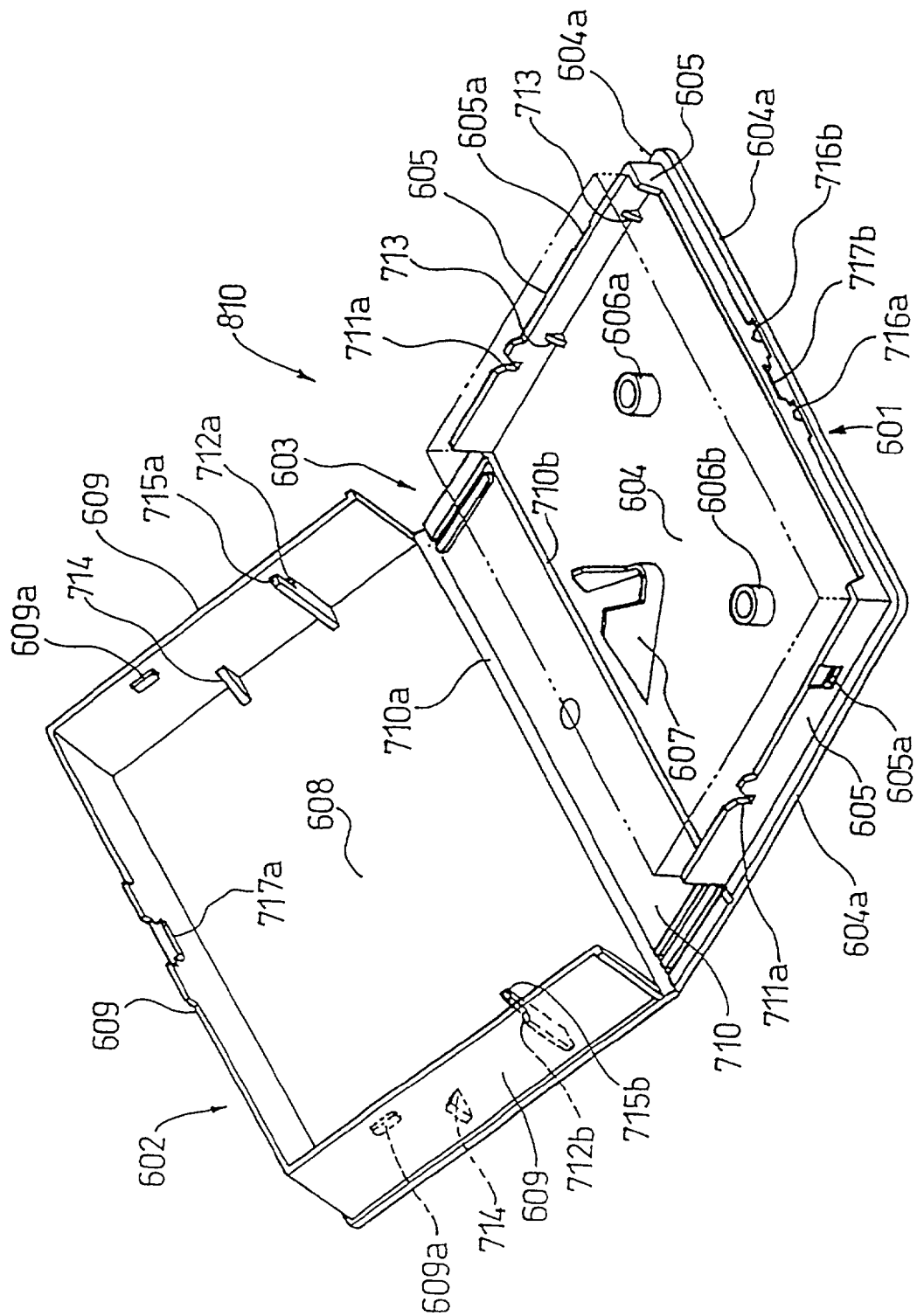
FIG. 30 is a perspective view of the magnetic tape cassette storage case according to the seventeenth embodiment of the present invention.

FIG. 30 shows a storage case for magnetic tapes 810 according to the seventeenth embodiment of the present invention. The characteristic structure of this embodiment includes fitting portions 715a, 715b, fitting grooves 716a, 716b, and a locking mechanism 717a, 717b.

The embodiments described above may be applied to the magnetic tape cassettes other than the DVC.

Referring now to the drawings, the eighteenth embodiment of the present invention will be described.

Figure 31:
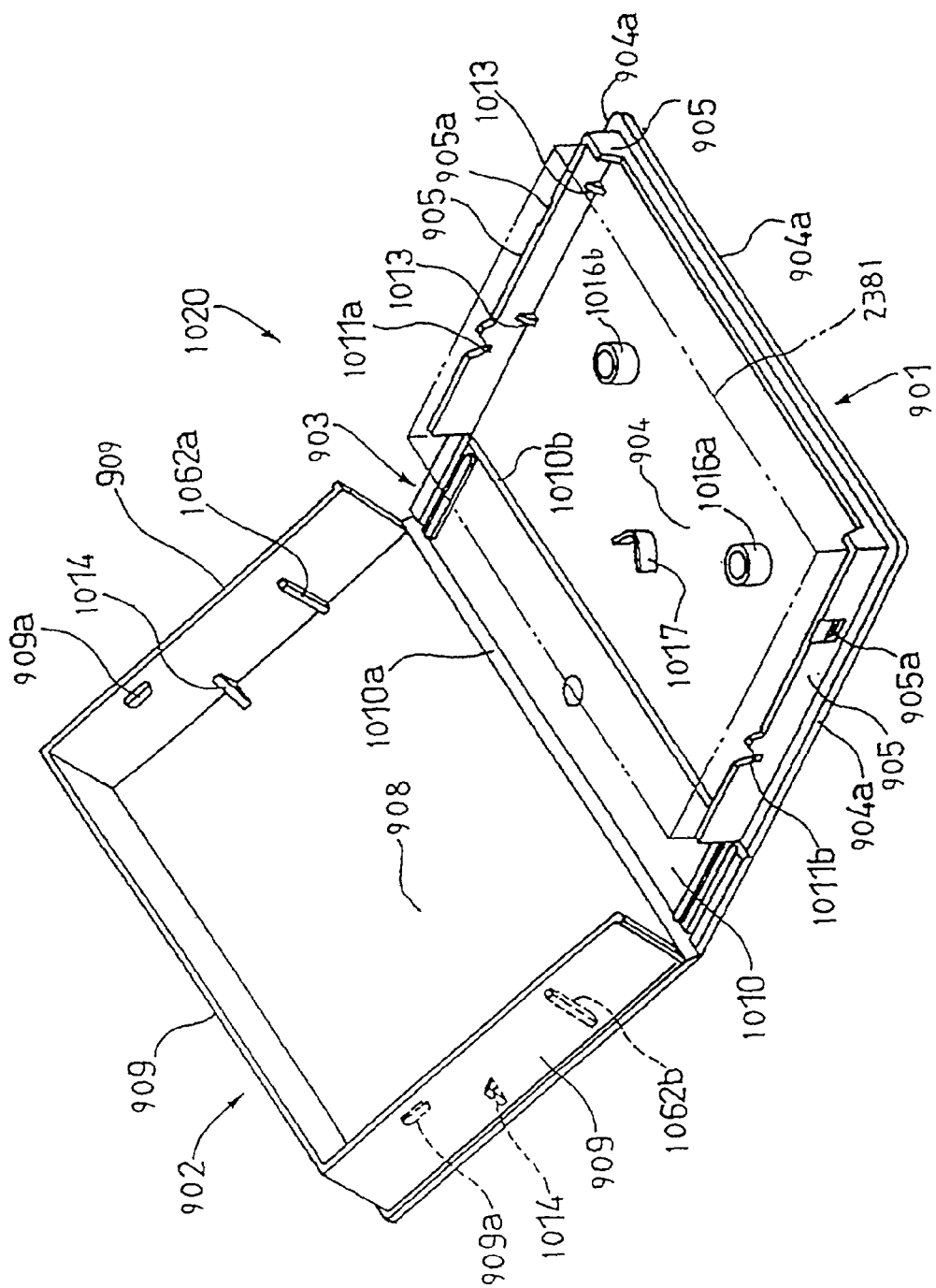
FIG. 31 is a perspective view of the magnetic tape cassette storage case according to the eighteenth embodiment of the present invention.

FIG. 31 is a perspective view showing a storage case for magnetic tapes 1020 according to the eighteenth embodiment of the present invention. The same structure as the storage case 2350 of the related art will not be described, or will be briefly described.

The storage case 1020 of the eighteenth embodiment is formed integrally of synthetic resin, in which the storage section 901 and the lid section 902 are connected via the connecting section 903. The storage section 901 comprises a first plate portion 904, a sidewall portion 905 formed integrally along the outer periphery of the first plate portion 904, a recess locking rib 1017 of V-shape in cross section formed on the first plate portion 904 closer to the front edge, and a pair of reel locking ribs 1016a, 1016b that engage reel hubs of the magnetic tape cassette 2381. When the magnetic tape cassette 1081 is stored properly, it is loosely fitted within the sidewall portion 905 as shown by a phantom line in FIG. 31.

Figure 59:
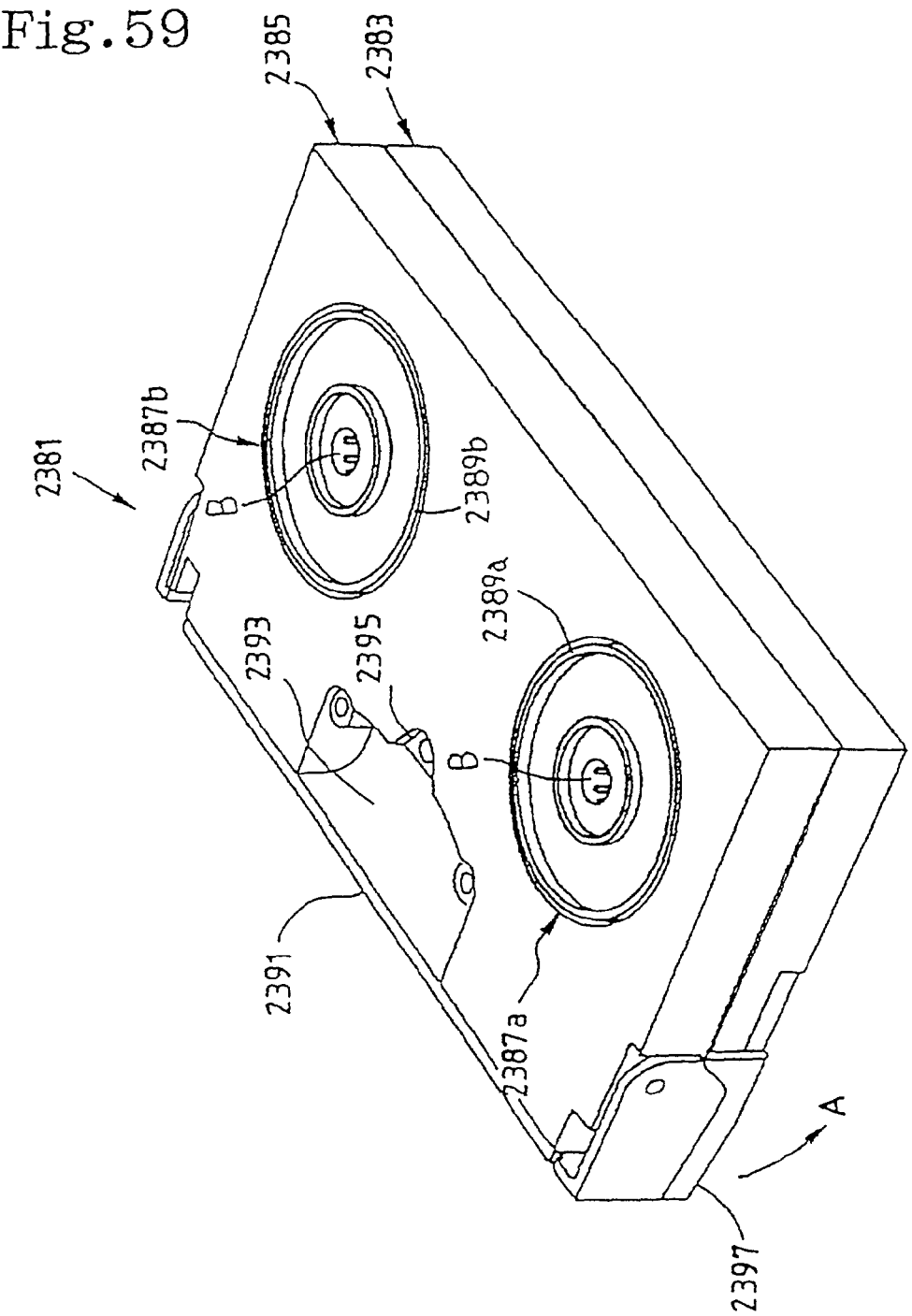
FIG. 59 is a perspective view of the DVC.

The recess locking rib 1017 is described now. The recess locking rib 1017 is not fitted in the front opening 2393 shown in FIG. 59, but fitted in the shoulder 2395. Therefore, the height of the recess locking rib 1017 is set to almost the same dimension as the depth of the shoulder 2395, and the curvature of the side surface of the recess locking rib 1017 is set to almost the same as the curvature of the edge of the shoulder 2395. Since the depth of the engaging hole B shown in FIG. 59 is deeper than the depth of the shoulder 2395, the height of the recess locking rib 1017 is set to be smaller than the height of the reel locking ribs 1016a, 1016b. The recess locking rib 1017 is formed at the rear of the cassette with respect to the top lid 2397.

When the magnetic tape cassette 2381 is stored in the storage case 1020 of the present invention, the front opening 2393 is faced downward, which is upside down of the magnetic tape cassette shown in FIG. 59, so that the magnetic tape cassette 2381 is inserted into the sidewall portion 905 with the shoulder 2395 faced toward the recess locking rib 1017 and the reel locking ribs 1016a, 1016b faced toward the engaging hole B.

Figure 32:
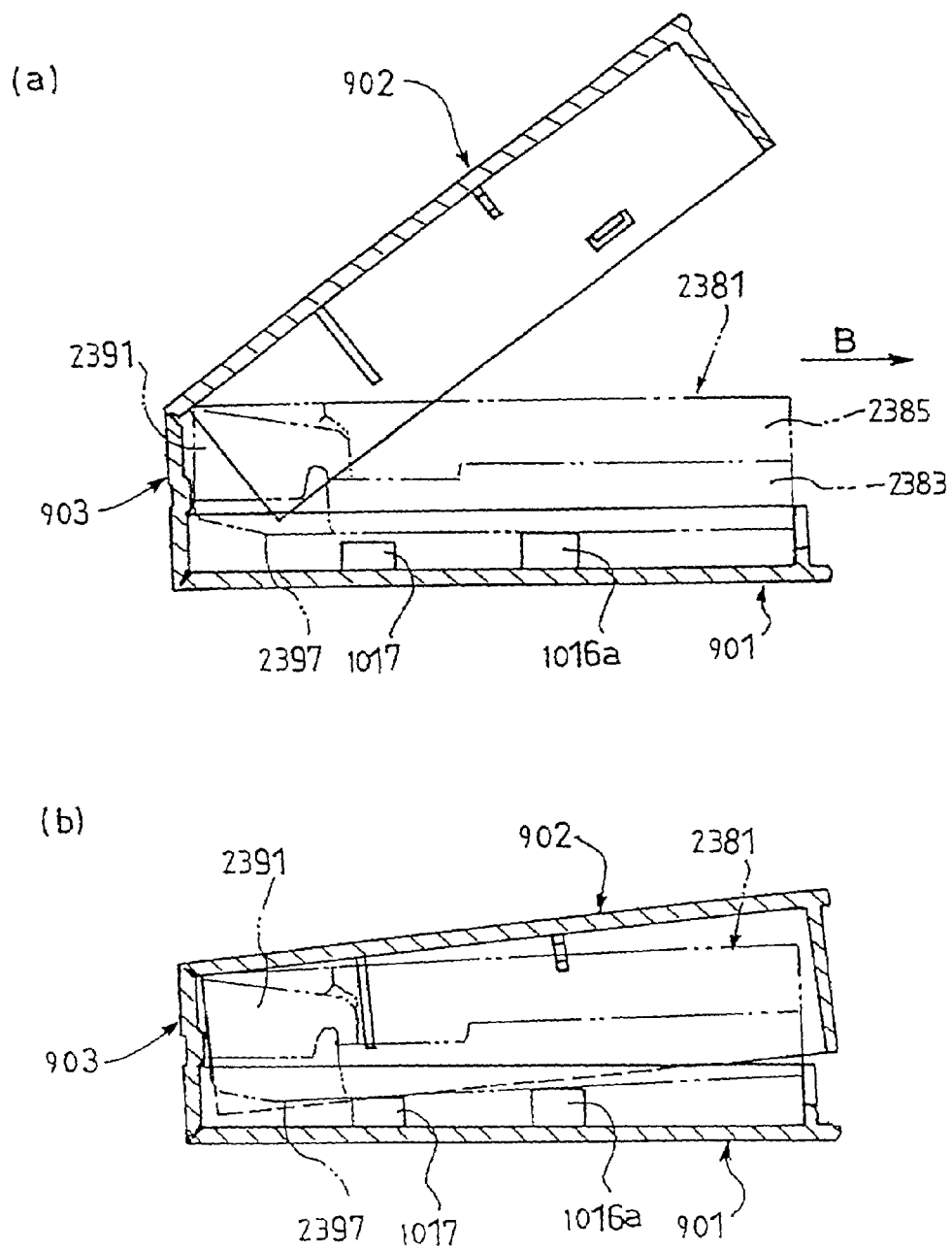
FIG. 32($a$) shows a state in which the magnetic tape cassette 1081 is inserted upside down by mistake, and (b) is a state in which the lid is closed in the state of (a).

When the magnetic tape cassette 2381 is inserted upside down in a wrong way as shown in FIG. 32(a), since the recess locking rib 1017 is formed at the rear of the cassette with respect to the top lid 2397, the top lid 2397 and the recess locking rib 1017 do not abut against each other as shown in FIG. 32(b) even if the magnetic tape cassette 2381 is pressed by closing the lid 902. Therefore, deformation and damage of the top lid 2397 may be prevented and thus deformation and damage of the outer lid and the inner lid that are connected thereto may also be prevented to ensure the protection of the magnetic tape.

Figure 60:
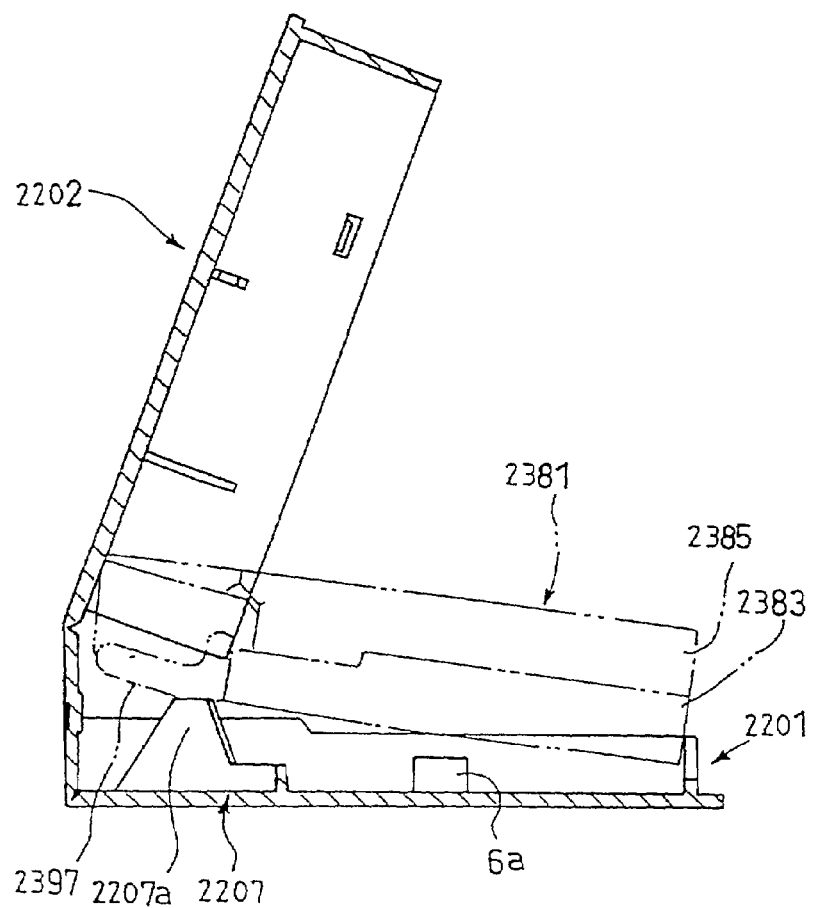
FIG. 60 is a side view of the magnetic tape cassettes stored in the storage section upside down.
Figure 61:
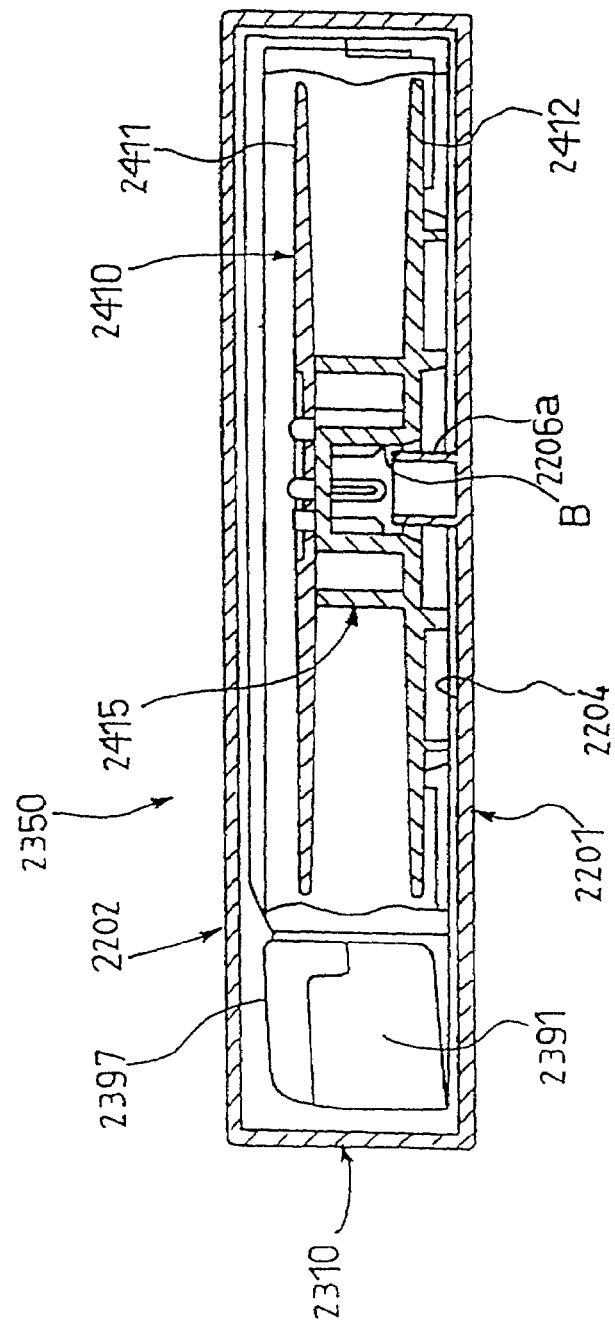
FIG. 61 is a drawing showing a state in which the magnetic tape cassette is properly inserted into the storage section.
Figure 62:
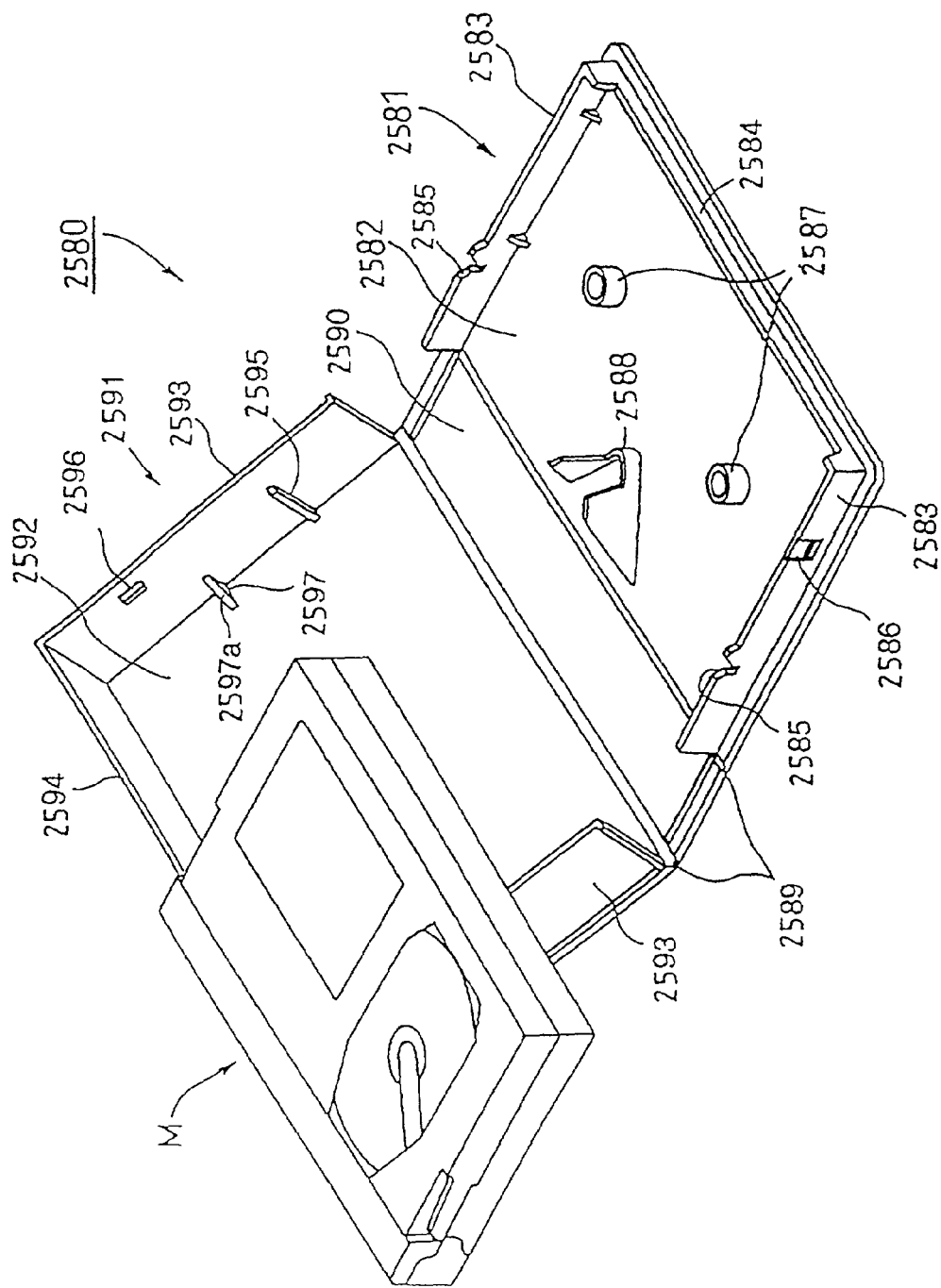
FIG. 62 is a drawing showing the storage case for storing the magnetic tape cassettes of the related art.

Since the rib is not formed with an opening locking portion and the height of the recess locking rib 1017 is set to be lower in comparison with the related art, even when the user inserted the magnetic tape cassette 2381 into the storage section 901 in the state of being shifted backward of the cassette, or in the direction B (shown in FIG. 32(a)), a undue pressing force caused by the height of the rib 7 as shown in FIG. 60 is not applied. Therefore, the deformation and damage of the top lid 2397 may be prevented. Even when it is inserted into the storage section 901 of the storage case 1020 in the proper orientation but in the state of being shifted in the direction B by mistake, a undue pressing force caused by the height of the rib is not applied to the inner lid connected to the inner surface of the top lid 2397 because the height of the recess locking rib 1017 is set to be low, thereby preventing deformation and damage of the inner lid.

Figure 33:
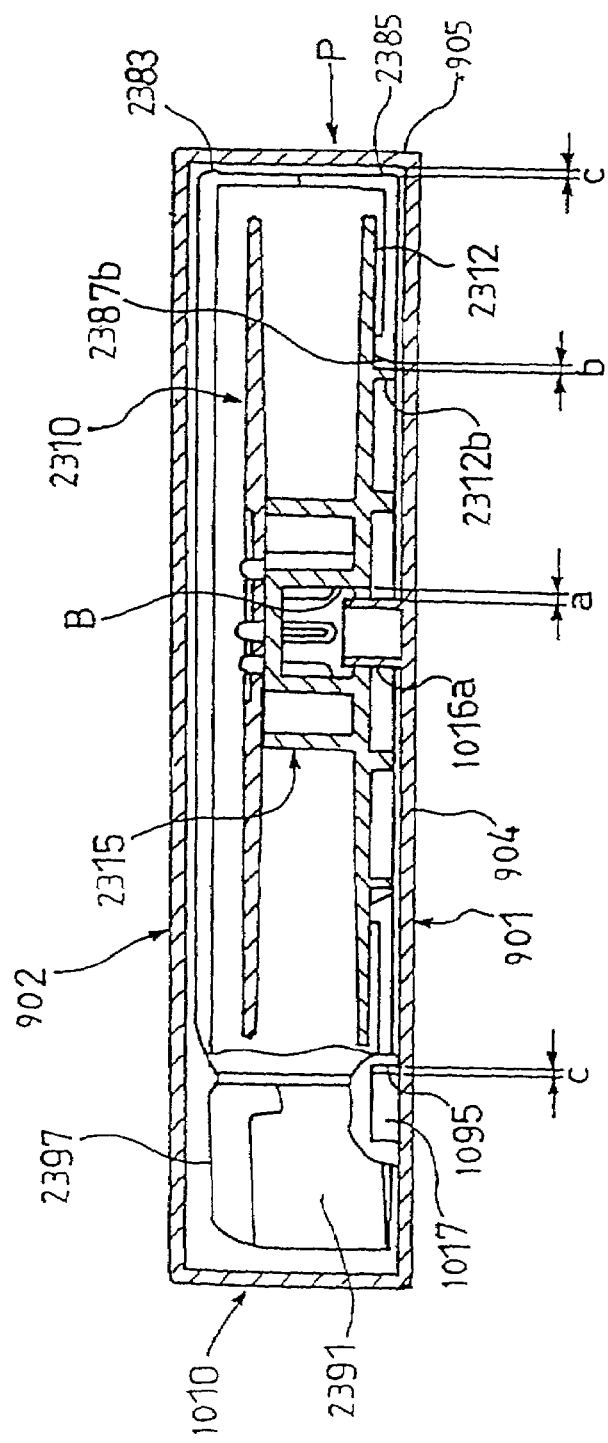
FIG. 33 is a drawing showing a state in which the magnetic tape cassette is properly stored in the storage case.
Figure 34:
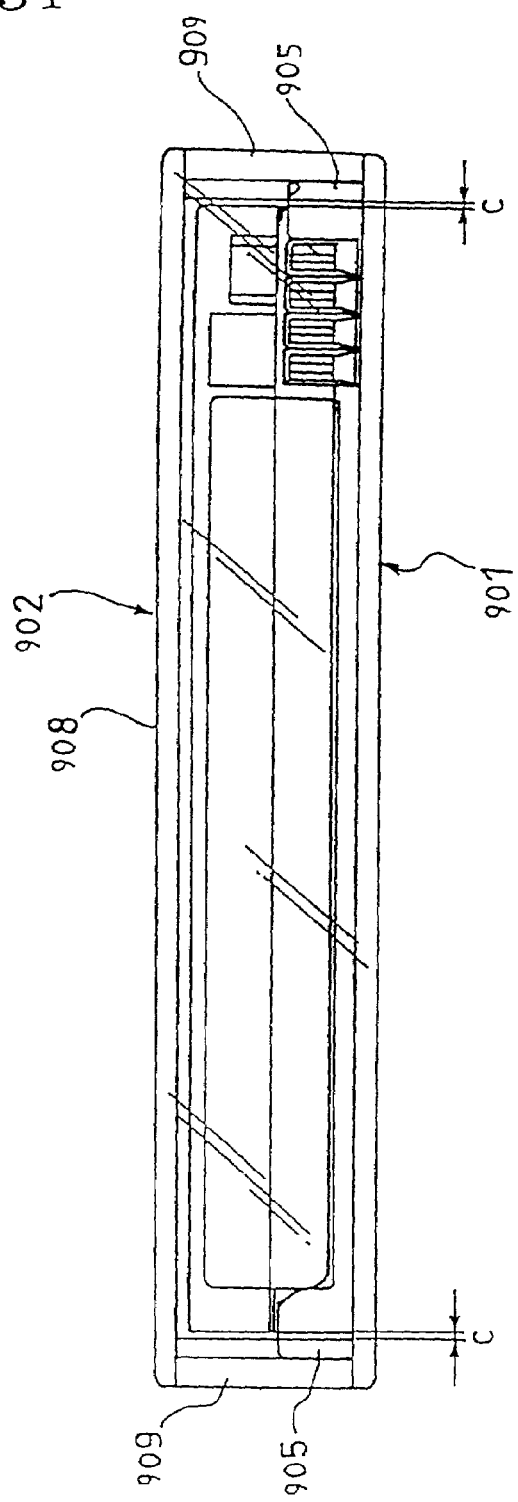
FIG. 34 is a drawing showing the storage case of FIG. 33, viewed from the direction of P.

The characteristic structure of the eighteenth embodiment other than those stated above will be described. FIG. 33 is a magnetic tape cassette properly stored in the storage case, and FIG. 34 is a storage case in FIG. 33 viewed from in the direction P. As shown in FIG. 33, the distance between the reference ring 2312b of the lower reel 2312 constituting the tape reel 2310 and the circular opening 2387b formed on the lower half 2385 is determine to be b. The distance between the engaging hole B of the hub 2315 and the reel locking rib 1016a is set to a. The relation between these distances a and b is set to a>b. In such a dimensional relation, when the storage case drops, the reel reference ring 2312b comes into collision with the wall of the circular opening 2387b of the lower half 2385 in a first place. Then, after absorbing the impact by collision, a load of the engaging hole B of the hub 2315 acts on the reel locking rib 1016a, thereby preventing an excessive load from being applied.

The distance between the rear surface of the cassette and the sidewall portion 905 of the storage section 901 facing thereto is set to c, and the distance between the shoulder 2395 of the cassette and the recess locking rib 1017 is also set to c. In addition, as shown in FIG. 34, the distance between the both surfaces of the cassette and the sidewall portion 905 of the storage section 901 facing thereto are also set to c. In other words, the clearance where the storage case and the cassette come into contact is uniform.

Therefore, since a load applied under vibration is uniform, and thus occurrence of scratches or powder due to rubbing between the storage case and the cassette can be dispersed.

Figure 35:
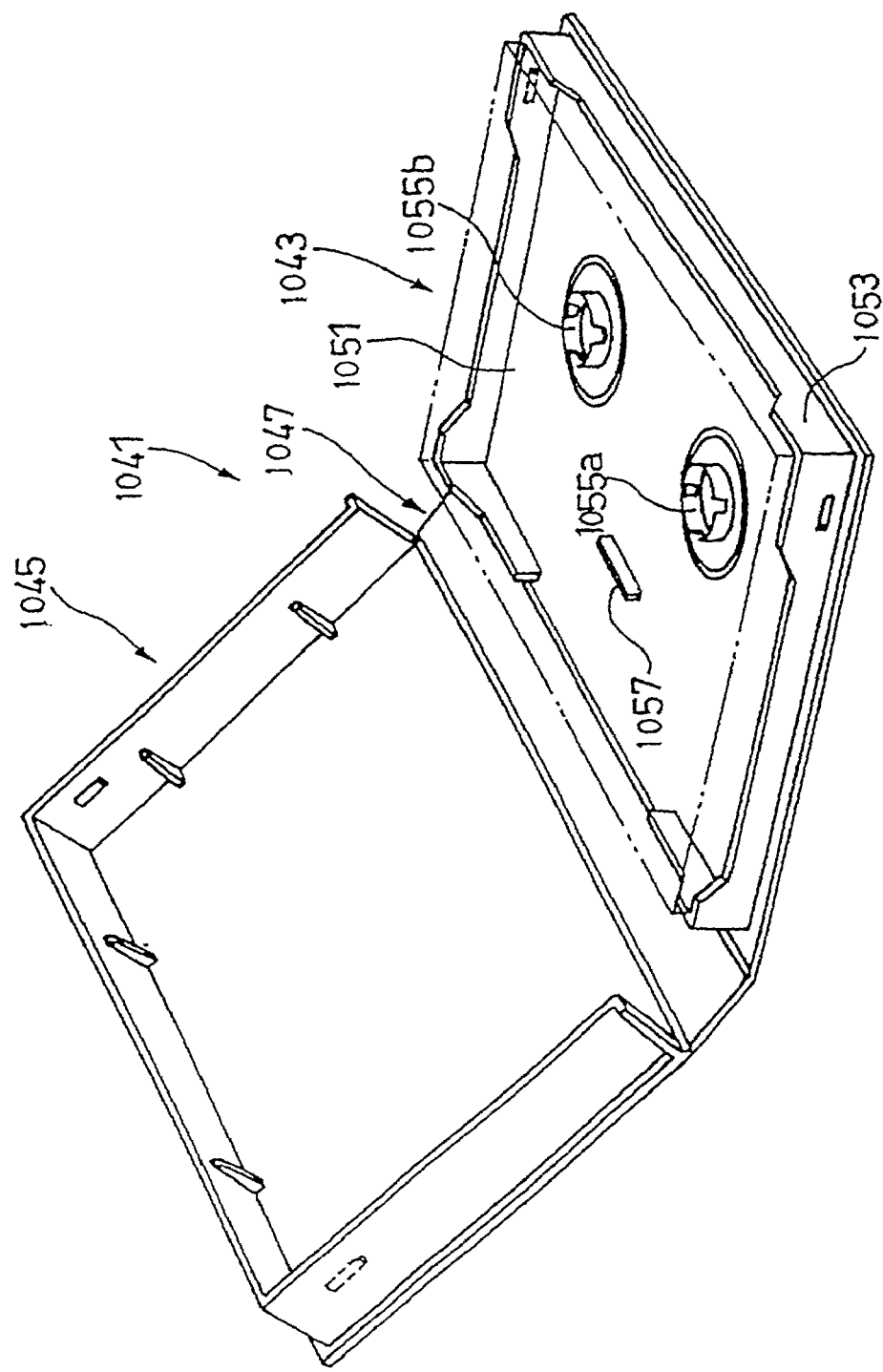
FIG. 35 is a perspective view of the magnetic tape cassette storage case according to the nineteenth embodiment of the present invention.

The nineteenth embodiment of the present invention will be described. FIG. 35 is a perspective view of the storage case 1041 for Beta cam according to the nineteenth embodiment of the present invention, and FIG. 36 is a bottom view of the magnetic tape cassette 1100 for Beta cam.

Figure 36:
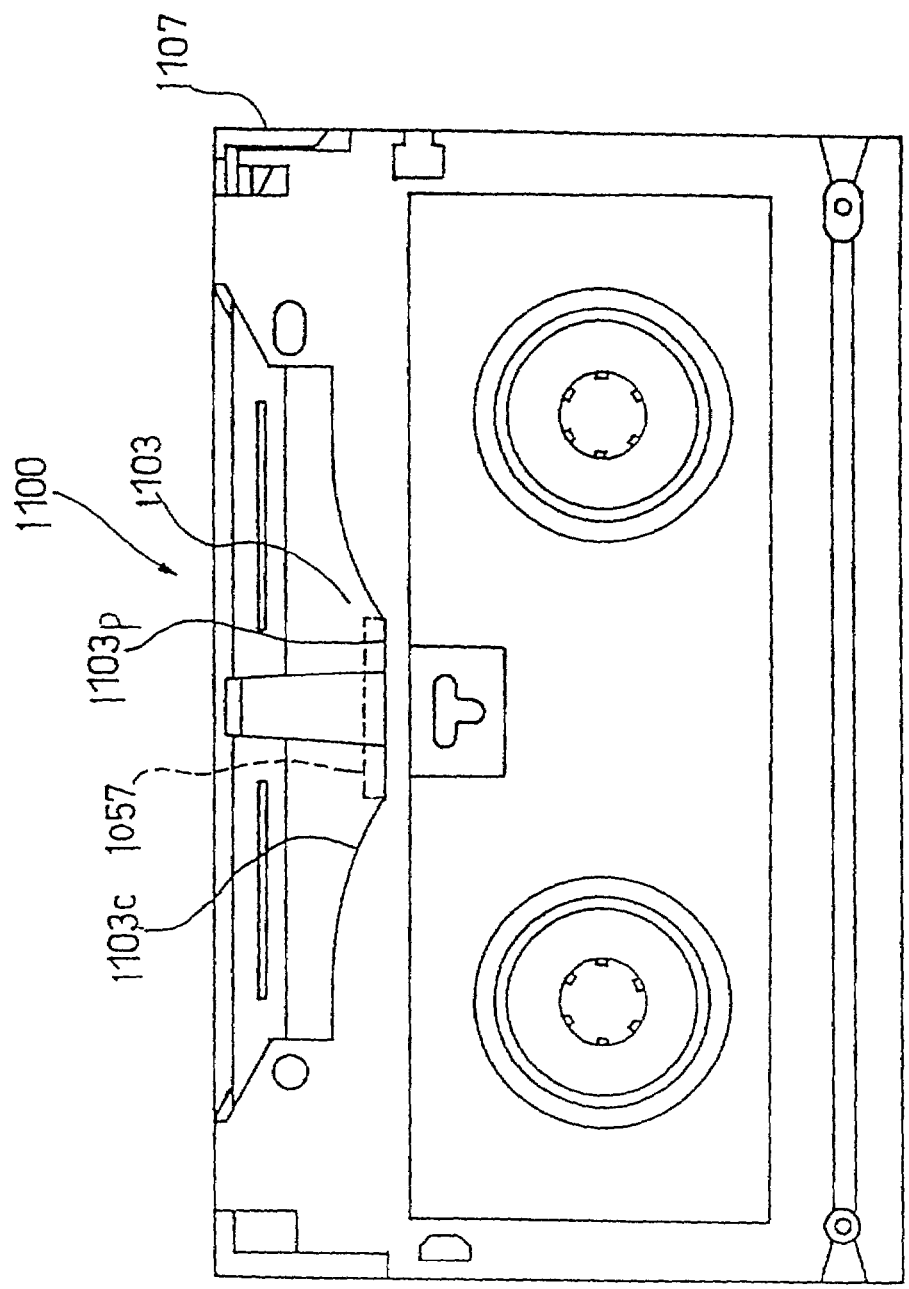
FIG. 36 is a bottom view of the magnetic tape cassette for Beta cam.

The storage case 1041 shown in FIG. 35 comprises a storage section 1043 for storing the magnetic tape cassette 1100 shown in FIG. 36, a lid section 1045, and a connecting section 1047. The storage section 1043 comprises a first plate portion 1051, a first sidewall portion formed integrally along the outer periphery of the first plate portion 1051, reel locking ribs 1055*a*, 1055*b* formed on the first plate portion 1051 at the position somewhat closer to the rear end, and a recess locking rib 1057 formed at the position somewhat closer to the front end. When the magnetic tape cassette 1100 is stored properly, it is loosely fitted within the first sidewall portion 1053 as shown in a phantom line in FIG. 35.

The recess locking rib 1057 will be described here. The recess locking rib 1057 is formed in the shape of a plate, on which the front opening 1103, or the recess, shown in FIG. 36 is fitted. The height of the recess locking rib 1057 is set to the height lower than the reel locking ribs 1055*a*, 1055*b*, and the side surface is formed along the flat portion 1103*p* of the front opening 1103. The recess locking rib 1057 is formed at the rear of the cassette with respect to the lid, so that it does not abut against the single-type lid 1107 when the cassette is inserted upside down by mistake. Therefore, the nineteenth embodiment may prevent deformation and damage of the lid 1107, and ensures protection of the magnetic tape.

Figure 37:
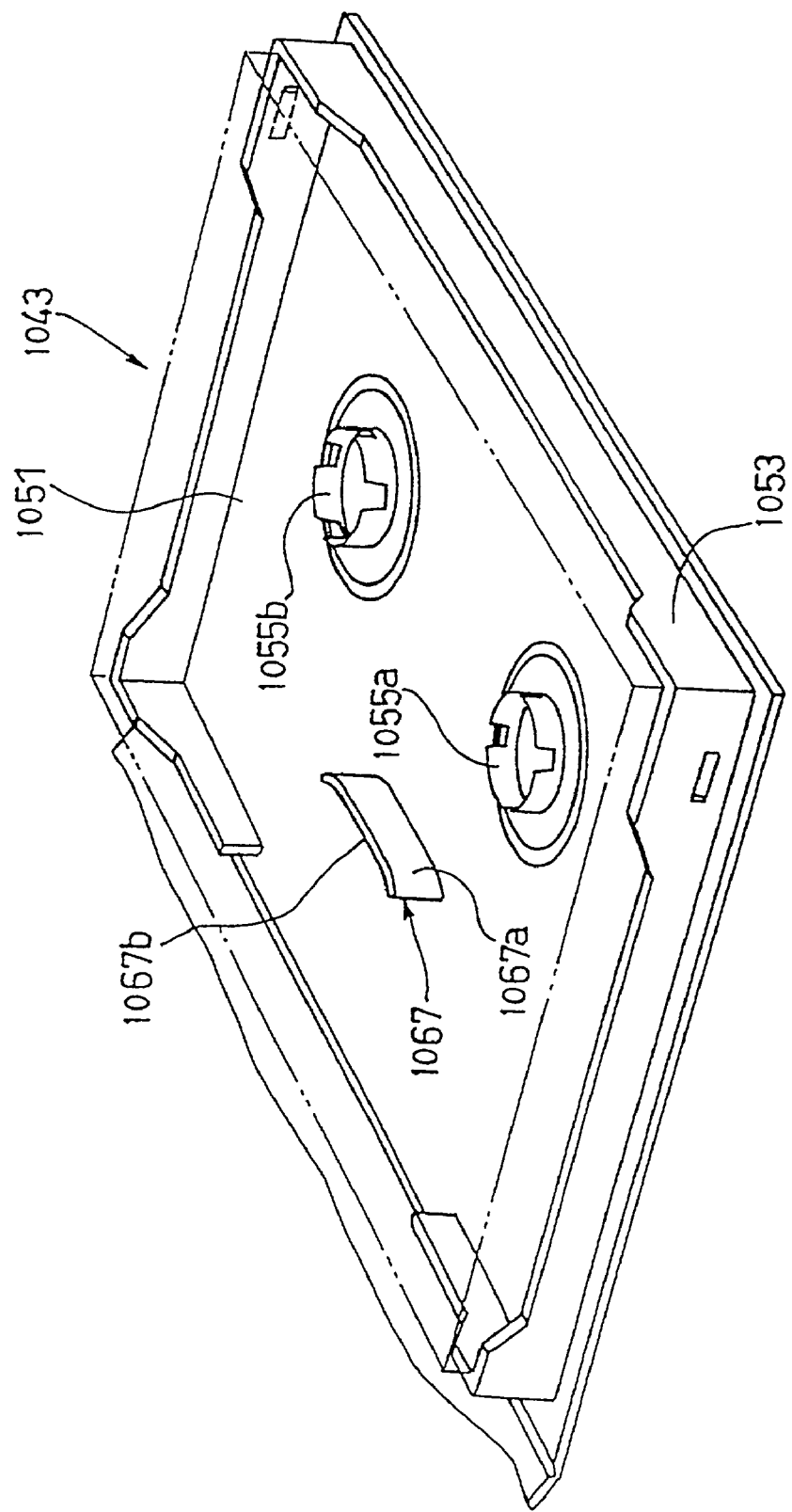
FIG. 37 is a modification of the storage case for magnetic tape cassette according to the nineteenth embodiment.

FIG. 37 shows a modification of the nineteenth embodiment. Since the structure is the same as the nineteenth embodiment except for the recess locking rib 1067, the description will be omitted. As shown in FIG. 37, the recess locking rib 1067, which is the characteristic of this modification, comprises a plate portion 1067*b* and a curved portion 1067*a*, so that it can be inserted into the front opening 1103 shown in FIG. 36. The height of-the recess locking rib 1067 is set to the height lower than the height of the reel locking ribs 1055*a*, 105*b*, the plate portion 1067*b* has a side surface along the flat portion 1103*p* of the front opening 1103, and the curved portion 1067*a* has a side surface along the curved portion 1103*c*. The recess locking rib 1067 is located at the position where it does not abut against the single-type lid 1107 when the cassette is inserted upside down by mistake. Therefore, with this modification, deformation and damage of the lid 1107 may be prevented, thereby ensuring the protection of the magnetic tape.

For example, the recess locking rib may be applied to the magnetic tape cassette other than the DVC or Beta cam by modifying the configuration as appropriate without limited to the eighteenth and nineteenth embodiments and the dimensional relation described above may be applied as a matter of course.

Referring now to the attached drawings, the twentieth embodiment of the present invention will be described.

Figure 38:
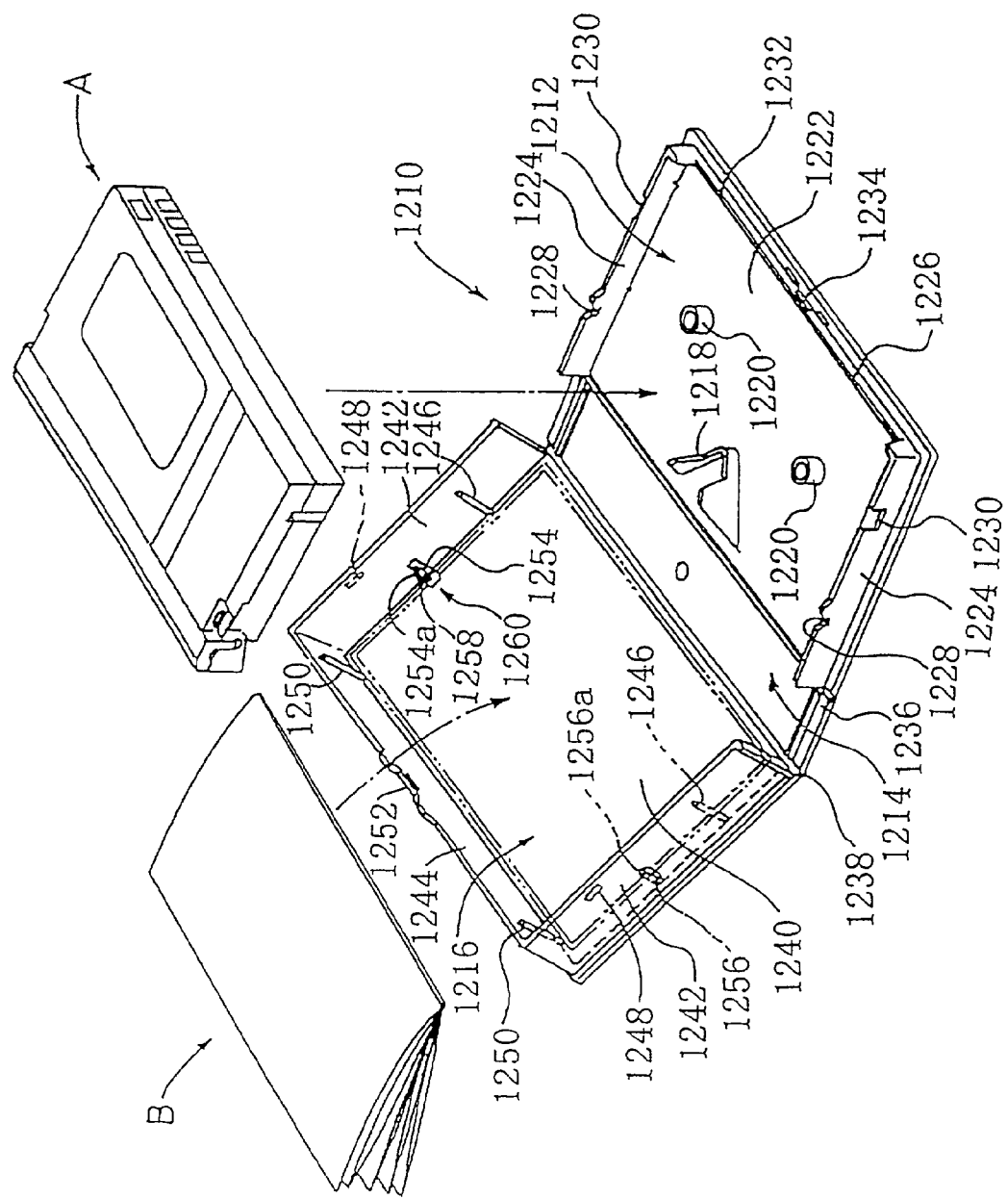
FIG. 38 is a perspective view of the magnetic tape cassette storage case, a magnetic tape cassette, and the information sheet according to the twentieth embodiment.
Figure 39:
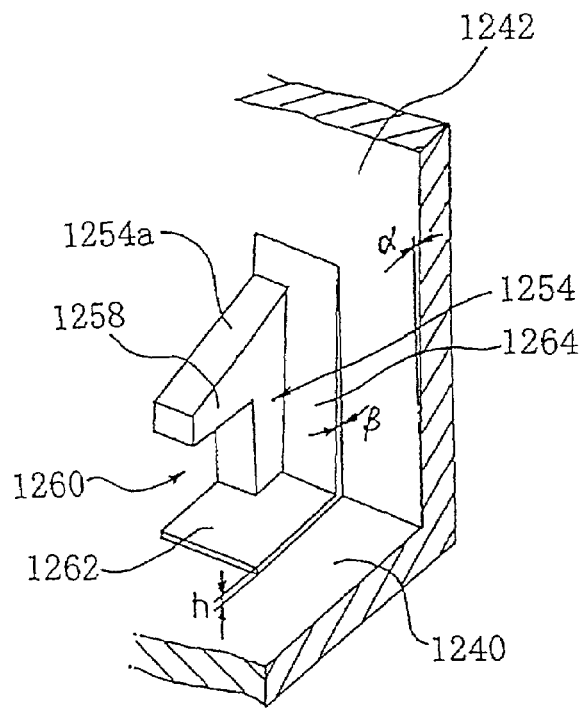
FIG. 39 is a partially enlarged perspective view showing the principal portion of the storage case for magnetic tape cassette according to the twentieth embodiment.
Figure 40:
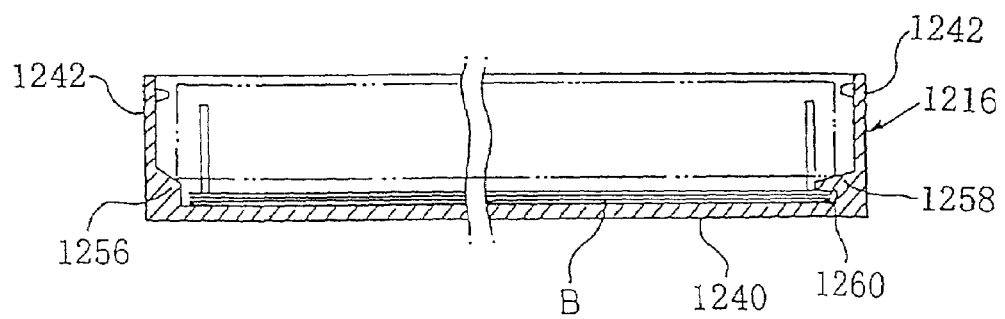
FIG. 40 is a cross sectional view showing a state in which the magnetic tape cassette and the information sheet is stored in the magnetic tape cassette storage case according to the twentieth embodiment.
Figure 41:
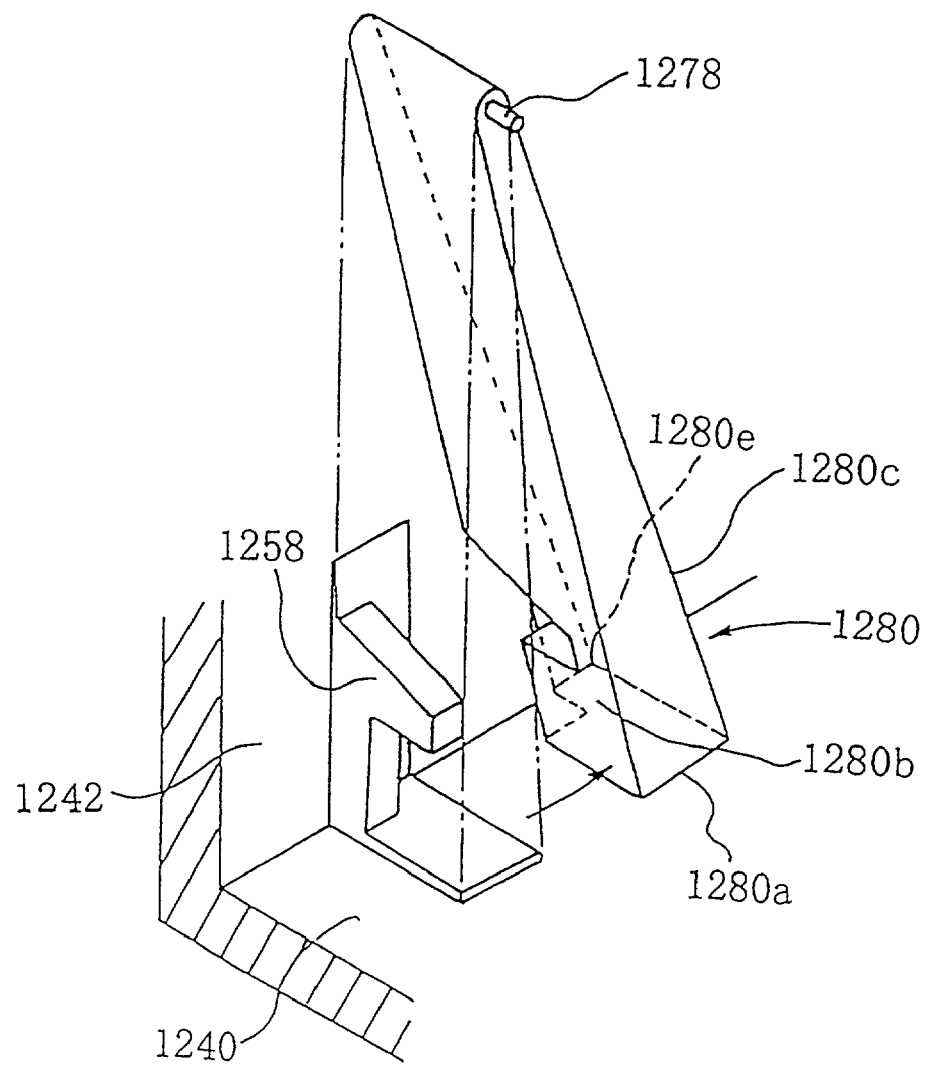
FIG. 41 is a perspective view of the rib-molding core for molding the holding rib of the magnetic tape cassette storage case according to the twentieth embodiment.
Figure 42:
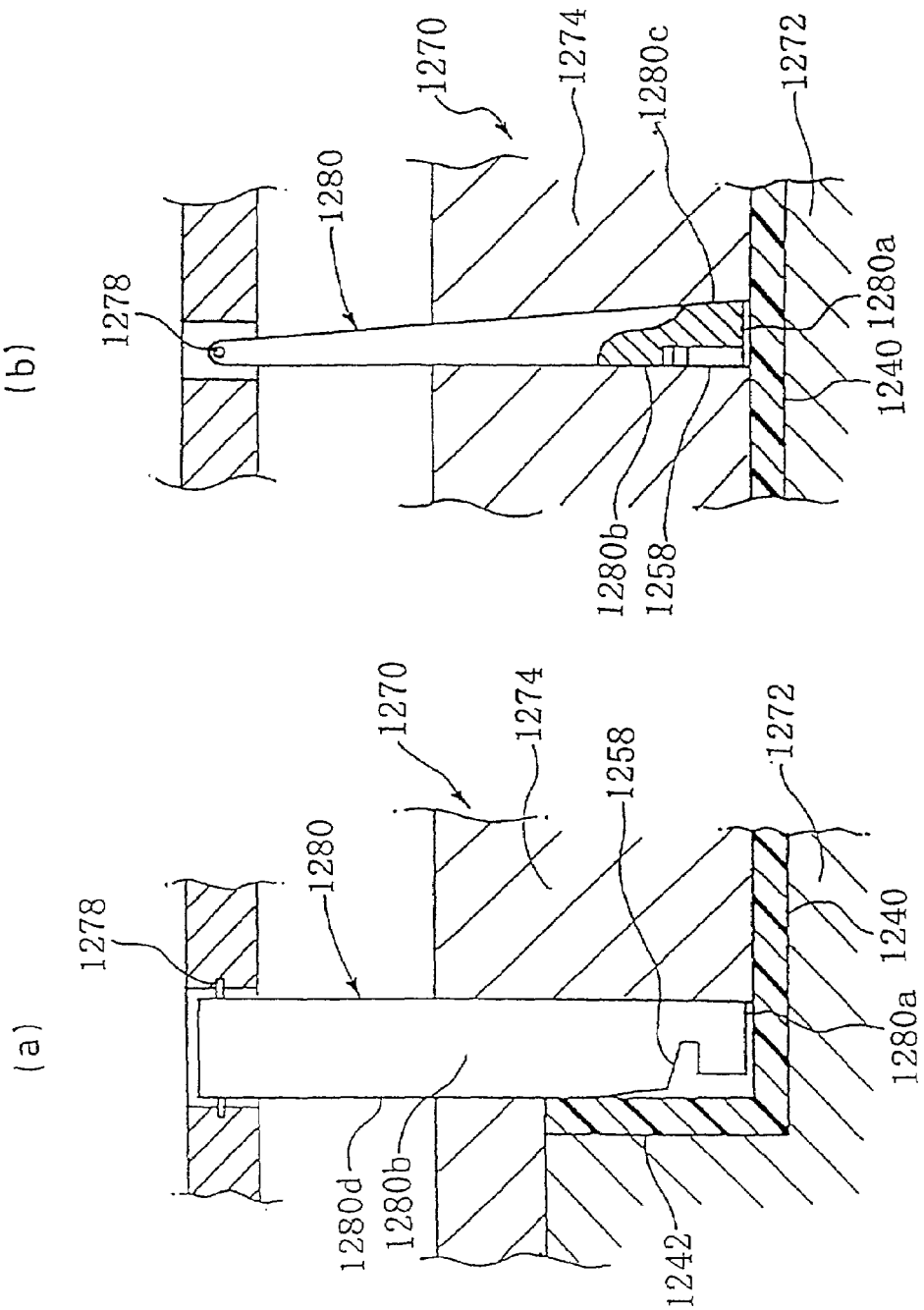
Figure 43:
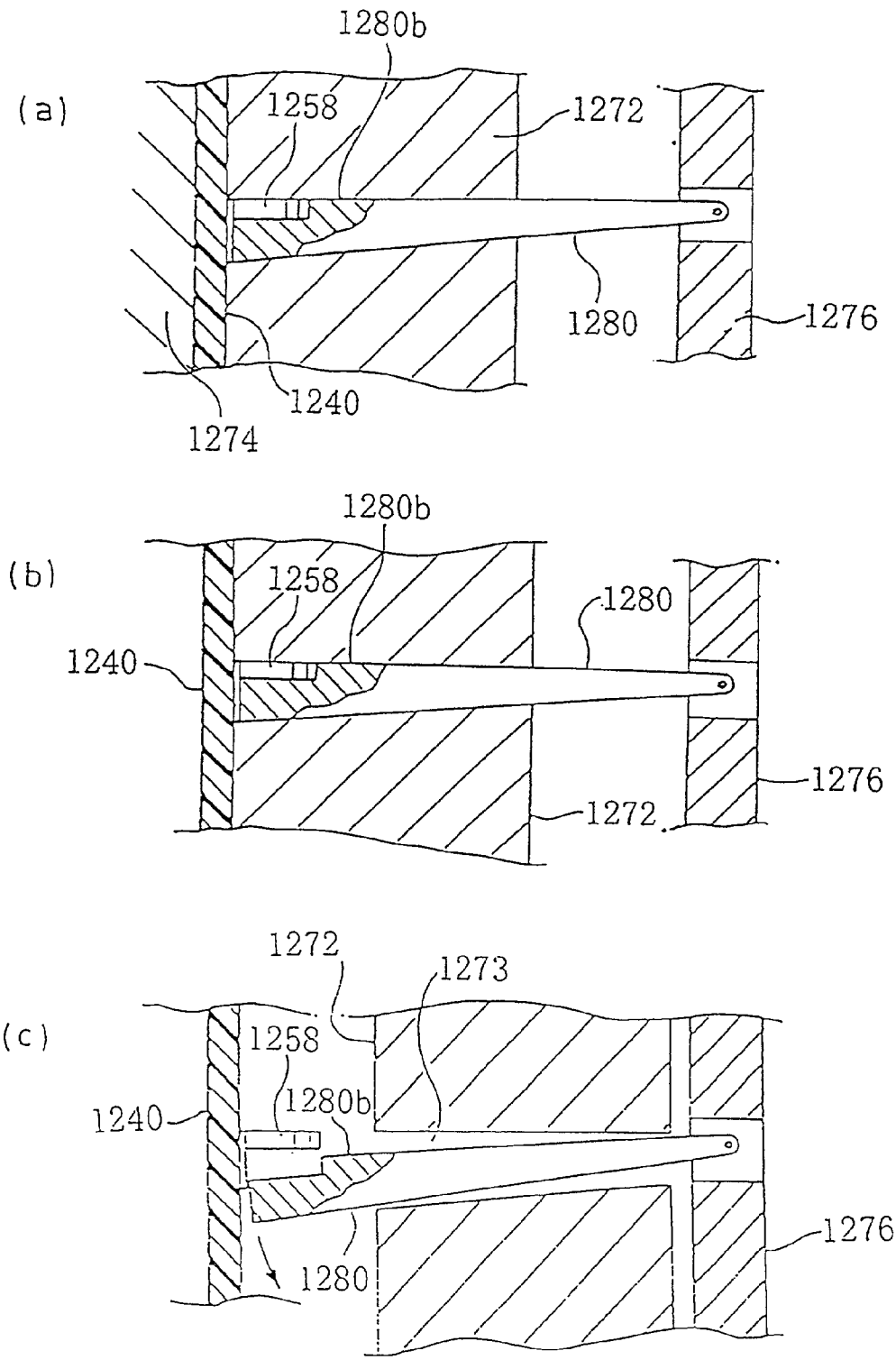

FIG. 38 is a perspective view showing a storage case for magnetic tape cassettes, a magnetic tape cassette, and an information sheet according to the second embodiment according to the twentieth embodiment; FIG. 39 is a partially enlarged perspective view showing a principal portion of the storage case for magnetic tape cassette according to the twentieth embodiment;

FIG. 40 is a cross-sectional view showing the magnetic tape cassette storage case with the magnetic tape cassette and the information sheet stored therein; FIG. 41 is a perspective view of the metal mold according to the twentieth embodiment showing the rocking state of the rib-molding core; FIG. 42(*a*), (*b*) are conceptual cross-sectional views showing the principal portion of the metal mold including the rib-molding core for molding the principal portion of the magnetic tape cassette storage case according to the twentieth embodiment; and FIG. 43(*a*), (*b*), (*c*) are the principal portion of the metal mold including the rib-molding core for molding the principal portion of the storage case for magnetic tape cassette according to the twentieth embodiments showing a state where the rib-molding core is pivoted.

As shown in FIG. 38, the magnetic tape cassette storage case 1210 are formed by injection molding, and comprises a storage section 1212 for storing the magnetic tape cassette A, and a lid section 1216 in which one side is integrally connected to one of the longitudinal sides of the storage section 1212 via the connecting section 1214.

The storage section 1212 is formed in a rectangular shape corresponding to the outer dimension of the magnetic tape cassette A, and comprises a bottom plate 1222, or the first plate portion, having a plurality of mounting projections 1218, 1220 corresponding to the recessed shape of the magnetic tape cassette A therein, and sidewalls 1224, 1224 and the end wall 1226, or the first sidewall portion, formed so as to extend upwardly along the periphery of the bottom plate 1222 to which the magnetic tape cassette is fitted. A positioning notch 1228 and a locking recess 1230 for engaging the lid section 1216 are formed on the upper edge of and on the outside surface of the sidewall 1224, and a positioning notch 1232 and the locking recess 1234 to be engaged with the lid section 1216 are also formed on the upper end of and at the center of the outside surface of the end wall 1226.

Both of the elongated sides of the connecting section 1214 are integrally connected to the bottom plate 1222 of the storage section 1212 and the lid section 1216 respectively via the thin portions 1236, 1238 so that it can be folded and deployed.

The lid section 1216 comprises a top plate 1240, or the second plate portion, connected to the connecting section 1214 for enabling the hinged movement, and sidewalls 1242, 1242 and the end wall 1244, or the second sidewall portion, that is formed on the inner surface of the top plate 1240, that is, to extend upwardly like a frame along three sides of the surface opposing to the storage section 1212 and fits around the outside of the sidewall 1224 and the end wall 1226 of the storage section 1212. The heights of the sidewall 1242 and of the end wall 1244, and the width (height) of the connecting section 1214 correspond to the sum of the thickness of the magnetic tape cassette A and the storing thickness of the information sheet B.

The sidewall 1242 is formed with a positioning rib 1246 inside thereof and a locking claw 1248 for resiliently engages the notch 1228 and the recess 1230 on the storage section 1212 to hold the lid in the closed state, and the end wall 1244 is also formed with a positioning rib 1250 and locking claw 1252 for resiliently engaging the notch 1232 of the storage section 1212 for holding the lid in the closed state at both ends and at the center of the inner surface thereof.

In addition, a holding ribs 1254, 1256 extending from the top plate 1240 along the sidewalls 1242, 1242 are formed on the inner surface of both of the sidewalls 1242, 1242 to the appropriate height to abut against the upper peripheral edge of the magnetic tape cassette A to be stored in the lid section 1216 for ensuring the space for storing the information sheet B.

The holding ribs 1254, 1256 have bevels on the tip portions thereof, so that the bevels 1254*a*, 1256*a* guide the magnetic tape cassette A toward the center of the storage section 1212. From between the holding ribs 1254, 1256, the holding rib 1254 is provided with a sheet holding rib 1258 for holding the information sheet B integrally projecting from the bevel 1254a inwardly (in the vertical direction with respect to the inner surface of the sidewall 1242) of the lid section 1216 so that the rib 1258 defines the space 1260 (undercut portion) for holding the information sheet B with the lid plate 1240 as shown in FIG. 39 in an enlarged state.

As shown in FIG. 39, the holding rib 1254 is formed along a pedestal 1262 formed on the top plate 1240 and a back holder 1264 formed on the sidewall 1242. The pedestal 1262 has a uniform height of h and the back holder 1264 is inclined by the angle β with respect to the inner surface of the sidewall 1242. The height and inclination are formed in such a manner that it does not come into contact with the top plate 1240 and the sidewall 1242 when the rib-molding core of the metal mold described later makes a rocking movement, in other words, to the height h of 50–300 μm and the inclination β of 0.1–3 degrees. The sidewall 1242 is also formed with a draft angle α.

In the magnetic tape cassette storage case 1210 in this arrangement, the magnetic tape cassette A is positioned on the bottom plate 1222 of the storage section 1212 with the recessed portion fitted on the mounting projections 1218, 1220 of the storage section 1212, and the information sheet B is positioned between the holding ribs 1254, 1256 of the lid section 1216 and one end thereof is restrained by the sheet holding rib 1258. Then it is closed by folding the thin portions 1236, 1238 of the connecting section 1214 to face the lid section 1216 to the storage section 1212, engaging the positioning ribs 1246, 1250 on the lid section 1216 with the positioning notches 1228, 1232 on the storage section 1212, engaging the locking claw 1248 of the lid section 1216 with the locking recess 1234, and engaging the locking claw 1252 of the lid section 1216 with the locking recess 1243 of the storage section 1212.

In such a closed state, as shown in FIG. 40, one end of the information sheet B is positioned by the inner surface of the holding rib 1256, the other end of the information sheet B is positioned by the inner surface of the holding rib 1254, and the information sheet B is restrained in the space 1260 by the sheet holding rib 1258.

The dimensions of the information sheet B in length and width correspond to the inner dimensions of the lid section 1216, and thus it is folded a plurality of times or bound into a leaflet as shown in FIG. 38. Therefore, by inserting the end of the sheet into the space 1260 between the lower portion of the sheet holding rib 1258 and the inner surface of the lid plate 1240 as shown in FIG. 40, it is stored in the fixed state in terms of position by the lib 1258, thereby preventing jumping out, dropping off, or protruding thereof.

The magnetic tape cassette storage case 1210 is molded by injection molding by the use of the metal mold 1270. The metal mold 1270 for molding the storage case 1210 performs molding with a fixed die 1272 for forming the outside of the storage case 1210 and a movable die 1274 for forming the inside of the storage case 1210, as conceptually shown in FIG. 42. The holding rib 1254 and the sheet holding rib 1258 each having an undercut portion 1260 are formed by the use of a member interlocked with the movable die 1274, such as a rib-molding core 1280 constructed of a projecting pin supported at one end on the ejector plate 1276 by the pivot shaft 1278 for pivotal movement. The rib-molding core 1280 is disposed to pivot with respect to the movable die 1274, and oriented so that the direction of removal thereof lies in parallel with the surface of the sidewall 1242. In addition, it is arranged to be urged by a spring, which is not shown, in the direction of removal of the rib-molding core 1280, or to be pivoted by other actuators such as a motor, a fluid pressure cylinder, not shown, or the like, or preferably by its own weight, in the direction of removal in accordance with the movement of the movable die 1272. The rib-molding core 1280 defines a seat 1262 with its tip surface 1280a, and molds a holding rib by the recessed portion 1282 formed on the side surface 1280b facing upstream of the pivoting direction. As shown in FIG. 42(b), the side surface 1280c facing downstream of the pivotal movement thereof is formed into a inclined surface, and as shown in FIG. 42(a), the side surface 1280d at a right angle with respect to the side surface 1280c defines the back holder 1264.

The magnetic tape cassette storage case 1210 is formed by injection molding in the state shown in FIG. 43(a), in other words, in the state where the movable die 1272 is at the closest position to the fixed die 1274. After the material such as synthetic resin is cured, as shown in FIG. 43(b), the movable die 1272 is moved to open. At this moment, the storage case is still adhered to the movable die 1272.

Then, the rib-molding core 1280 is pushed toward the releasing direction (left in FIG. 43) by the ejector plate 1276. Consequently, the rib-molding core 1280 that has been stored in the movable die 1272 and restricted from pivotal movement is now becomes pivotable in the hole 1273.

Then, the rib-molding core 1280 is pivoted by a spring, which is not shown, or other actuators, or preferably by its own weight in the releasing direction (in the direction shown by the arrows in FIG. 41 and FIG. 43(c)), so that the molded surface is separated from the holding rib 1254. At this moment, the tip 1280a of the rib-molding core 1280 slides on the seat 1262 as shown in FIG. 43(c), and when it is detached from the seat 1262, it is completely separated from the top plate 1240. Since there is formed a back holder 1264, when the rib-molding core 1280 is pivoted and detached from the back holder 1264, it is completely separated also from the sidewall 1242.

Without the seat 1262 and the back holder 1264, when the rib-molding core 1280 pivots, the tip portion 1280a, especially on the side downstream of the pivotal movement, may be rubbed against the top plate 1240 and the sidewall 1242 at the corner 1280e (See FIG. 4) on the side of the sidewall 1242 due to the contraction of the top plate 1240 and the sidewall 1242. However, providing the seat 1262 and the back holder 1264 may prevent the top plate 1240 and the sidewall 1242 from being scratched by the corner 1280e of the rib-molding core 1280 when the rib-molding core 1280 pivots.

In the embodiment described above, the rib-molding core 1280 is mounted on the ejector plate 1276 to be also used as a pushing pin. However, it is also possible to provide it as a different member from the pushing pin, which cooperates with the movable die 1272.

Though formation of the undercut portion 1260 of the holding rib 1254 is disclosed in the embodiment described above, it can be applied not only to the holding rib 1254, but also to other undercut portions, as a matter of course.

Referring now to the attached drawings, the twenty-first embodiment of the present invention will be described.

Figure 44:
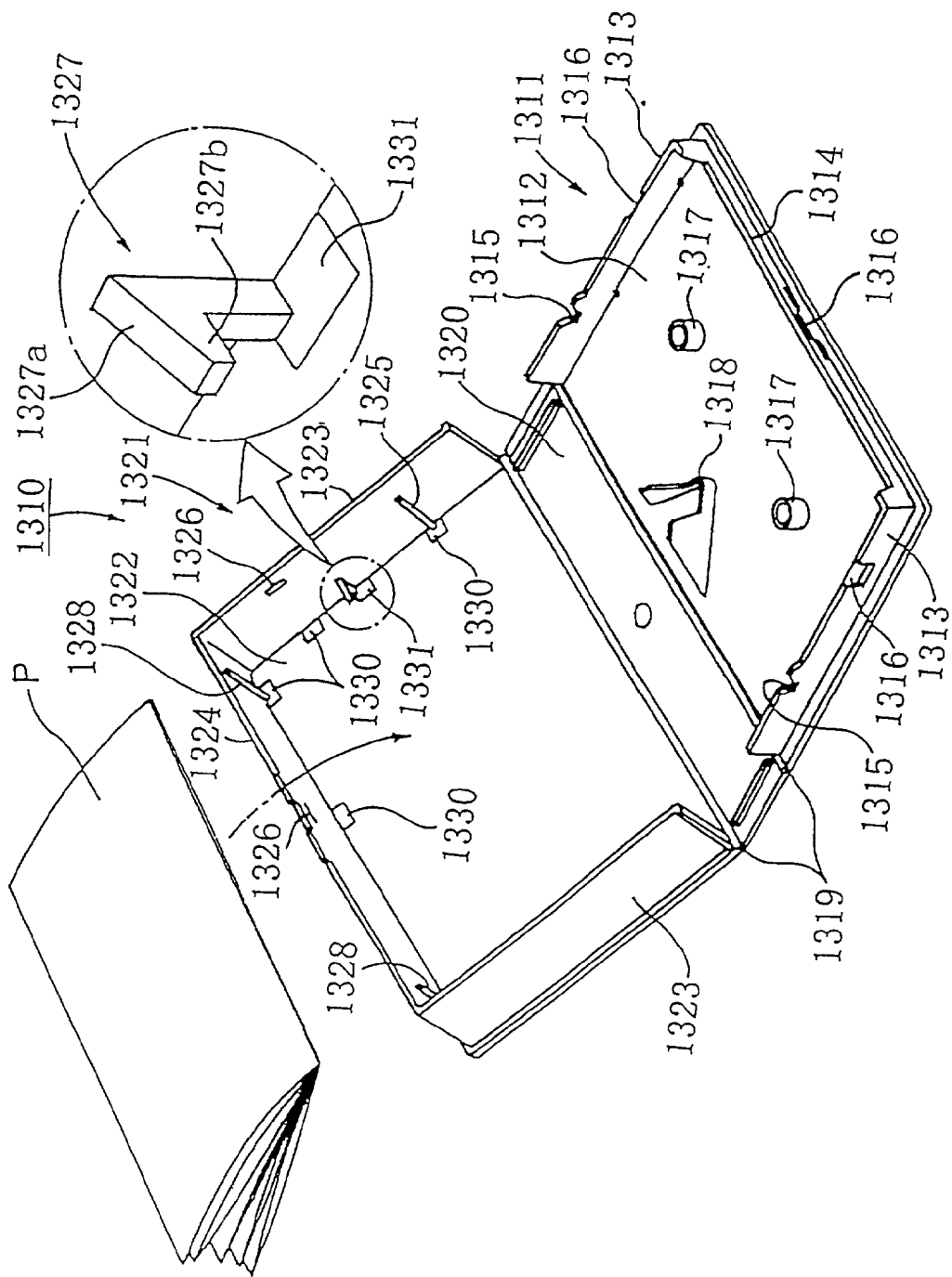
FIG. 44 is a perspective view showing the twenty-first embodiment of the present invention.

FIG. 44 is a storage case for magnetic tape cassette according to the twenty-first embodiment of the present invention. The storage case 1310 comprises a storage section 1311 in which the magnetic tape cassette is stored, and a lid section 1321 connected to the storage section 1311 via the third plate portion 1320 and the thin portion 1319 constituting the connecting section. The storage section 1311 comprises a bottom plate 1312 of rectangular shape having a plurality of mounting projections 1317, 1318 on the inner surface thereof, and sidewalls 1313, 1313 and the end wall 1314 provided along the periphery of the bottom plate 1312 so as to extend upward for fitting the magnetic tape cassettes, not shown, therein. At the upper end and the outer surface of the sidewall 1313, there are provided a positioning notch 1315 and a locking recess 1316 respectively. Also at the center of the outside of the end wall 1314, there is provided a locking recess 1316.

The lid section 1321 comprises a top plate 1322, or the second plate portion connected to the plate portion 1320 for enabling the hinged movement, and a sidewalls 1323, 1323 and an end wall 1324, or the second sidewall section, extending upwardly on the inner surface of the top plate and, for fitting along the outside of the sidewall 1313 and the end wall 1314 of the storage section 1311.

Incidentally, in the broadcasting station or the like, it is important that information on the recorded contents in the magnetic tape cassette or the details of the meeting at the site of shooting can easily be recognized later, and thus in many cases, a strip of paper (hereinafter referred to as "information sheet")P on which such information is listed is inserted into the clearance in the storage case.

In the storage case 10 shown in FIG. 44, the height of the sidewall 1323 and the end wall 1324 of the lid section 1321 and the width of the third plate portion 1320 corresponds with the sum of the thickness of the magnetic tape cassette and the thickness of the information sheet P in the stored state so that the information sheet P can easily be stored. Here, the height of the sidewall 1323 and the end wall 1324 and the width of the third plate portion 1320 is 20 mm (in the range of 15–30 mm).

The inner surface of the sidewall 1323 is formed with a positioning rib 1325 and a locking claw 1326 to be engaged with the positioning notch 1315 and the locking recess 1316 of the storage section 1311 respectively. The inner surface of the end wall 1324 is also formed with a locking claw 1326 at the center thereof. At both ends of the end wall 1324, supporting ribs 1328 for supporting the magnetic tape cassette when the magnetic tape cassette is stored in the storage section 1311 and the lid section 1321 is closed are provided. The positioning rib 1325 and the supporting rib 1328 are in contact with the top plate 1322 at one end and extend along the sidewall 1323 and the end wall 1324 respectively to the height of 15 mm in this case (in the range of 10–20 mm).

The sidewall 1323 is provided with a sheet holding rib 1327 for holding the information sheet P on the inner surface. The sheet holding rib 1327 is in contact with the top plate 1322 at the proximal end and extends along the sidewall 1323, and is provided with a holding claw 1327b for holding the end of the information sheet P at the distal end thereof. The upper surface of the holding claw 1327b is formed into a bevel 1327a for holding the magnetic tape cassette when the magnetic tape cassette is stored in the storage section 1311 and the lid section 1321 is closed. The sheet holding rib 1327 corresponds to the undercut portion when it is molded.

In the vicinity of the proximal portions of the positioning rib 1325 and the supporting rib 1328 on the top plate 1322 of the lid section 1321, and in the vicinity of the position where the top plate 1322 and the vertical line running from the position where the locking claw 1326 is provided toward the top plate 1322 are intersected, there are formed pushed marks 1330 made by the ejector pins. Also in the vicinity of the proximal portion of the sheet holding rib 1327, there is formed a pushed mark 1331 having the dimension along the sidewall 1323 or the end wall 1324 longer than the pushed mark 1330.

Figure 45:
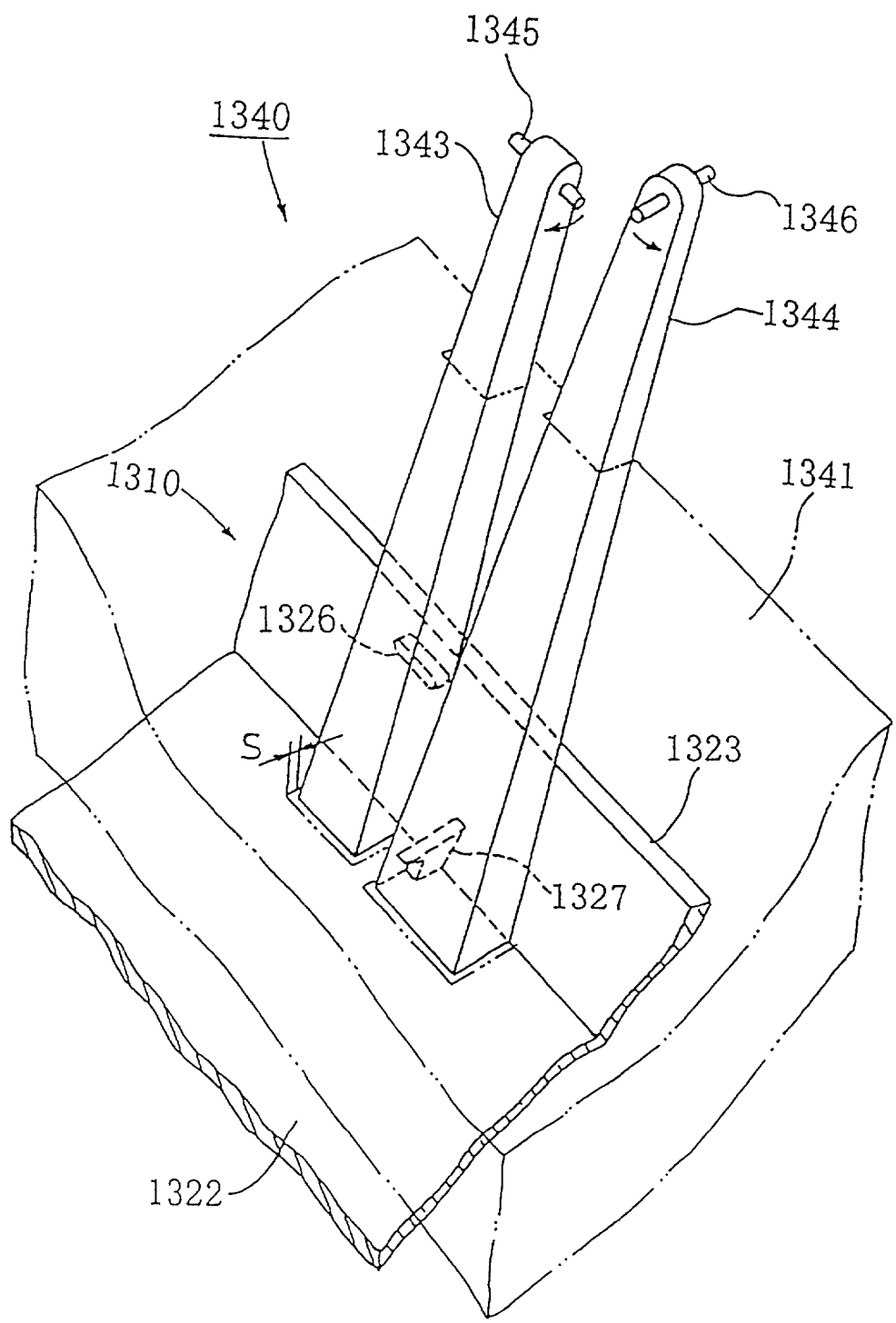
FIG. 45 is a partly enlarged perspective view showing the twenty-second embodiment of the present invention.
Figure 46:
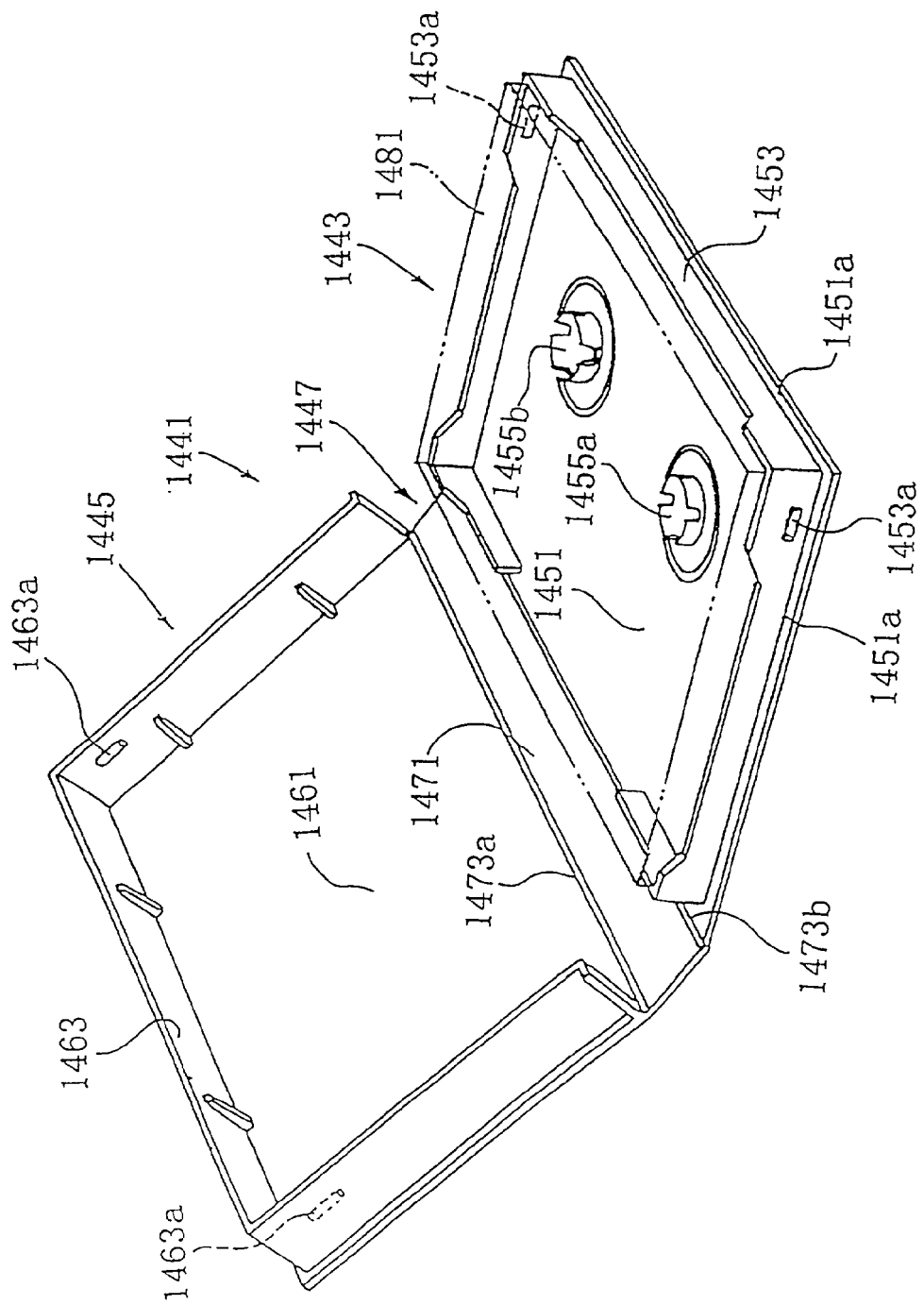
FIG. 46 is a perspective view showing an example of the storage cases for magnetic tape cassettes of the related art.

FIG. 45 shows a metal mold for magnetic tape cassette storage case. The metal mold 1340 comprises a main body of the metal mold, or the movable die 1341 for molding the inner side of the storage case, and a fixed die (not shown) for molding the outside of the storage case. The metal mold 1340 has a cavity for the locking claw 1326 on its side surface for molding the locking claw 1326, which is an undercut portion, and an inclining pin 1343 that inclines inwardly of the storage case while pushing the molded article out of the movable die 1341 by the distal end surface. The proximal portion of the inclining pin 1343 is rotatably supported by the axis of rotation 1345, which is provided on the ejector plate, not shown, and extending in parallel with the sidewall 1323. FIG. 45 shows the metal mold 1340 in the state before pushing operation, and at this time, a clearance S is formed between the distal end surface of the inclining pin 1343 and the molding surface of the movable die 1341. The clearance S is 0.05–0.3 mm here.

The metal mold 1340 comprises a cavity for the sheet holding rib 1327 on its side surface for molding the sheet holding rib 1327, which is an undercut portion, and an inclining pin 1344 that inclines in the direction along the sidewall 1323 while pushing the molded article out of the movable die 1341 by the distal end surface. The proximal end of the inclining pin 1344 is rotatably supported by the axis of rotation 1346, which is provided on the ejector plate, not shown, and extending vertically with respect to the axis of rotation 1345. Before pushing operation, as in the case of the inclining pin 1343, a clearance is formed between the distal end surface of the inclining pin 1344 and the molding surface of the movable die 1341.

Though it is not shown, the metal mold 1340 also comprises ejector pins for molding a positioning rib 1325, a supporting rib 1328, and a locking claw 1326 on the end wall 1324 shown in FIG. 44. There are also formed clearances between the distal end surfaces of these ejector pins and the molding surface of the movable die 1341 before pushing operation.

When synthetic resin is filled in the cavity of such a metal mold 1340, a clearance between the distal end surfaces of the inclining pins 1343, 1344 and the movable die 1341, and clearances between the distal end surfaces of the respective ejector pins for molding the positioning rib 1325, the supporting rib 1328, and the locking claw 1326 on the end wall 1324 and the molding surface of the movable die 1341 respectively serve as a gas vent.

Then, when the ejector plate, not shown, is driven and the storage case 1310, or the molded article, is pushed by the inclining pins 1343, 1344 from the movable die 1341 from the state shown in FIG. 45, the inclining pin 1343 inclines inwardly of the storage case, or in the vertical direction with respect to the sidewall 1323, and the inclining pin 1344 inclines in the direction along the sidewall 1323. Then the locking claw 1326 and the sheet holding rib 1327 that are undercut portions respectively are released from the cavities on the side surface of the inclining pins 1343, 1344.

In the metal mold 1340 for the storage case for magnetic case cassette constructed as described above, the positioning rib 1325, the supporting rib 1328, and the sheet holding rib 1327, which are in contact with the top plate 1322 at one end and extending along the sidewall 1323 and the end wall 1324 respectively, are formed by the use of the ejector pin and the inclining pin 1344, and the clearance between each pin and the movable die 1341 are used as a gas vent to ensure mold breathing. Therefore, the sidewall 1323 and the end wall 1324 are prevented from having bubbles trapped therein, thereby realizing molding of magnetic tape cassette storage case with preferable appearance.

Since the undercut portion for, for example, the locking claw 1326 are all molded by the inclining pin 1343 or the ejector pin and the clearance between each pin and the movable die 1341 is used as a gas vent, further preferable breathing can be performed.

In addition to the above-described twenty-first embodiment, it is also possible to use the metal mold of the present invention to form a magnetic tape cassette storage case in which the storage section is formed on its inner surface with a rib being in contact with the bottom plate and extending along the peripheral wall of at least 6 mm in height.

Alternatively, it is also possible to construct the metal mold in such a manner that the molded article stays in the fixed die and is pushed out by the ejector pin passing through the fixed die.

Though the present invention has been described according to some embodiments, the present invention also includes the combination of a plurality of such embodiments or modifications, as a matter of fact.

What is claimed is:

1. A magnetic tape cassette storage case comprising:
    a storage section, which comprises a bottom plate and side walls provided along a periphery of said bottom plate, for storing a magnetic tape cassette;
    a lid section for covering said storage section; and
    a connecting section for connecting said storage section and said lid section, said connecting section operable to allow opening and closing of said magnetic tape cassette case, wherein said connecting section is formed integrally of synthetic resin;
    said magnetic tape cassette storage case further comprising:
        a rib along a periphery of an outside surface of at least one of said storage section and said lid section,
            wherein the outside surface partially surrounded by the rib is formed into a flat portion, and
            wherein the rib projects outward in a substantially perpendicular direction from the outside surface of at least one of said storage section and said lid section; and
        an information sheet holding portion which covers a part of said flat portion,
            wherein said information sheet holding portion includes a transparent sheet welded on opposite sides of said outside surface.

2. The magnetic tape cassette storage case of claim 1, wherein a first side of said transparent sheet is welded to said outside surface along an end furthest from said connecting section, and wherein a second side of said transparent sheet is welded to said outside surface along said connecting section.

3. The magnetic tape cassette storage case of claim 1, wherein said information sheet holding portion covers a part of said flat portion of said outside surface and a part of said connecting section.

4. The magnetic tape cassette storage case of claim 1, further comprising at least a second rib along both ends of an outside surface of said connecting section, wherein said outside surface of said connecting section that is between said second ribs, is formed into a second flat portion.

5. The magnetic tape cassette storage case of claim 3, wherein a first side of said transparent sheet is welded to said outside surface along an end furthest from said connecting section, and wherein a second side of said transparent sheet is welded to an edge of said connecting section.

6. The magnetic tape cassette storage case of claim 3, wherein a first side of said transparent sheet is welded to said outside surface along an end furthest from said connecting section, and
    wherein a second side of said transparent sheet is welded to an edge of said connecting section which is adjacent to said outside surface.

7. A magnetic cassette storage case of claim 1, wherein said information sheet holding portion covers a part of said flat portion of said outside surface of said storage section and said lid section, and a part of said connecting section.

8. The magnetic tape cassette storage case of claim 4, wherein the second rib projects outward in a substantially perpendicular direction from the outside surface of said connecting section.

9. A magnetic tape cassette storage case comprising:
    a storage section, which comprises a bottom plate and side walls provided along a periphery of said bottom plate, for storing a magnetic tape cassette;
    a lid section for covering said storage section; and
    a connecting section for connecting said storage section and said lid section, said connecting section operable to allow opening and closing of said magnetic tape cassette case, wherein said connecting section is formed integrally of synthetic resin;
    said magnetic tape cassette storage case further comprising:
        a rib along a periphery of an outside surface of at least one of said storage section and said lid section,
        wherein the outside surface is formed into a flat portion, and
        wherein the rib projects outward in a substantially perpendicular direction from the outside surface of at least one of said storage section and said lid section; and
        an information sheet holding portion which covers a part of said flat portion,
        wherein said information sheet holding portion includes a transparent sheet welded on opposite sides of said outside surface, and
        wherein said rib is formed along three sides of said outside surface of at least one of said storage section and said lid section.

10. The magnetic tape cassette storage case according to claim 9, wherein said rib is formed along at least three sides of the periphery of said outside surface of at least one of said storage section and said lid section.

11. A magnetic tape cassette storage case comprising:
    a storage section, which comprises a bottom plate and side walls provided along a periphery of said bottom plate, for storing a magnetic tape cassette;
    a lid section for covering said storage section; and
    a connecting section for connecting said storage section and said lid section, said connecting section operable to allow opening and closing of said magnetic tape cassette case, wherein said connecting section is formed integrally of synthetic resin;

said magnetic tape cassette storage case further comprising:
- a rib along a periphery of an outside surface of at least one of said storage section and said lid section,
  - wherein the outside surface partially surrounded by the rib is formed into a flat portion, and
  - wherein the rib projects outward in a substantially perpendicular direction from the outside surface of at least one of said storage section and said lid section; and
- an information sheet holding portion which covers a part of said flat portion,
  - wherein said information sheet holding portion includes a transparent sheet welded on opposite sides of said outside surface, and
- further wherein said information sheet holding portion covers a part of said flat portion of said outside surface and a part of said connecting section.

12. The magnetic tape cassette storage case of claim 11, further comprising at least a second rib along both ends of an outside surface of said connecting section, wherein said outside surface of said connecting section that is between said second ribs, is formed into a second flat portion.

13. The magnetic tape cassette storage case of claim 11, wherein a first side of said transparent sheet is welded to said outside surface along an end furthest from said connecting section, and
wherein a second side of said transparent sheet is welded to an edge of said connecting section.

14. The magnetic tape cassette storage case of claim 11, wherein a first side of said transparent sheet is welded to said outside surface along an end furthest from said connecting section, and
wherein a second side of said transparent sheet is welded to an edge of said connecting section which is adjacent to said outside surface.

15. A magnetic cassette storage case of claim 11, wherein said information sheet holding portion covers a part of said flat portion of said outside surface of said storage section and said lid section, and a part of said connecting section.

16. The magnetic tape cassette storage case of claim 12, wherein the second rib projects outward in a substantially perpendicular direction from the outside surface of said connecting section.

17. The magnetic tape cassette storage case according to claim 9, further comprising at least a second rib along both ends of an outside surface of said connecting section, wherein said outside surface of said connecting section that is between said second ribs, is formed into a second flat portion,
wherein the second rib projects outward in a substantially perpendicular direction from the outside surface of said connecting section.

* * * * *